US012198166B2

(12) United States Patent
Kobayashi et al.

(10) Patent No.: US 12,198,166 B2
(45) Date of Patent: Jan. 14, 2025

(54) IMAGE PROCESSING THAT PERMITS IMAGING OPERATIONS WITH REFERENCE TO USER INFORMATION

(71) Applicant: Sony Group Corporation, Tokyo (JP)

(72) Inventors: Tsukasa Kobayashi, Kanagawa (JP); Yasuto Masuda, Kanagawa (JP); Masayuki Imanishi, Tokyo (JP); Takanobu Ujisato, Tokyo (JP); Jun Shinomiya, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 148 days.

(21) Appl. No.: 17/928,123

(22) PCT Filed: Jul. 2, 2021

(86) PCT No.: PCT/JP2021/025077
§ 371 (c)(1),
(2) Date: Nov. 28, 2022

(87) PCT Pub. No.: WO2022/014360
PCT Pub. Date: Jan. 20, 2022

(65) Prior Publication Data
US 2023/0206289 A1 Jun. 29, 2023

(30) Foreign Application Priority Data
Jul. 15, 2020 (JP) .................................. 2020-121100

(51) Int. Cl.
*G06Q 30/0282* (2023.01)
*G06K 19/06* (2006.01)
(Continued)

(52) U.S. Cl.
CPC ..... *G06Q 30/0282* (2013.01); *G06Q 30/0185* (2013.01); *G06Q 30/0609* (2013.01);
(Continued)

(58) Field of Classification Search
CPC ....... H04N 23/60–698; H04N 1/00334; G06Q 30/0282; G06Q 30/018; G06Q 30/0185;
(Continued)

(56) References Cited

U.S. PATENT DOCUMENTS

2020/0169835 A1    5/2020  Kejing

FOREIGN PATENT DOCUMENTS

JP    2003244347 A    8/2003
JP    2008022372 A    1/2008
(Continued)

OTHER PUBLICATIONS

International Search Report (PCT/ISA/210), International Application No. PCT/JP2021/025077, dated Oct. 5, 2021.

*Primary Examiner* — Twyler L Haskins
*Assistant Examiner* — Akshay Trehan
(74) *Attorney, Agent, or Firm* — Michael Best & Friedrich LLP

(57) ABSTRACT

Image processing apparatuses and information processing systems are disclosed. In one example, user information is generated on condition that a session is being established with a provision destination of a captured image, and the user information is provided to an information processing device that stores imaging location information. Alternatively, acquisition of imaging location information is permitted on the basis of permission information obtained from a provision destination on the condition that a session is being established with the provision destination of a captured image, the imaging location information provided from the information processing device associated with an imaging location is acquired in the permitted state, and the imaging location information and the user information are provided to an external device that verifies the user information.

18 Claims, 50 Drawing Sheets

(51) Int. Cl.
*G06Q 30/018* (2023.01)
*G06Q 30/0601* (2023.01)
*H04N 1/00* (2006.01)
*H04N 23/60* (2023.01)

(52) U.S. Cl.
CPC ......... *H04N 1/00334* (2013.01); *H04N 23/60* (2023.01); *G06K 19/06112* (2013.01)

(58) Field of Classification Search
CPC ........... G06Q 30/0601; G06Q 30/0609; G06K 19/06009; G06K 19/06037; G06K 19/06112
See application file for complete search history.

(56) References Cited

FOREIGN PATENT DOCUMENTS

| | | | | |
|---|---|---|---|---|
| JP | 2014021772 | A | 2/2014 | |
| KR | 101927617 | B1 | 12/2018 | |
| KR | 20190108008 | A * | 9/2019 | ....... G06K 19/06037 |
| KR | 102094927 | B1 | 3/2020 | |
| WO | 2019039561 | A1 | 2/2019 | |

* cited by examiner

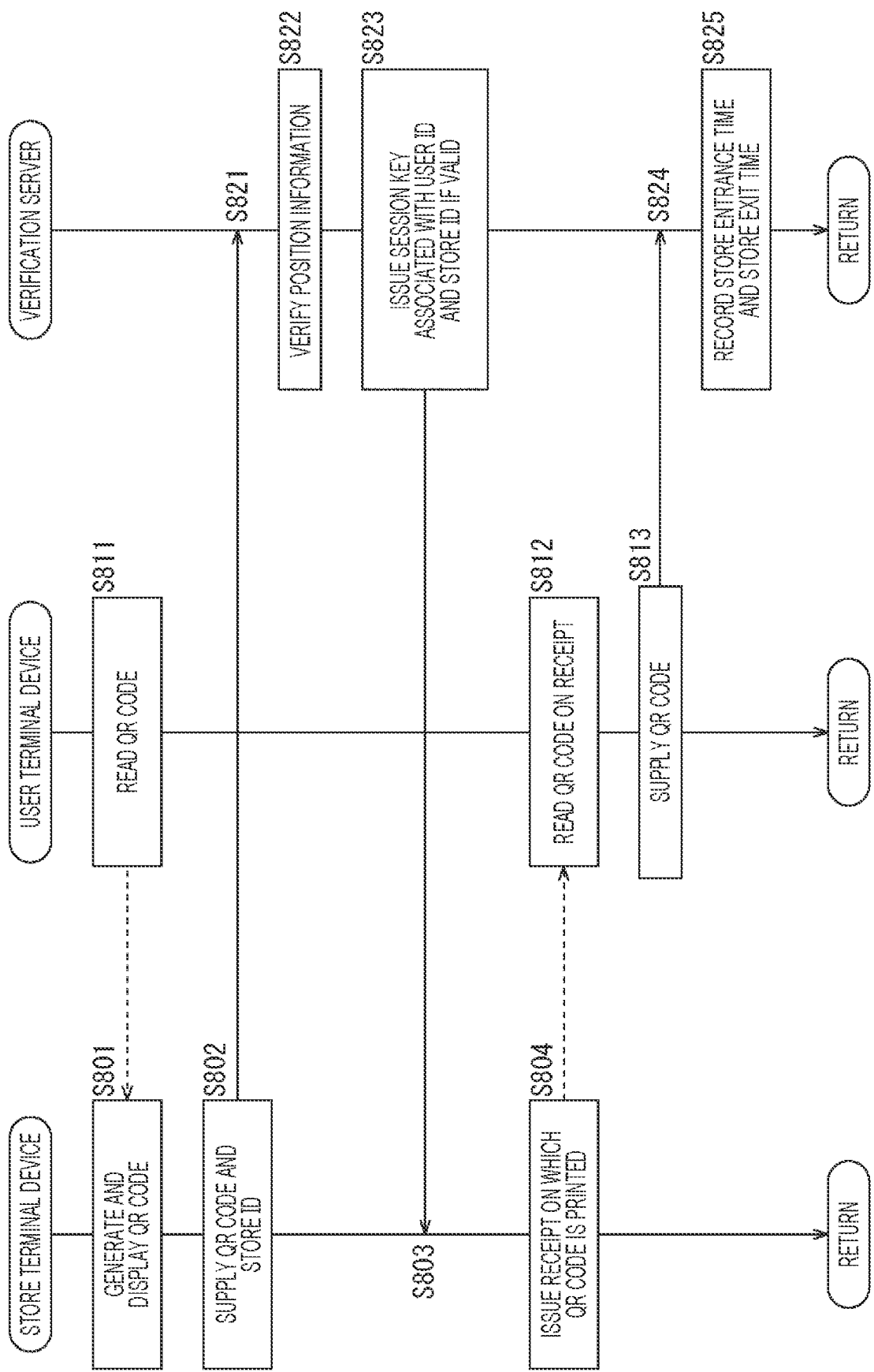

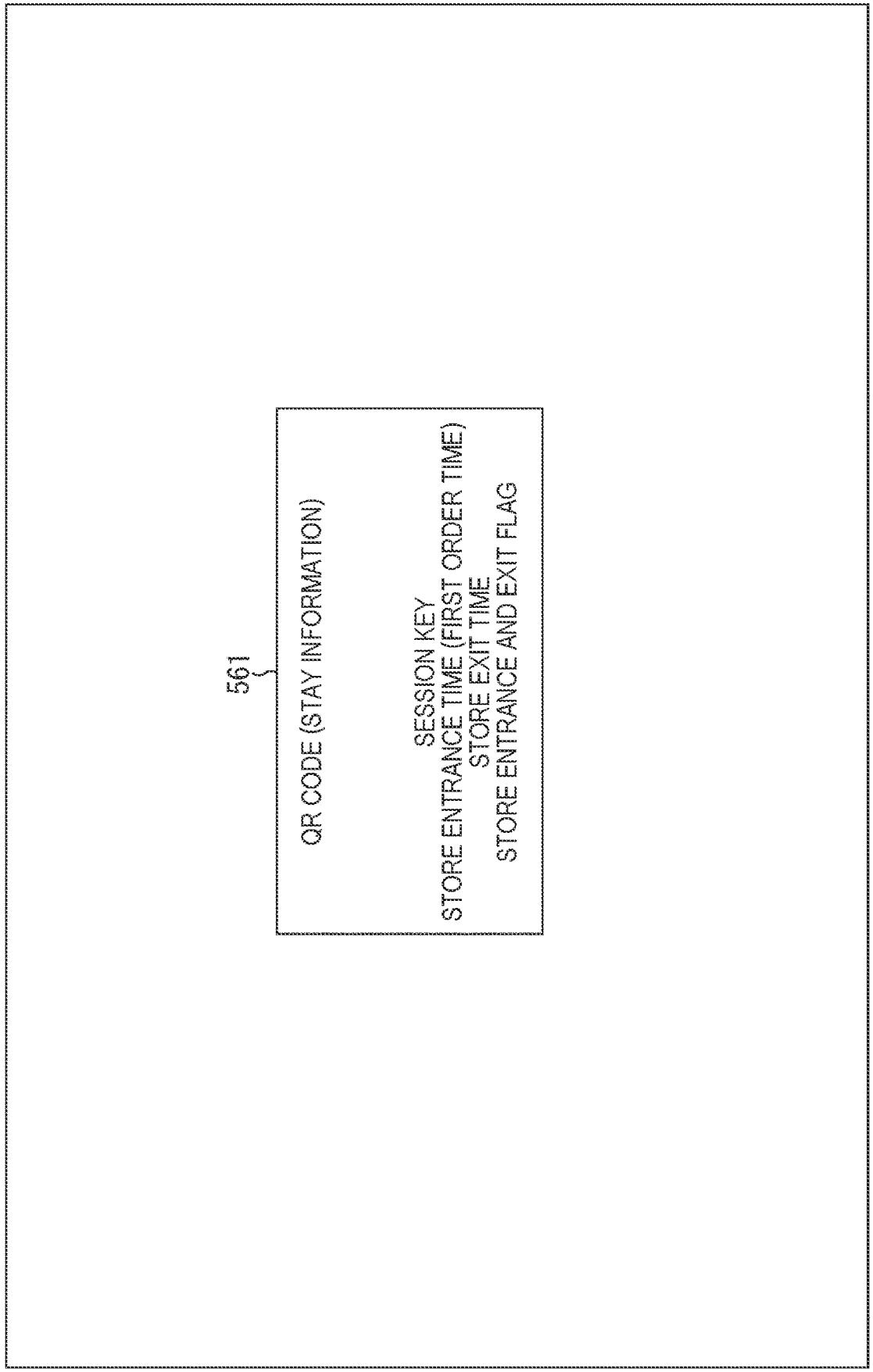

IMAGE PROCESSING THAT PERMITS IMAGING OPERATIONS WITH REFERENCE TO USER INFORMATION

TECHNICAL FIELD

The present disclosure relates to an image processing apparatus and an information processing system, and more particularly, to an image processing apparatus and an information processing system capable of suppressing reduction in reliability of review.

BACKGROUND ART

Conventionally, there has been a posting site (so-called a word-of-mouth site) that accepts and discloses posting of reviews by facility users regarding facilities such as restaurants, lodging facilities, and game facilities. A user of such a posting site can select whether or not to use the facility or select the facility to be used with reference to the published review. The facility side can refer to the review as the opinion of the facility user.

However, in such a service, an unauthorized person who does not use a facility may post a false review using a false captured image as a captured image captured in the facility. Such a false review might reduce the reliability of not only the facility but also all the reviews published on the posting site, that is, the reliability of the evaluation of all the facilities. That is, there is a risk that the reliability of the service of the posting site is reduced.

For example, there is a method in which a captured image and the like is converted into a hash value in a digital camera and the like, and an electronic signature using the hash value is applied to the captured image to be used for detection of tampering (See, for example, Patent Document 1). By applying this technology, falsification of the captured image used for review by a third party can be suppressed.

CITATION LIST

Patent Document

Patent Document 1: Japanese Patent Application Laid-Open No. 2008-22372

SUMMARY OF THE INVENTION

Problems to be Solved by the Invention

However, in this technology, for example, it has been difficult to suppress posting of a false review by a contributor using a captured image captured outside a facility to be reviewed.

The present disclosure makes it possible to suppress a reduction in reliability of review in such a service, for example.

Solutions to Problems

An image processing apparatus according to one aspect of the present technology is an image processing apparatus including: a user information generation unit that generates user information on condition that a session is being established with a provision destination of a captured image; and a providing unit that provides the user information to an information processing device that stores imaging location information.

An image processing apparatus according to another aspect of the present technology is an image processing apparatus including: an acquisition control unit that permits acquisition of imaging location information on the basis of permission information obtained from a provision destination on condition that a session is being established with the provision destination of a captured image; an imaging location information acquisition unit that acquires the imaging location information provided from an information processing device associated with an imaging location in a state permitted by the acquisition control unit; and a providing unit that provides the imaging location information and user information to an external device that verifies the user information.

An information processing system according to still another aspect of the present technology is an information processing system including: an image processing apparatus; a first information processing apparatus; and a second information processing apparatus, in which the image processing apparatus includes: a user information generation unit that generates user information on condition that a session is being established with a provision destination of a captured image; a user information providing unit that provides the user information generated by the user information generation unit to the first information processing apparatus; a captured image valid period information acquisition unit that acquires captured image valid period information provided by the second information processing apparatus and corresponding to the user information provided by the user information providing unit; and an imaging control unit that permits imaging by an imaging unit within a valid period indicated by the captured image valid period information acquired by the captured image valid period information acquisition unit, the first information processing apparatus includes: a user information acquisition unit that acquires the user information provided by the image processing apparatus; and an imaging location information and user information providing unit that provides imaging location information and the user information acquired by the user information acquisition unit to the second information processing apparatus, and the second information processing apparatus includes: an imaging location information and user information acquisition unit that acquires the imaging location information and the user information provided by the first information processing apparatus; a verification unit that verifies the imaging location information and the user information acquired by the imaging location information and user information acquisition unit; and a captured image valid period information providing unit that provides the captured image valid period information corresponding to the imaging location information and the user information to the image processing apparatus in a case where the imaging location information and the user information are determined to be valid as a result of verification by the verification unit.

An information processing system according to still another aspect of the present technology is an information processing system including: an image processing apparatus; a first information processing apparatus; and a second information processing apparatus, in which the image processing apparatus includes: an acquisition control unit that permits acquisition of imaging location information on the basis of permission information obtained from a provision destination on condition that a session is being established with the provision destination of a captured image; an imaging location information acquisition unit that acquires the imaging location information provided from the first information processing apparatus in a state permitted by the acquisition control unit; an imaging location information and user information providing unit that provides the imaging location information acquired by the imaging location information acquisition unit and user information to the second information processing apparatus; a captured image valid period information acquisition unit that acquires captured image valid period information provided by the second information processing apparatus and corresponding to the imaging location information and the user information provided by the imaging location information and user information providing unit; and an imaging control unit that permits imaging by an imaging unit within a valid period indicated by the captured image valid period information acquired by the captured image valid period information acquisition unit, the first information processing apparatus includes: an imaging location information generation unit that generates the imaging location information on condition that a session is being established with the provision destination of the captured image; and an imaging location information providing unit that provides the imaging location information generated by the imaging location information generation unit to the image processing apparatus, and the second information processing apparatus includes: an imaging location information and user information acquisition unit that acquires the imaging location information and the user information provided by the image processing apparatus; a verification unit that verifies the imaging location information and the user information acquired by the imaging location information and user information acquisition unit; and a captured image valid period information providing unit that provides the captured image valid period information corresponding to the imaging location information and the user information to the image processing apparatus in a case where the imaging location information and the user information are determined to be valid as a result of verification by the verification unit.

An information processing system according to still another aspect of the present technology is an information processing system including: an image processing apparatus; a first information processing apparatus; and a second information processing apparatus, in which the image processing apparatus includes: a user information generation unit that generates user information; a user information providing unit that provides the user information generated by the user information generation unit to the first information processing apparatus; a stay information extraction unit that extracts stay information from a receipt on which the stay information including a session key and time information is printed, the session key being issued on the basis of the user information provided by the user information providing unit to the first information processing apparatus and imaging location information; a stay information providing unit that provides the stay information extracted by the stay information extraction unit to the second information processing apparatus; and a captured image providing unit that provides the second information processing apparatus with a captured image generated by imaging by an imaging unit, the first information processing apparatus includes: a user information acquisition unit that acquires the user information provided by the image processing apparatus; an imaging location information and user information providing unit that provides the imaging location information and the user information acquired by the user information acquisition unit to the second information processing apparatus; a session key acquisition unit that acquires the session key provided from the second information processing apparatus; and a receipt issuing unit that issues the receipt on which the stay information including the session key acquired by the session key acquisition unit and the time information is printed, and the second information processing apparatus includes: an imaging location information and user information acquisition unit that acquires the imaging location information and the user information provided from the first information processing apparatus; a verification unit that verifies the imaging location information and the user information acquired by the imaging location information and user information acquisition unit; a session key providing unit that issues the session key corresponding to the imaging location information and the user information and provides the session key to the first information processing apparatus in a case where the imaging location information and the user information are determined to be valid as a result of verification by the verification unit; a stay information acquisition unit that acquires the stay information provided from the image processing apparatus; a captured image acquisition unit that acquires the captured image provided from the image processing apparatus; and a control unit that controls permission to post the captured image acquired by the captured image acquisition unit on the basis of the stay information acquired by the stay information acquisition unit.

In the image processing apparatus according to one aspect of the present technology, user information is generated on condition that a session is being established with a provision destination of a captured image, and the user information is provided to an information processing device that stores imaging location information.

In the image processing apparatus according to another aspect of the present technology, acquisition of imaging location information is permitted on the basis of permission information obtained from a provision destination on condition that a session is being established with the provision destination of a captured image, imaging location information provided from an information processing device associated with an imaging location is acquired in the permitted state, and the imaging location information and user information are provided to an external apparatus that verifies the user information.

In the information processing system according to still another aspect of the present technology, in an image processing apparatus, user information is generated on condition that a session is being established with a provision destination of a captured image, the user information is provided to a first information processing apparatus, captured image valid period information corresponding to the user information provided from a second information processing apparatus is acquired, imaging by an imaging unit within a valid period indicated by the captured image valid period information is permitted, in the first information processing apparatus, the user information provided by the image processing apparatus is acquired, the imaging location information and the user information are provided to the second information processing apparatus, and in the second information processing apparatus, the imaging location information and the user information provided by the first information processing apparatus are acquired, the imaging location information and the user information are verified, and as a result of the verification, in a case where it is determined that the imaging location information and the user information are valid, the captured image valid period information corresponding to the imaging location information and the user information is provided to the image processing apparatus.

In the information processing system according to still another aspect of the present technology, in an image processing apparatus, acquisition of imaging location information is permitted on the basis of permission information obtained from a provision destination on condition that a session is being established with the provision destination of a captured image, the imaging location information provided from a first information processing apparatus is acquired in the permitted state, the imaging location information and user information are provided to a second information processing apparatus, captured image valid period information corresponding to the imaging location information and the user information provided from the second information processing apparatus is acquired, imaging by an imaging unit within a valid period indicated by the acquired captured image valid period information is permitted, in the first information processing apparatus, the imaging location information is generated on condition that a session is being established with the provision destination of the captured image, the generated imaging location information is provided to the image processing apparatus, and in the second information processing apparatus, the imaging location information and the user information provided from the image processing apparatus are acquired, the imaging location information and the user information are verified, and in a case where it is determined that the imaging location information and the user information are valid as a result of the verification, the captured image valid period information corresponding to the imaging location information and the user information is provided to the image processing apparatus.

In the information processing system according to still another aspect of the present technology, in an image processing apparatus, user information is generated, the user information is provided to a first information processing apparatus, stay information is extracted from a receipt on which the stay information including a session key and time information is printed, the session key being issued on the basis of the user information provided to the first information processing apparatus and imaging location information, the stay information is provided to a second information processing apparatus, a captured image generated by imaging by an imaging unit is provided to the second information processing apparatus, in the first information processing apparatus, the user information provided by the image processing apparatus is acquired, the imaging location information and the user information are provided to the second information processing apparatus, a session key provided from the second information processing apparatus is acquired, a receipt on which stay information including the session key and time information is printed is issued, and in the second information processing apparatus, the imaging location information and the user information provided from the first information processing apparatus are acquired, the acquired imaging location information and the user information are verified, in a case where it is determined that the imaging location information and the user information are valid as a result of the verification, a session key corresponding to the imaging location information and the user information is issued and provided to the first information processing apparatus, stay information provided from the image processing apparatus is acquired, the captured image provided from the image processing apparatus is acquired, and permission to post the captured image is controlled on the basis of the acquired stay information.

BRIEF DESCRIPTION OF DRAWINGS

FIG. 49 is a flowchart illustrating an example of a flow of store entrance and exit proof processing.

FIG. 50 is a diagram illustrating an example of information included in a QR code.

MODE FOR CARRYING OUT THE INVENTION

Figure 1:
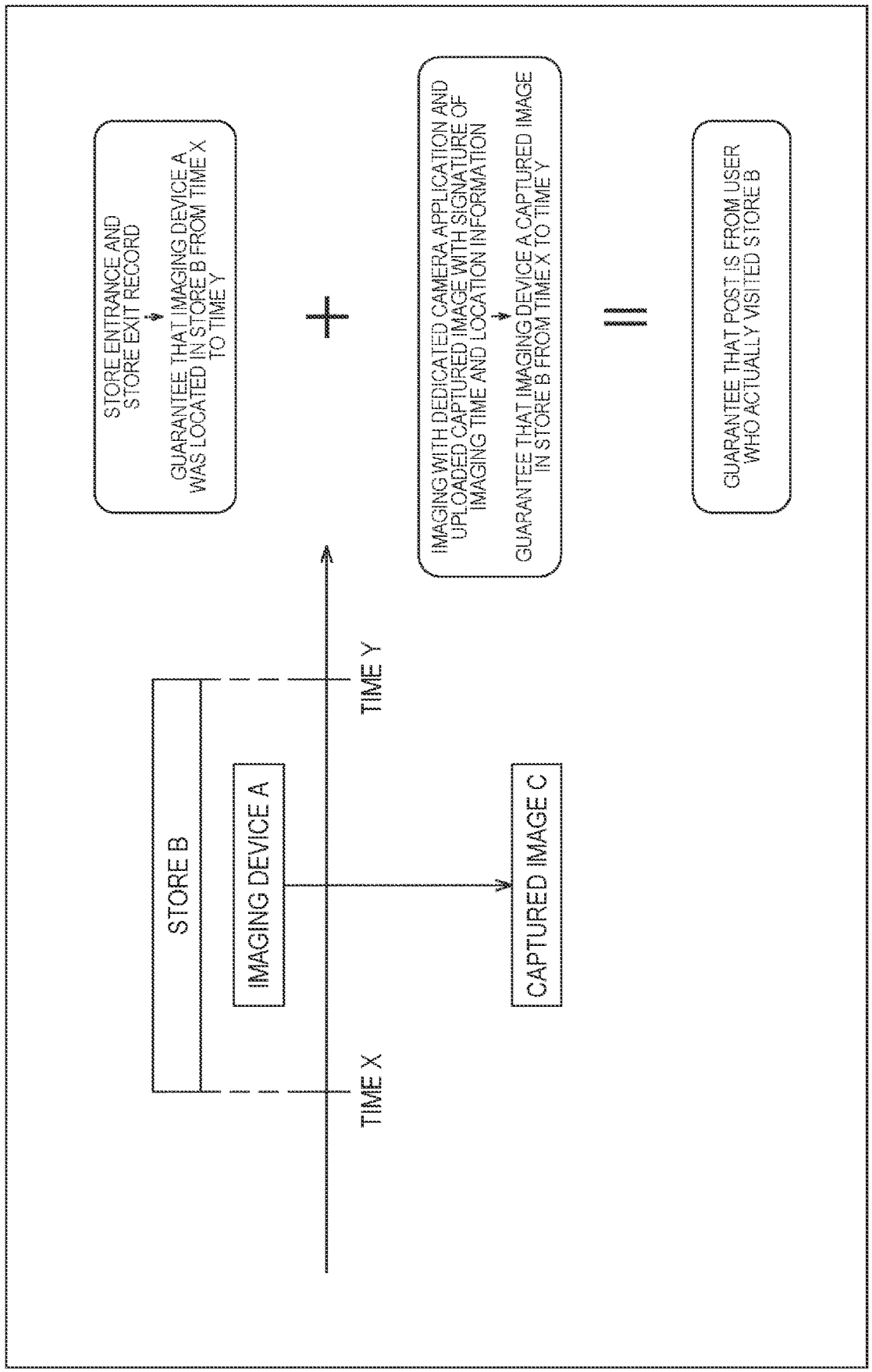
FIG. 1 is a diagram illustrating an example of an outline of a guarantee of an imaging location and an imaging time.

Hereinafter, modes for carrying out the present disclosure (hereinafter referred to as embodiments) will be described. Note that the description will be given in the following order.

1. Guarantee of imaging location and imaging time
2. First embodiment (review system)
3. Second embodiment (review system)
4. Third embodiment (review system)
5. Fourth embodiment (review system)
6. Fifth embodiment (review system)
7. Appendix

1. GUARANTEE OF IMAGING LOCATION AND IMAGING TIME

<Posting Site and False Review>

Conventionally, there has been a posting site (so-called a word-of-mouth site) that accepts and discloses posting of reviews by facility users regarding facilities such as restaurants, lodging facilities, and game facilities. A user of such a posting site can select whether or not to use the facility or select the facility to be used with reference to the published review. The facility side can refer to the review as the opinion of the facility user.

The evaluation point of such a word-of-mouth site is directly linked to the sales of a store, and can be said to be an important index for general customers to select a store. However, in this evaluation point, in general, it has been possible to falsely raise or lower the evaluation by false review. Therefore, it has been required to suppress such an unauthorized operation of evaluation. In each word-of-mouth site, a guideline is provided, or a posted content is searched and deleted before being posted. However, since a user can freely post the posted content, it is difficult to prevent false review in advance.

As one of such false reviews, there is a so-called "Fictitious review" that performs review with high evaluation (or low evaluation) even though it is not actually visited. An unauthorized contributor posts such a fictitious review using a captured image captured outside a facility to be reviewed.

For example, as described in Patent Document 1, there is a method in which a captured image and the like is converted into a hash value in a digital camera and the like, and an electronic signature using the hash value is applied to the captured image to be used for detection of tampering. By applying this technology, falsification of the captured image used for review by a third party can be suppressed. However, with this technology, it has been difficult to suppress posting of a false review by a contributor who is a party using a captured image captured outside a facility to be reviewed. That is, it is difficult to suppress the posting of the fictitious review as described above.

Then, since it is difficult to determine which review among the posted reviews is a fictitious review, it is difficult to take an appropriate measure for the posted fictitious review. That is, in a state where a measure for suppressing posting of fictitious reviews is not performed, reliability of not only the facility but also all reviews published on the posting site, that is, reliability of evaluation of all facilities may be reduced. That is, there is a risk that the reliability of the service of the posting site is reduced.

<Validity Guarantee of Captured Image>

Therefore, by guaranteeing the imaging location and the imaging time of the captured image to be posted, it is guaranteed that the user has actually entered and exited the store and the posted image has been captured at that time. By doing so, in the posting site, it is possible to more easily detect the fictitious review post using the captured image captured in a location other than the facility to be reviewed, and delete or reject the post. That is, such posting of fictitious reviews can be suppressed. Therefore, reduction in reliability of the review can be suppressed. That is, it is possible to suppress a decrease in reliability of the service of the posting site.

2. FIRST EMBODIMENT

<Verification of Store Entrance and Exit and Guarantee of Imaging Time and Imaging Location>

For example, as illustrated in FIG. 1, it is assumed that a user of an imaging device A visits a store B, images goods and the like in the store B to generate a captured image C, generates a review of the store B using the captured image C, and posts the review to a posting site.

In such a case, store entrance time (time X) and store exit time (time Y) of the user (imaging device A) are recorded. Therefore, it is guaranteed that the imaging device A has been located in the store B from time X to time Y. Furthermore, the imaging device A generates the captured image C using dedicated camera application, and uploads the captured image C in association with information on the imaging time and the imaging position. Therefore, the imaging position and the imaging time of the captured image C are guaranteed. Accordingly, it is guaranteed that the captured image C is generated by the imaging device A in the store B from time X to time Y. That is, it is guaranteed that the captured image C is a post by the user who has actually visited the store B.

For example, user information is generated on condition that a session is being established with a provision destination of the captured image, and the user information is provided to an information processing apparatus storing imaging location information. For example, an image processing apparatus includes a user information generation unit that generates user information on condition that a session is being established with a provision destination of a captured image, and a providing unit that provides the user information to an information processing apparatus that stores imaging location information. In this way, it is possible to prove store entrance and store exit, and it is possible to guarantee the imaging location and the imaging time.

<Review System>

Figure 2:
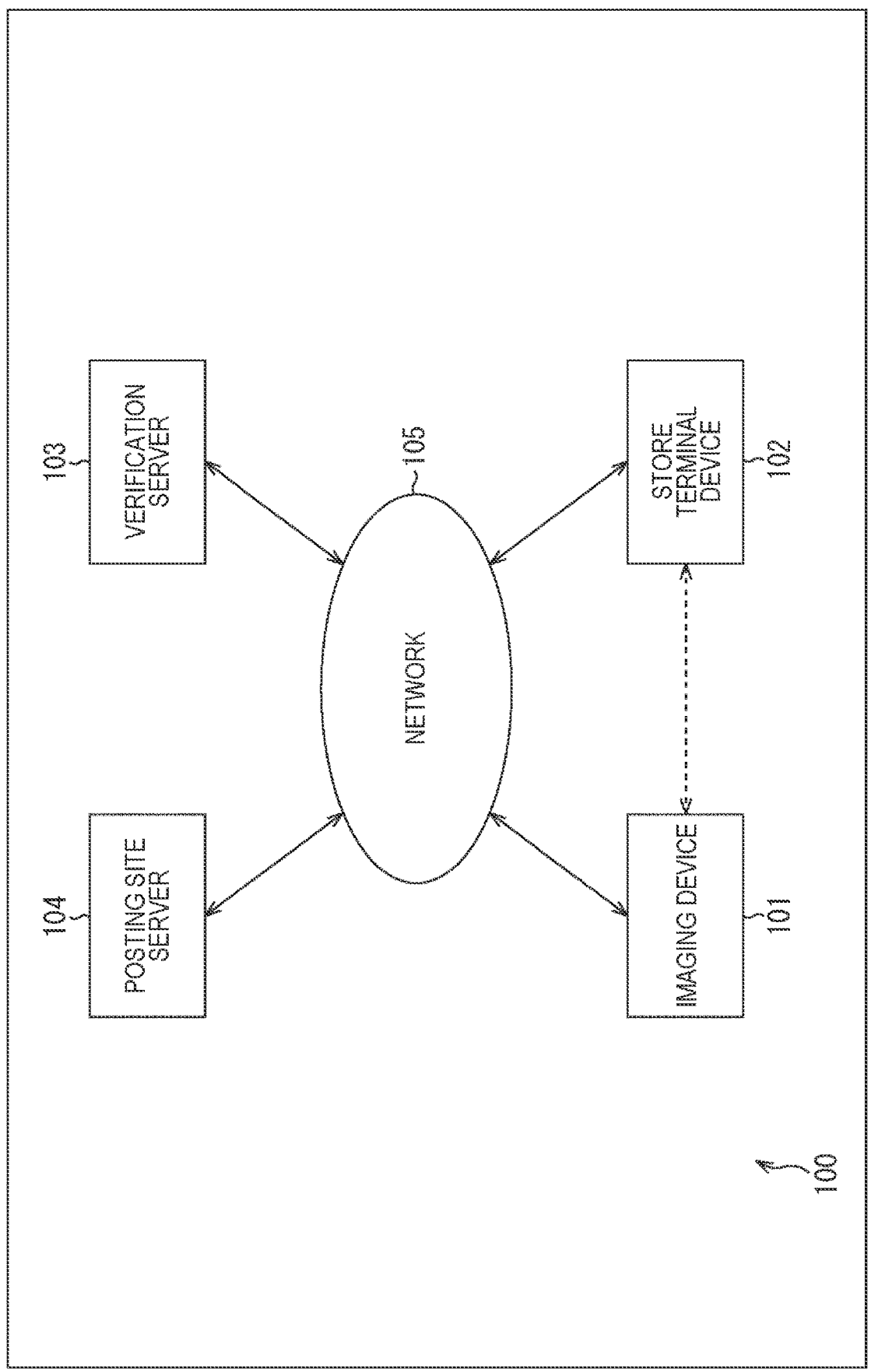
FIG. 2 is a diagram illustrating a main configuration example of a review system.

FIG. 2 is a diagram illustrating a main configuration example of a review system which is an embodiment of an information processing system to which the present technology is applied. A review system 100 illustrated in FIG. 2 is a system in which a user who has visited a store (facility) posts a review for the store using a captured image captured there.

As illustrated in FIG. 2, the review system 100 includes an imaging device 101, a store terminal device 102, a verification server 103, and a posting site server 104. The devices are communicably connected to each other via a network 105. Furthermore, the imaging device 101 and the store terminal device 102 can exchange information using a QR code (registered trademark).

The imaging device 101 is an image processing apparatus owned by a user who posts a review. The user visits a store to be reviewed, captures an image of a subject using the imaging device 101 in the store, and generates a captured image to be used for review. The imaging device 101 has a communication function, and can supply the captured image to the verification server 103 and the like using the communication function. The imaging device 101 has a display function, and can display a QR code and the like using the display function.

The store terminal device 102 is an information processing device installed in a store visited by a user of the imaging device 101. The store terminal device 102 has a communication function, and can supply location information indicating a location of the store to the verification server 103 and the like using the communication function. The store terminal device 102 includes a reader that reads the QR code, and can read information indicated by the QR code displayed by the imaging device 101 using the reader.

The verification server 103 is an external device when viewed from the imaging device 101, and is a server that verifies various types of information. The verification server 103 has a communication function, and can verify the information supplied from the imaging device 101 or the store terminal device 102 using the communication function and return a verification result.

The posting site server 104 is a destination of a captured image as viewed from the imaging device 101, and is a server that provides a service of a posting site. The posting site server 104 has a communication function, and accepts posts of reviews from the imaging device 101 and the like using the communication function. The posting site server 104 uses the communication function to disclose the posted review.

The network 105 is a communication network including an arbitrary communication medium. Communication performed via the network 105 may be wired communication, wireless communication, or both. That is, the network 105 may be a communication network for wired communication, a communication network for wireless communication, or a communication network including both of them. Furthermore, the network 105 may include a single communication network or a plurality of communication networks.

For example, the Internet may be included in the network 105. Furthermore, a public telephone network may be included in the network 105. Moreover, the network 105 may include a wide-area communication network for a wireless mobile body such as a so-called 3G line, a 4G line, or a 5G line. Furthermore, a wide area network (WAN), a local area network (LAN), and the like may be included in the network 105. Moreover, the network 105 may include a wireless communication network that performs communication conforming to the Bluetooth (registered trademark) standard. Furthermore, a communication path of near field communication such as near field communication (NFC) may be included in the network 105. Moreover, a communication path for infrared communication may be included in the network 105. Furthermore, a communication network for wired communication conforming to a standard such as High-Definition Multimedia Interface (HDMI) (registered trademark) or Universal Serial Bus (USB) (registered trademark) may be included in the network 105. As described above, the network 105 may include a communication network or a communication path of an arbitrary communication standard.

Note that the verification server 103 and the posting site server 104 may be integrally configured as one server (information processing device).

The review system 100 performs store entrance proof processing that is processing of proving that the user has entered the store and store exit proof processing that is processing of proving that the user has exited the store. On the basis of these processes, imaging is permitted until the user exits the store after entering the store. Furthermore, the imaging device 101 supplies the user information to the store terminal device 102 using the QR code. The store terminal device 102 performs the store entrance proof processing and the store exit proof processing using the user information and the location information indicating the location of the store.

With such processing, it is guaranteed that the user has captured an image and generated a captured image in the store before actually entering and exiting the store.

For example, in an information processing system (for example, the review system 100) including an image processing apparatus (for example, the imaging device 101), a first information processing apparatus (for example, the store terminal device 102), and a second information processing apparatus (for example, the verification server 103), the image processing apparatus may include: a user information generation unit that generates user information on condition that a session is being established with a provision destination (for example, the posting site server 104) of a captured image; a user information providing unit that provides the user information generated by the user information generation unit to the first information processing apparatus; a captured image valid period information acquisition unit that acquires captured image valid period information corresponding to the user information provided by the user information providing unit and provided by the second information processing apparatus; and an imaging control unit that permits imaging by an imaging unit within a valid period indicated by the captured image valid period information acquired by the captured image valid period information acquisition unit. A first information processing apparatus may include: a user information acquisition unit that acquires the user information provided from the image processing apparatus; and an imaging location information and user information providing unit that provides imaging location information and the user information acquired by the user information acquisition unit to the second information processing apparatus. The second information processing apparatus may include: an imaging location information and user information acquisition unit that acquires the imaging location information and the user information provided from the first information processing apparatus; a verification unit that verifies the imaging location information and the user information acquired by the imaging location information and user information acquisition unit; and a captured image valid period information providing unit that provides, in a case where the imaging location information and the user information are determined to be valid as a result of verification by the verification unit, the captured image valid period information corresponding to the imaging location information and the user information to the image processing apparatus.

<Imaging Device>

Figure 3:
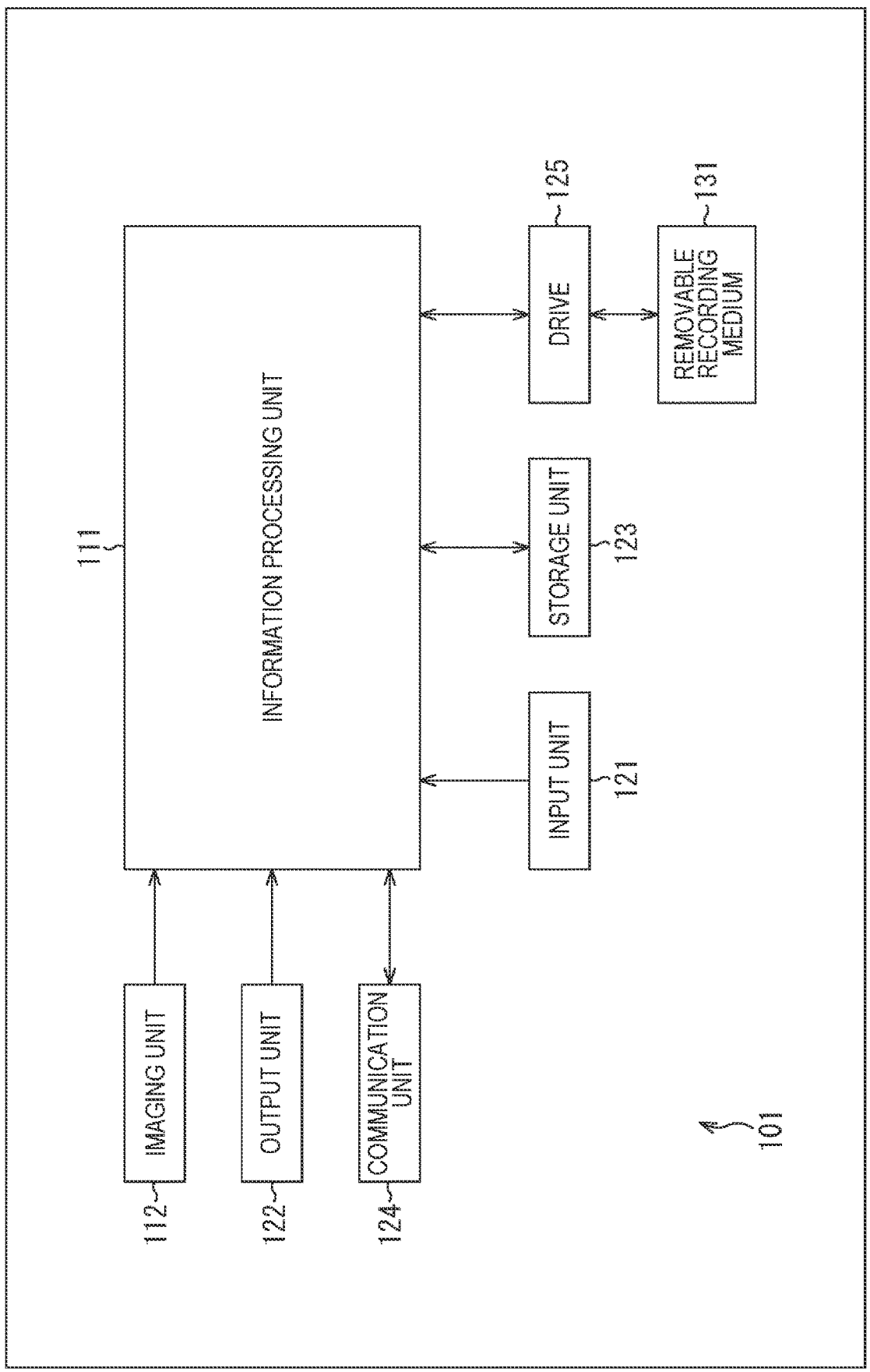
FIG. 3 is a block diagram illustrating a main configuration example of an imaging device.

FIG. 3 is a diagram illustrating a main configuration example of the imaging device 101 which is an embodiment of an image processing apparatus to which the present technology is applied. As illustrated in FIG. 3, the imaging device 101 includes an information processing unit 111, an imaging unit 112, an input unit 121, an output unit 122, a storage unit 123, a communication unit 124, and a drive 125.

The information processing unit 111 includes, for example, a central processing unit (CPU), a read only memory (ROM), a random access memory (RAM), and the like, and is a computer that can realize various functions by executing an application program (software) using the CPU, the ROM, the RAM, and the like. For example, the information processing unit 111 can install and execute an application program (software) that performs processing related to imaging for generating a captured image used for posting a review. Here, the computer includes a computer incorporated in dedicated hardware, a general-purpose personal computer capable of executing various functions by installing various programs, and the like, for example.

The imaging unit 112 includes an optical system, an image sensor, and the like, and can image a subject and generate a captured image. The imaging unit 112 can supply the generated captured image to the information processing unit 111.

The input unit 121 includes, for example, input devices such as a keyboard, a mouse, a microphone, a touch panel, and an input terminal, and can supply information input via these input devices to the information processing unit 111.

The output unit 122 includes, for example, output devices such as a display (display unit), a speaker (audio output unit), and an output terminal, and can output the information supplied from the information processing unit 111 via these output devices.

The storage unit 123 includes, for example, a storage medium such as a hard disk, a RAM disk, or a non-volatile memory, and can store the information supplied from the information processing unit 111 in the storage medium. The storage unit 123 can read information stored in the storage medium and supply the information to the information processing unit 111.

The communication unit 124 includes, for example, a network interface, can receive information transmitted from another device via the network 105, and can supply the received information to the information processing unit 111. The communication unit 124 can transmit the information supplied from the information processing unit 111 to another device via the network 105.

The drive 125 has an interface of a removable recording medium 131 such as a magnetic disk, an optical disk, a magneto-optical disk, or a semiconductor memory, and can read information recorded on the removable recording medium 131 attached thereto and supply the information to the information processing unit 111. The drive 125 can record the information supplied from the information processing unit 111 in the writable removable recording medium 131 attached to itself.

For example, the information processing unit 111 loads and executes an application program stored in the storage unit 123. At that time, the information processing unit 111 can appropriately store data and the like necessary for executing various types of processing. The application program, data, and the like can be provided by being recorded in the removable recording medium 131 as a package medium and the like, for example. In that case, the application program, data, and the like are read by the drive 125 to which the removable recording medium 131 is attached, and are installed in the storage unit 123 via the information processing unit 111. Furthermore, the application program can also be provided via a wired or wireless transmission medium such as a local area network, the Internet, or digital satellite broadcasting. In this case, the application program, the data, and the like are received by the communication unit 124 and installed in the storage unit 123 via the information processing unit 111. Furthermore, the application program, data, and the like can be installed in advance in the ROM or the storage unit 123 in the information processing unit 111.

<Functional Block of Imaging Device>

Figure 4:
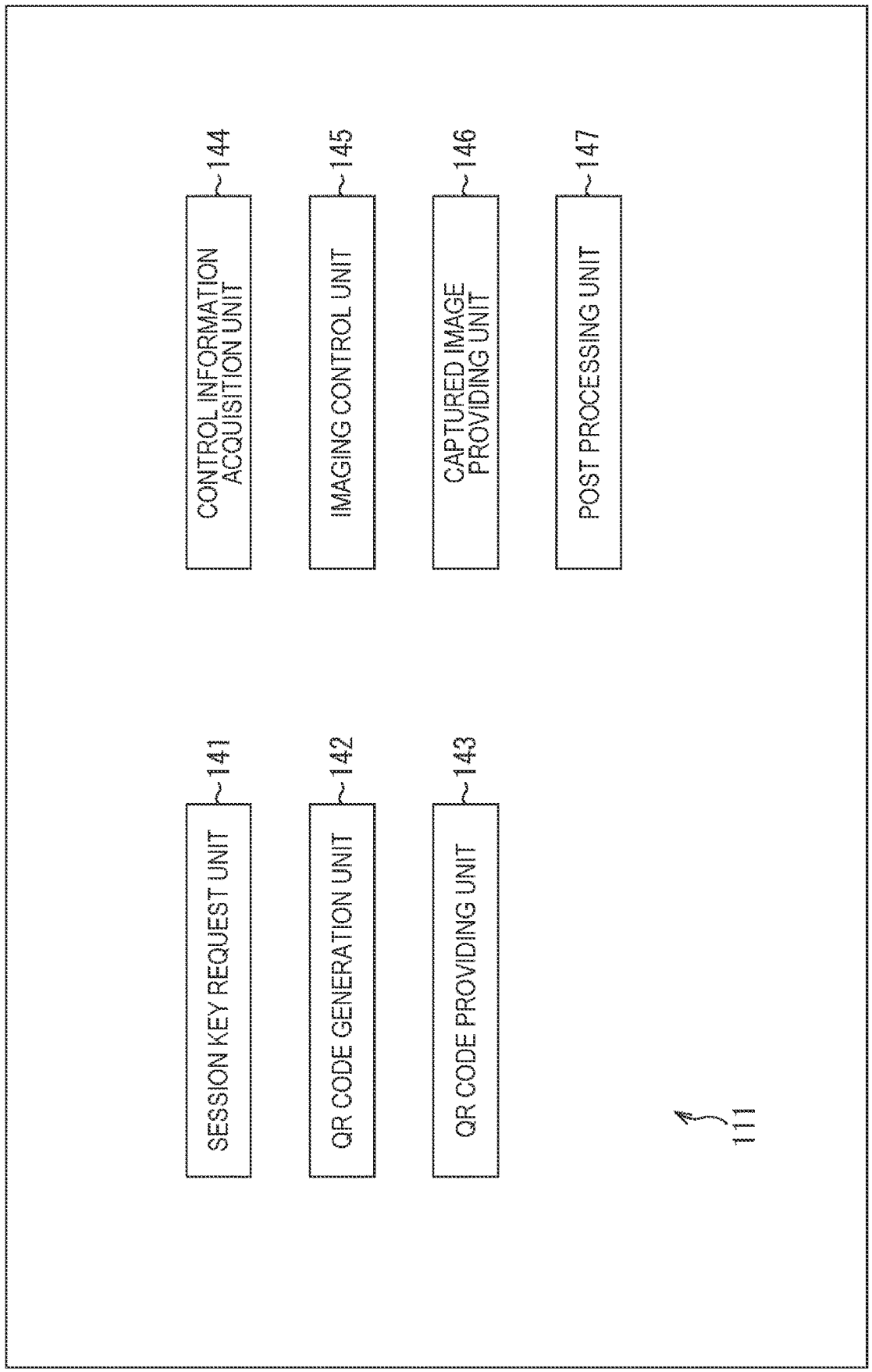
FIG. 4 is a functional block diagram illustrating functions implemented in the imaging device.

A function implemented by the information processing unit 111 executing the application program is illustrated in FIG. 4 as a functional block. As illustrated in FIG. 4, the information processing unit 111 can include a session key request unit 141, a QR code generation unit 142, a QR code providing unit 143, a control information acquisition unit 144, an imaging control unit 145, a captured image providing unit 146, and a post processing unit 147 as functional blocks by executing an application program.

The session key request unit 141 performs processing related to a request for a session key. The QR code generation unit 142 performs processing related to generation of a QR code. The QR code providing unit 143 performs processing related to provision of the QR code. The control information acquisition unit 144 performs processing related to acquisition of control information. The imaging control unit 145 performs processing related to control of the imaging unit 112. The captured image providing unit 146 performs processing related to provision of the captured image generated by the imaging unit 112. The post processing unit 147 performs processing related to review posting.

<Store Terminal Device>

Figure 5:
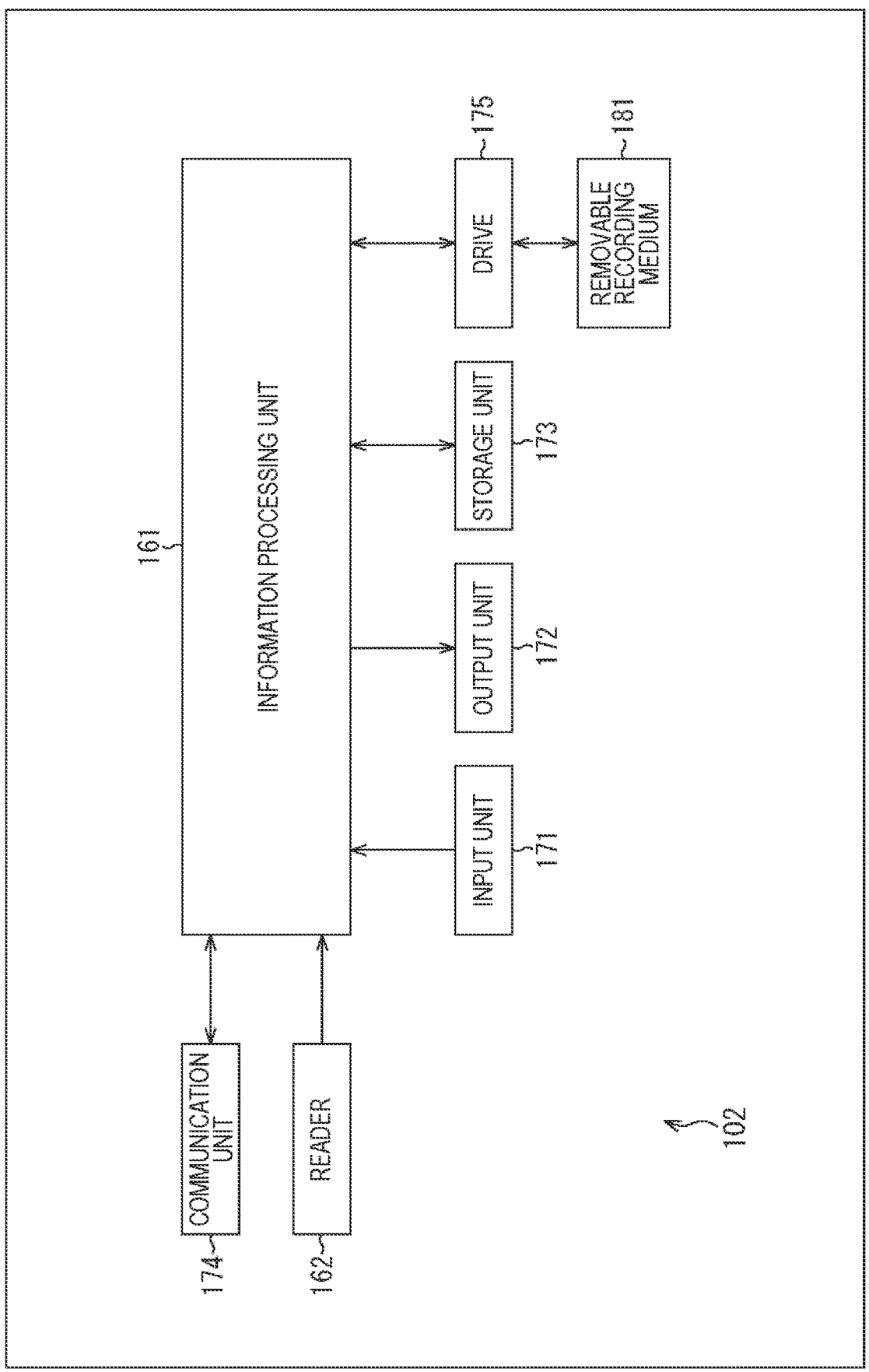
FIG. 5 is a block diagram illustrating a main configuration example of a store terminal device.

FIG. 5 is a diagram illustrating a main configuration example of the store terminal device 102 which is an embodiment of an image processing apparatus to which the present technology is applied. As illustrated in FIG. 5, the store terminal device 102 includes an information processing unit 161, a reader 162, an input unit 171, an output unit 172, a storage unit 173, a communication unit 174, and a drive 175.

The information processing unit 161 is a computer that includes, for example, a CPU, a ROM, a RAM, and the like, and can implement various functions by executing an application program (software) using the CPU, the ROM, the RAM, and the like. For example, the information processing unit 161 can install and execute an application program (software) that performs processing related to proof of store entrance and store exit of a user.

The reader 162 includes an optical system, an image sensor, and the like, and can read a QR code (that is, the information indicated by the QR code). The reader 162 can supply the read information to the information processing unit 161.

The input unit 171 includes, for example, input devices such as a keyboard, a mouse, a microphone, a touch panel, and an input terminal, and can supply information input via these input devices to the information processing unit 161.

The output unit 172 includes, for example, output devices such as a display (display unit), a speaker (audio output unit), and an output terminal, and can output the information supplied from the information processing unit 161 via these output devices.

The storage unit 173 includes, for example, a storage medium such as a hard disk, a RAM disk, or a non-volatile memory, and can store the information supplied from the information processing unit 161 in the storage medium. The storage unit 173 can read information stored in the storage medium and supply the information to the information processing unit 161.

The communication unit 174 includes, for example, a network interface, can receive information transmitted from another device via the network 105, and can supply the received information to the information processing unit 161. The communication unit 174 can transmit the information supplied from the information processing unit 161 to another device via the network 105.

The drive 175 has an interface of a removable recording medium 181 such as a magnetic disk, an optical disk, a magneto-optical disk, or a semiconductor memory, and can read information recorded on the removable recording medium 181 attached thereto and supply the information to the information processing unit 161. The drive 175 can record the information supplied from the information processing unit 161 in the writable removable recording medium 181 attached to itself.

For example, the information processing unit 161 loads and executes an application program stored in the storage unit 173. At that time, the information processing unit 161 can appropriately store data and the like necessary for executing various types of processing. The application program, data, and the like can be provided by being recorded in the removable recording medium 181 as a package medium and the like, for example. In that case, the application program, data, and the like are read by the drive 175 to which the removable recording medium 181 is attached, and are installed in the storage unit 173 via the information processing unit 161. Furthermore, the application program can also be provided via a wired or wireless transmission medium such as a local area network, the Internet, or digital satellite broadcasting. In this case, the application program, the data, and the like are received by the communication unit 174 and installed in the storage unit 173 via the information processing unit 161. Furthermore, the application program, data, and the like can be installed in advance in the ROM or the storage unit 173 in the information processing unit 161.

<Functional Block of Store Terminal Device>

Figure 6:
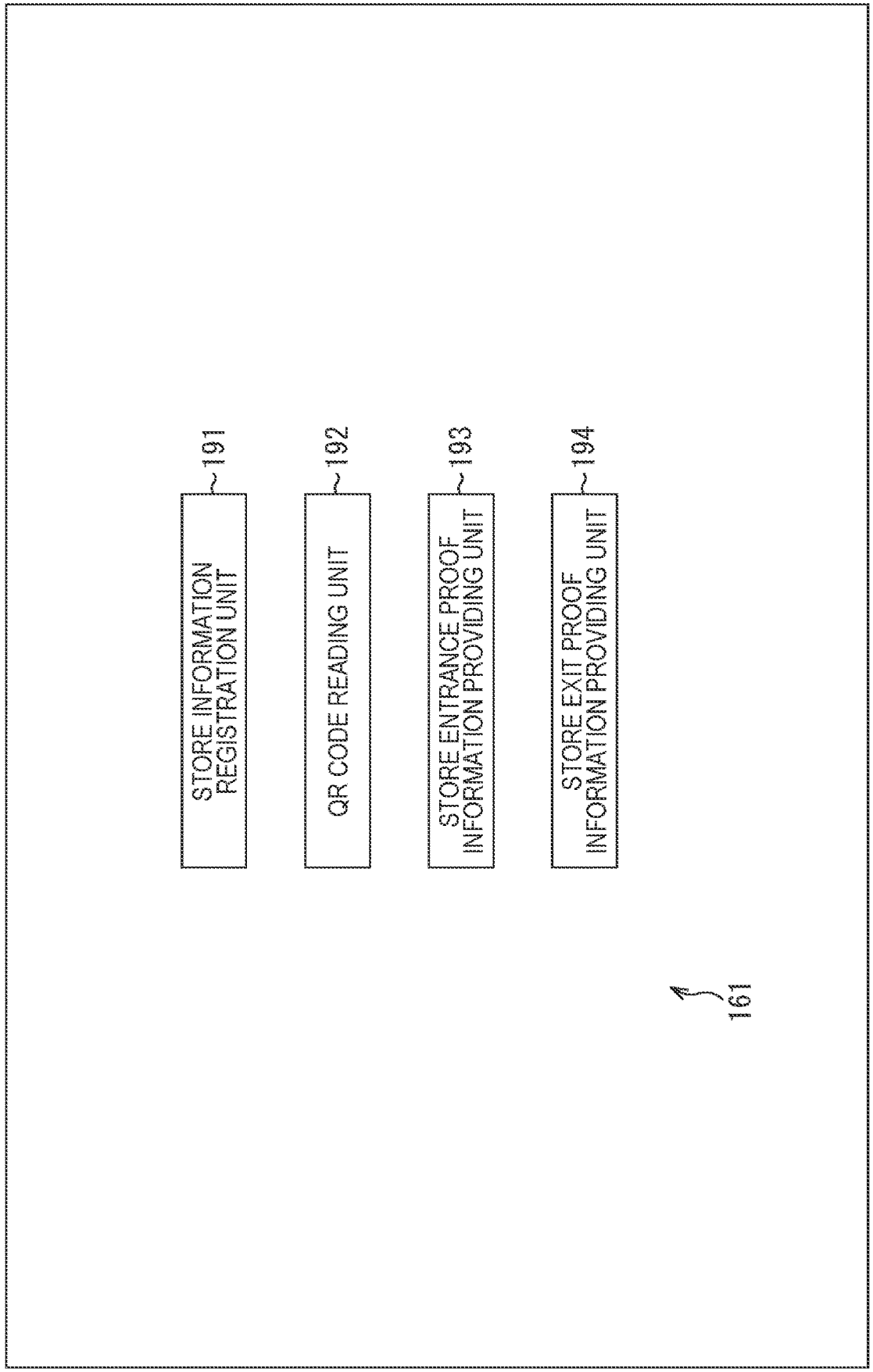
FIG. 6 is a functional block diagram illustrating functions implemented in the store terminal device.

A function implemented by the information processing unit 161 executing the application program is illustrated in FIG. 6 as a functional block. As illustrated in FIG. 6, the information processing unit 161 can include a store information registration unit 191, a QR code reading unit 192, a store entrance proof information providing unit 193, and a store exit proof information providing unit 194 as functional blocks by executing an application program.

The store information registration unit 191 performs processing related to registration of store information which is information regarding a store. The QR code reading unit 192 performs processing related to reading of a QR code. The store entrance proof information providing unit 193 performs processing related to provision of the store entrance proof information which is information for proving user's entrance into the store. The store exit proof information providing unit 194 performs processing related to the provision of the store exit proof information which is information proving user's exit from the store.

<Verification Server>

Figure 7:
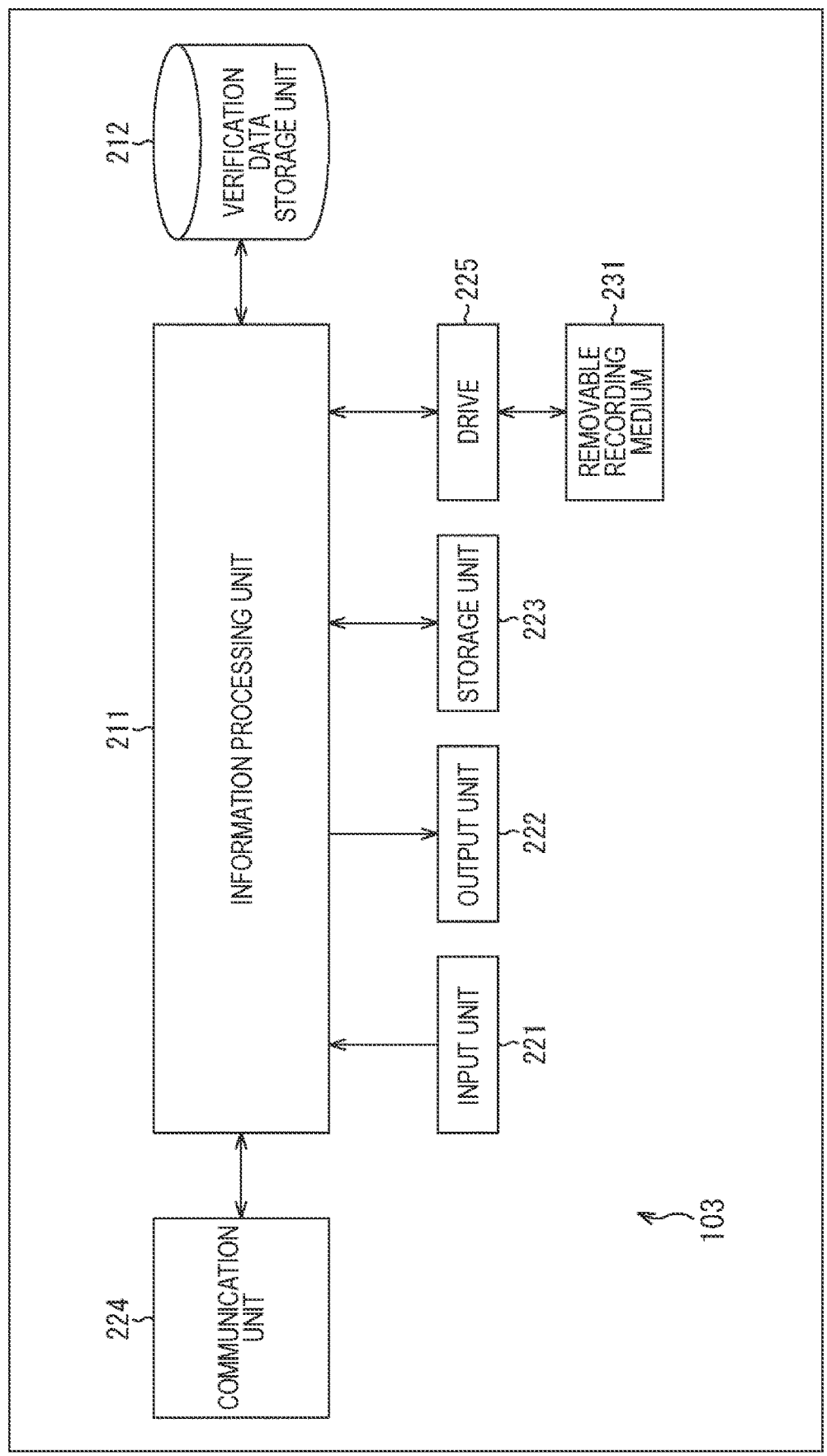
FIG. 7 is a block diagram illustrating a main configuration example of a verification server.

FIG. 7 is a diagram illustrating a main configuration example of the verification server 103 which is an embodiment of an image processing apparatus to which the present technology is applied. As illustrated in FIG. 7, the verification server 103 includes an information processing unit 211, a verification data storage unit 212, an input unit 221, an output unit 222, a storage unit 223, a communication unit 224, and a drive 225.

The information processing unit 211 is a computer that includes, for example, a CPU, a ROM, a RAM, and the like, and can implement various functions by executing an application program (software) using the CPU, the ROM, the RAM, and the like. For example, the information processing unit 211 can install and execute an application program (software) that performs processing related to verification of various types of information.

The verification data storage unit 212 includes, for example, a storage medium such as a hard disk, a RAM disk, or a non-volatile memory, and can store the verification data, which is information used for verification and supplied from the information processing unit 211, in the storage medium. The verification data storage unit 212 can read the verification data stored in the storage medium and supply the verification data to the information processing unit 211.

The input unit 221 includes, for example, input devices such as a keyboard, a mouse, a microphone, a touch panel, and an input terminal, and can supply information input via these input devices to the information processing unit 211.

The output unit 222 includes, for example, output devices such as a display (display unit), a speaker (audio output unit), and an output terminal, and can output the information supplied from the information processing unit 211 via these output devices.

The storage unit 223 includes, for example, a storage medium such as a hard disk, a RAM disk, or a non-volatile memory, and can store the information supplied from the information processing unit 211 in the storage medium. The storage unit 223 can read information stored in the storage medium and supply the information to the information processing unit 211.

The communication unit 224 includes, for example, a network interface, can receive information transmitted from another device via the network 105, and can supply the received information to the information processing unit 211. The communication unit 224 can transmit the information supplied from the information processing unit 211 to another device via the network 105.

The drive 225 has an interface of a removable recording medium 231 such as a magnetic disk, an optical disk, a magneto-optical disk, or a semiconductor memory, and can read information recorded on the removable recording medium 231 attached thereto and supply the information to the information processing unit 211. The drive 225 can record the information supplied from the information processing unit 211 in the writable removable recording medium 231 attached to itself.

For example, the information processing unit 211 loads and executes an application program stored in the storage unit 223. At that time, the information processing unit 211 can appropriately store data and the like necessary for executing various types of processing. The application program, data, and the like can be provided by being recorded in the removable recording medium 231 as a package medium and the like, for example. In that case, the application program, data, and the like are read by the drive 225 to which the removable recording medium 231 is attached, and are installed in the storage unit 223 via the information processing unit 211. Furthermore, the application program can also be provided via a wired or wireless transmission medium such as a local area network, the Internet, or digital satellite broadcasting. In this case, the application program, the data, and the like are received by the communication unit 224 and installed in the storage unit 223 via the information processing unit 211. Furthermore, the application program, data, and the like can be installed in advance in the ROM or the storage unit 223 in the information processing unit 211.

<Functional Block of Verification Server>

Figure 8:
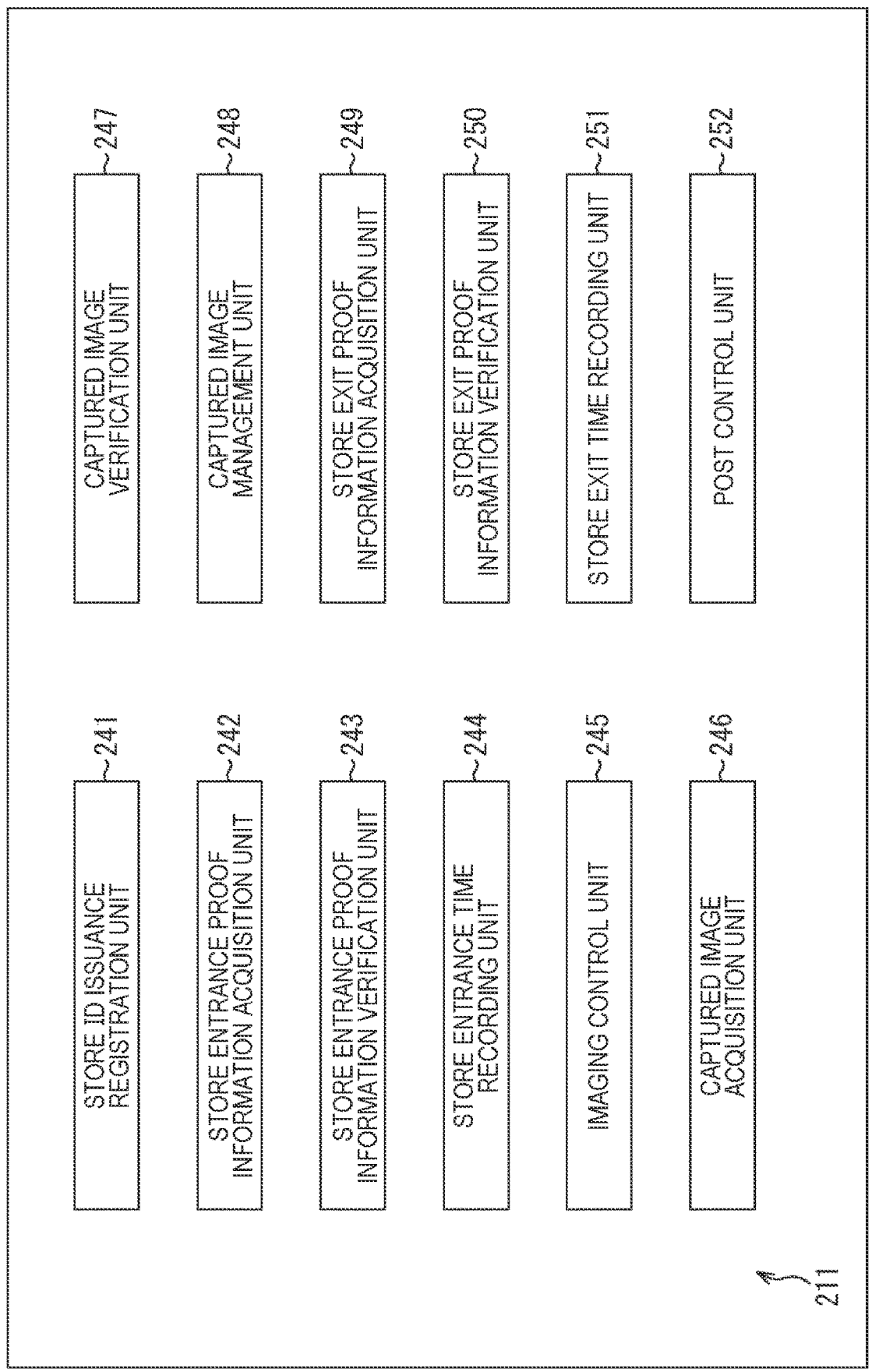
FIG. 8 is a functional block diagram illustrating functions implemented in the verification server.

A function implemented by the information processing unit 211 executing the application program is illustrated in FIG. 8 as a functional block. As illustrated in FIG. 8, the information processing unit 211 can include, as functional blocks, a store ID issuance registration unit 241, a store entrance proof information acquisition unit 242, a store entrance proof information verification unit 243, a store entrance time recording unit 244, an imaging control unit 245, a captured image acquisition unit 246, a captured image verification unit 247, a captured image management unit 248, a store exit proof information acquisition unit 249, a store exit proof information verification unit 250, a store exit time recording unit 251, and a post control unit 252 by executing an application program.

The store ID issuance registration unit 241 performs processing related to issuance and registration of a store ID that is identification information of a store. The store entrance proof information acquisition unit 242 performs processing related to acquisition of store entrance proof information. The store entrance proof information verification unit 243 performs processing related to verification of the store entrance proof information. The store entrance time recording unit 244 performs processing related to recording of store entrance time which is the time when the user enters the store. The imaging control unit 245 performs processing related to control of imaging by the imaging device 101. The captured image acquisition unit 246 performs processing related to acquisition of a captured image. The captured image verification unit 247 performs processing related to verification of the captured image. The captured image management unit 248 performs processing related to management of the captured images. The store exit proof information acquisition unit 249 performs processing related to acquisition of store exit proof information. The store exit proof information verification unit 250 performs processing related to verification of the store exit proof information. The store exit time recording unit 251 performs processing related to recording of store exit time which is the time when the user has exited the store. The post control unit 252 performs processing related to control of review posting.

<Posting Site Server>

Figure 9:
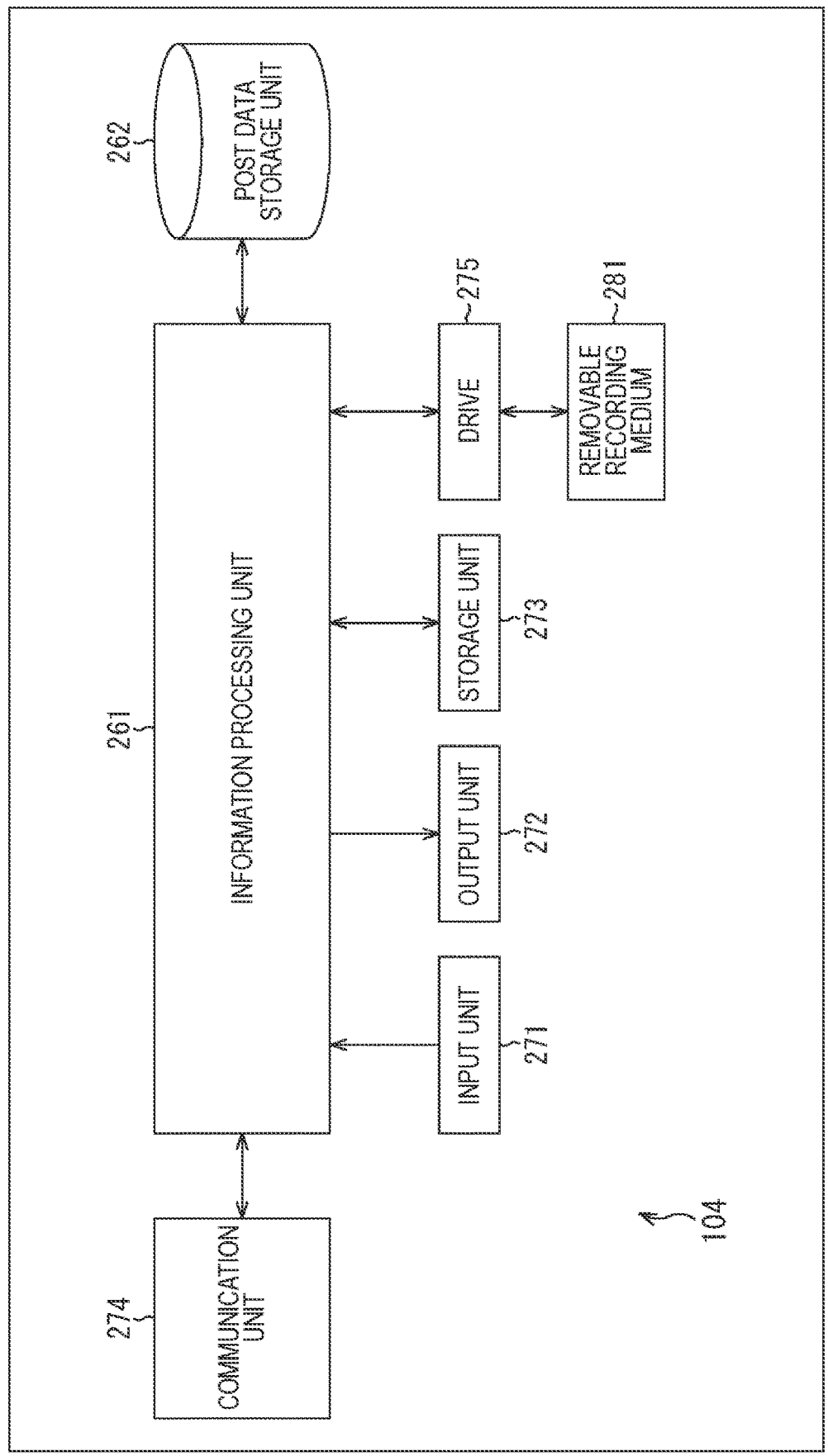
FIG. 9 is a block diagram illustrating a main configuration example of a posting site server.

FIG. 9 is a diagram illustrating a main configuration example of the posting site server 104 which is an embodiment of an image processing apparatus to which the present technology is applied. As illustrated in FIG. 9, the posting site server 104 includes an information processing unit 261, a post data storage unit 262, an input unit 271, an output unit 272, a storage unit 273, a communication unit 274, and a drive 275.

The information processing unit 261 is a computer that includes, for example, a CPU, a ROM, a RAM, and the like, and can implement various functions by executing an application program (software) using the CPU, the ROM, the RAM, and the like. For example, the information processing unit 261 can install and execute an application program (software) that performs processing related to verification of various types of information.

The post data storage unit 262 includes, for example, a storage medium such as a hard disk, a RAM disk, or a non-volatile memory, and can store posted data, which is information such as a posted captured image or review, supplied from the information processing unit 261, in the storage medium. The post data storage unit 262 can read the posted data stored in the storage medium and supply the posted data to the information processing unit 261.

The input unit 271 includes, for example, input devices such as a keyboard, a mouse, a microphone, a touch panel, and an input terminal, and can supply information input via these input devices to the information processing unit 261.

The output unit 272 includes, for example, output devices such as a display (display unit), a speaker (audio output unit), and an output terminal, and can output the information supplied from the information processing unit 261 via these output devices.

The storage unit 273 includes, for example, a storage medium such as a hard disk, a RAM disk, or a non-volatile memory, and can store the information supplied from the information processing unit 261 in the storage medium. The storage unit 273 can read information stored in the storage medium and supply the information to the information processing unit 261.

The communication unit 274 includes, for example, a network interface, can receive information transmitted from another device via the network 105, and can supply the received information to the information processing unit 261. The communication unit 274 can transmit the information supplied from the information processing unit 261 to another device via the network 105.

The drive 275 has an interface of a removable recording medium 281 such as a magnetic disk, an optical disk, a magneto-optical disk, or a semiconductor memory, and can read information recorded on the removable recording medium 281 attached thereto and supply the information to the information processing unit 261. The drive 275 can record the information supplied from the information processing unit 261 in the writable removable recording medium 281 attached to itself.

For example, the information processing unit 261 loads and executes an application program stored in the storage unit 273. At that time, the information processing unit 261 can appropriately store data and the like necessary for executing various types of processing. The application program, data, and the like can be provided by being recorded in the removable recording medium 281 as a package medium or the like, for example. In that case, the application program, data, and the like are read by the drive 275 to which the removable recording medium 281 is attached, and are installed in the storage unit 273 via the information processing unit 261. Furthermore, the application program can also be provided via a wired or wireless transmission medium such as a local area network, the Internet, or digital satellite broadcasting. In this case, the application program, the data, and the like are received by the communication unit 274 and installed in the storage unit 273 via the information processing unit 261. Furthermore, the application program, data, and the like can be installed in advance in the ROM or the storage unit 273 in the information processing unit 261.

<Functional Block of Posting Site Server>

Figure 10:
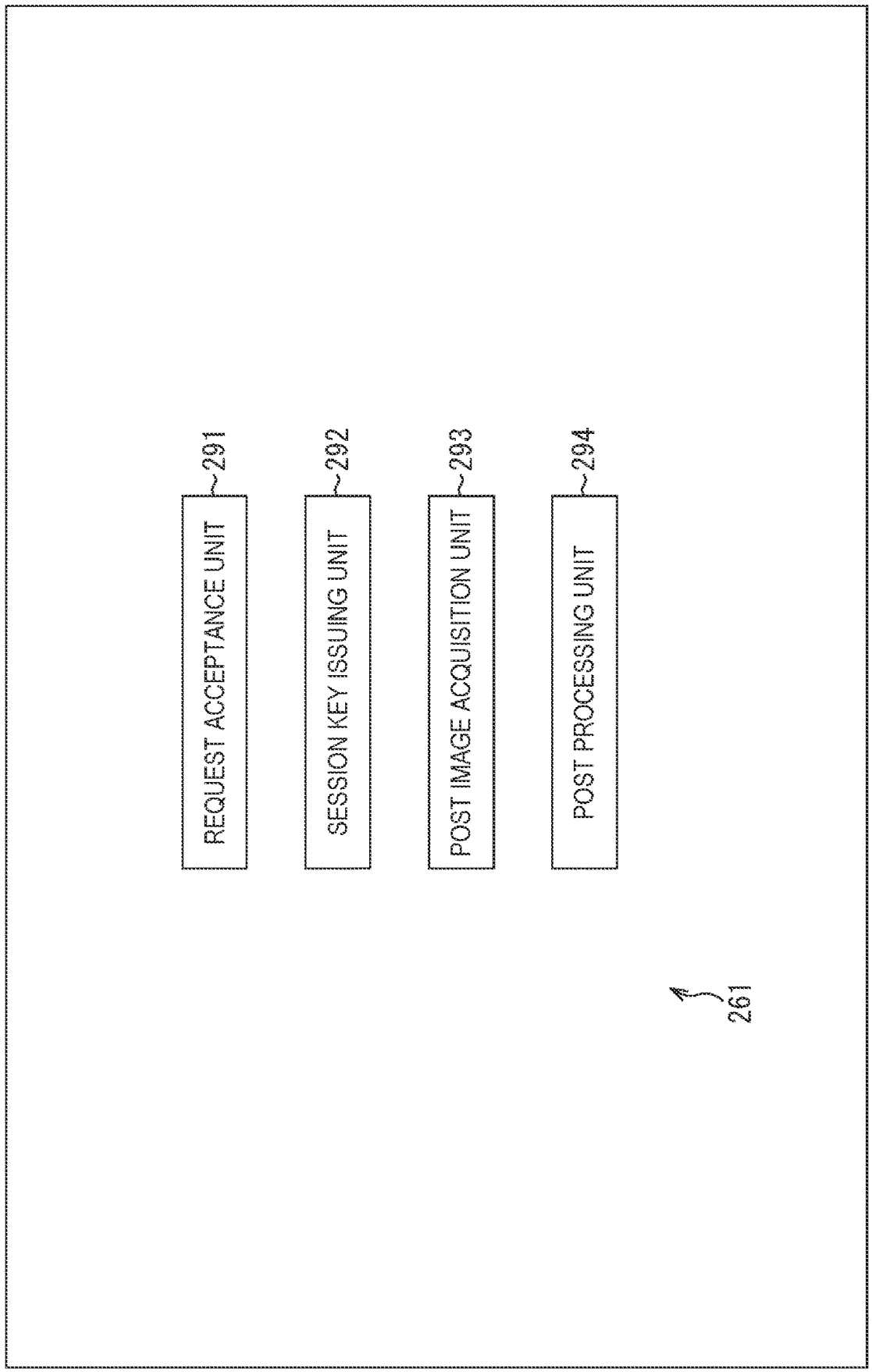
FIG. 10 is a functional block diagram illustrating functions implemented in the posting site server.

A function implemented by the information processing unit 261 executing the application program is illustrated in FIG. 10 as a functional block. As illustrated in FIG. 10, the information processing unit 261 can include a request acceptance unit 291, a session key issuing unit 292, a post image acquisition unit 293, and a post processing unit 294 as functional blocks by executing an application program.

The request acceptance unit 291 performs processing related to acceptance of a request from another device. Session key issuing unit 292 performs processing related to issuance of a session key. The post image acquisition unit 293 performs processing related to acquisition of a posted image which is a posted captured image. The post processing unit 294 performs processing related to review posting.

<Flow of Processing Related to Review Posting>

An example of a flow of processing related to review posting executed by the review system 100 will be described with reference to a flowchart of FIG. 11. Each device of the review system 100 realizes posting of review by the user by executing each processing in a flow as in this flowchart.

When the processing is started, in step S101, the store information registration unit 191 of the store terminal device 102 controls the communication unit 174 to supply store information, which is information regarding the store in which the store is installed, to the verification server 103 via the network 105, and causes the verification server 103 to register store information. In step S131, the store ID issuance registration unit 241 of the verification server 103 controls the communication unit 224 to receive the store information transmitted by the processing in step S101. The communication unit 224 receives the store information transmitted via the network 105 on the basis of the control, and supplies the store information to the information processing unit 211.

The store information includes position information indicating a location of the store. In step S132, the store ID issuance registration unit 241 generates a store ID which is identification information of a store associated with the position information. The store ID issuance registration unit 241 controls the communication unit 224 to transmit the store ID to the store terminal device 102. On the basis of the control, the communication unit 224 transmits the store ID supplied from the information processing unit 211 to the store terminal device 102 via the network 105. Furthermore, the store ID issuance registration unit 241 supplies the store ID to the verification data storage unit 212 to store (register) the store ID.

In step S102, the store information registration unit 191 controls the communication unit 174 to receive the store ID transmitted by the processing in step S132. The communication unit 174 receives the store ID transmitted via the network 105 on the basis of the control, and supplies the store ID to the information processing unit 161. The store information registration unit 191 supplies the store ID to the storage unit 173 and stores the store ID therein.

In a state where the registration of the store information is completed as described above, the imaging device 101 to the posting site server 104 perform store entrance proof processing which is processing of proving that the user of the imaging device 101 has entered the store where the store terminal device 102 is installed (step S103, step S111, step S121, step S133). Details of the store entrance proof processing will be described later.

Imaging using the imaging unit 112 of the imaging device 101 is permitted after the store entrance proof processing is performed until store exit proof processing is performed. The imaging device 101 and the verification server 03 perform imaging verification processing of performing imaging and verification of a captured image obtained by the imaging (steps S112 and S134). Details of the imaging verification processing will be described later.

When the user exits the store, the imaging device 101 to the posting site server 104 perform store exit proof processing for proving the user's exit (step S104, step S113, step S122, step S135). Details of the store exit proof processing will be described later.

After the store exit proof processing is performed, in step S136, the post control unit 252 of the verification server 103 controls the communication unit 224 to transmit control information for permitting posting of review to the imaging device 101 via the network 105. On the basis of the control, the communication unit 224 transmits the control information supplied from the information processing unit 111 to the imaging device 101 via the network 105. In step S114, the control information acquisition unit 144 of the imaging device 101 controls the communication unit 124 to acquire the control information.

In step S137, the post control unit 252 of the verification server 103 controls the communication unit 224 to supply the captured image uploaded from the imaging device 101 to the verification server 103 as an image that can be posted to the posting site server 104. In step S123, the post image acquisition unit 293 of the posting site server 104 controls the communication unit 274 to receive the postable image transmitted from the verification server 103. On the basis of the control, the communication unit 274 receives the postable image transmitted from the verification server 103 and supplies the image to the information processing unit 261.

When the posting is permitted as described above, the post processing unit 147 of the imaging device 101 performs the posting processing in step S115 and posts the review. In response to this processing, the post processing unit 294 of the posting site server 104 performs the posting processing in step S124, accepts the post of the review, and publishes the accepted review. When the review posting ends in this manner, a series of processing related to the review posting ends.

<Flow of Store Entrance Proof Processing>

An example of a flow of the store entrance proof processing executed in FIG. 11 will be described with reference to a flowchart in FIG. 12.

When the store entrance proof processing is started, in step S161, the session key request unit 141 of the imaging device 101 controls the communication unit 124 to log in to the posting site server 104, and requests a session key. At the time of login, the session key request unit 141 supplies user information, which is information regarding the user, to the posting site server 104. The user information includes information necessary for login, for example, a user ID, a password, and the like that are identification information of the user. In step 3171, the request acceptance unit 291 of the posting site server 104 accepts the access, performs login processing of the imaging device 101, and accepts the request.

In step S172, the session key issuing unit 292 issues a session key associated with the user ID of the logged-in user. That is, the session key issuing unit 292 generates a session key associated with the user ID, and controls the communication unit 274 to supply the session key to the imaging device 101. In step 3162, the session key request unit 141 of the imaging device 101 acquires the session key via the communication unit 124.

Figure 13:
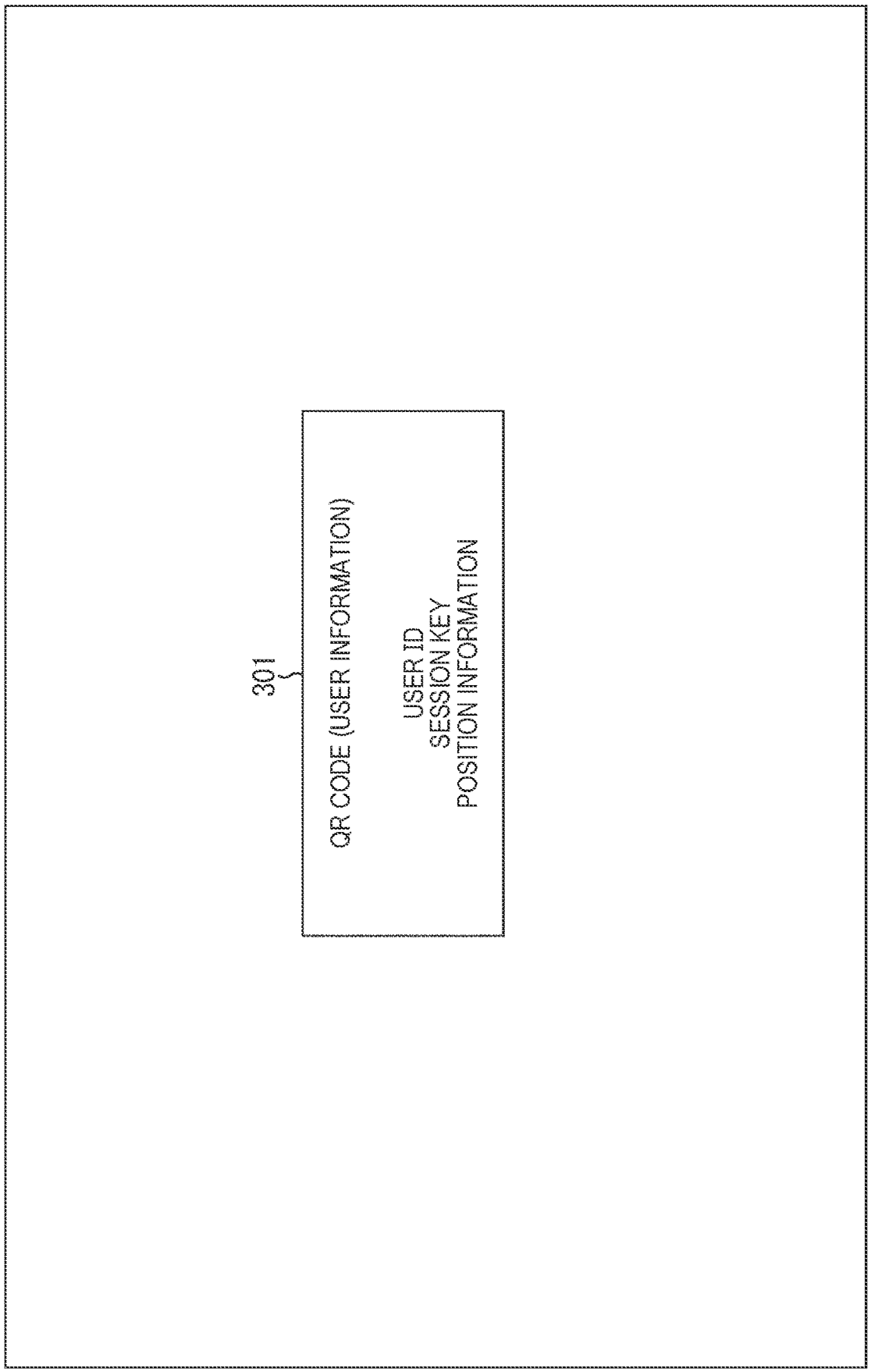
FIG. 13 is a diagram illustrating an example of information included in a QR code.

When the session key is acquired, the QR code generation unit 142 of the imaging device 101 generates a QR code with expiration time using the session key in step S163. In this QR code with expiration time, the expiration time of information indicated by the QR code is determined in advance. An example of the information indicated by the QR code is illustrated in FIG. 13. As illustrated in FIG. 13, the information indicated by a QR code 301 includes user information. For example, a user ID, a session key issued from the posting site server 104 by the above-described processing, position information indicating the position of the imaging device 101, and the like are included. That is, the QR code generation unit 142 generates the user information on condition that a session is being established with the posting site server 104 that is a provision destination of the captured image.

Of course, information other than these may be included. Note that this position information may be omitted. However, the reliability of the store entrance proof is improved by including the position information of the imaging device 101 in the QR code.

Returning to FIG. 12, in step S163, the QR code providing unit 143 controls the display (display unit) of the output unit 122 to display the image of the QR code with expiration time generated by the QR code generation unit 142. Then, the user holds the display on which the image of the QR code with expiration time is displayed over the reader 162 of the store terminal device 102. That is, the QR code providing unit 143 provides the user information to the store terminal device 102 which is an information processing device that stores imaging location information which is information indicating an imaging location (that is, a store location).

In step S151, the OR code reading unit 192 of the store terminal device 102 controls the reader to read the QR code held over the reader 162 (that is, the information indicated by the QR code). For example, the reader 162 captures an image of the QR code held over by an image sensor and the like, analyzes the QR code included in the captured image, and reads information. The reader 162 supplies the read information to the information processing unit 161 (QR code reading unit 192). As described above, the user information and the like are provided from the imaging device 101 to the store terminal device 102 using the QR code.

In step S152, the store entrance proof information providing unit 193 of the store terminal device 102 controls the communication unit 174 to supply the QR code (information indicated by the QR code) read as described above, the store ID issued from the verification server 103, and the store entrance flag indicating the information for proving store entrance to the verification server 103 as the store entrance proof information that is the information for proving user's entrance into a store. In accordance with the control, the communication unit 174 transmits the store entrance proof information supplied from the store entrance proof information providing unit 193 to the verification server 103 via the network 105. In step S181, the store entrance proof information acquisition unit 242 of the verification server 103 acquires the store entrance proof information via the communication unit 224.

In step S182, the store entrance proof information verification unit 243 verifies whether the position information (information indicating a position of the imaging device 101) and the session key (session key issued by the posting site server 104), which are the information indicated by the QR code included in the store entrance proof information, are valid.

For example, the store entrance proof information verification unit 243 determines whether or not the position information of the imaging device 101 corresponds to the position information of the store corresponding to the store ID on the basis of the verification data stored in the verification data storage unit 212. For example, in a case where it is determined that the position information (the position information of the imaging device 101) indicated by the QR code matches the position information of the store or is located sufficiently near the store, the store entrance proof information verification unit 243 determines that the position information indicated by the QR code is valid.

Furthermore, for example, the store entrance proof information verification unit 243 inquires of the posting site server 104 whether the session key indicated by the QR code is valid. In case where the posting site server 104 approves that the session key is valid, it is determined that the session key indicated by the QR code is valid.

In a case where the location information indicated by the QR code and the session key are determined to be valid, the store entrance time recording unit 244 records the current time (which may be the transmission time or the reception time of the store entrance proof information) in the verification data storage unit 212 as the store entrance time in step S183.

Then, in step S184, the imaging control unit 245 controls the communication unit 224 and supplies control information for permitting imaging to the imaging device 101. In accordance with the control, the communication unit 224 transmits the control information (control information for permitting imaging) supplied from the imaging control unit 245 to the imaging device 101 via the network 105. In step S164, the control information acquisition unit 144 of the imaging device 101 acquires the control information via the communication unit 124.

In step S165, the imaging control unit 145 activates a dedicated application on the basis of the control information, and permits imaging using the imaging unit 112 (starts permitting imaging). That is, the imaging control unit 145 starts permission for imaging by the imaging unit 112 on the basis of permission start information (control information for permitting imaging) obtained from an external device (the verification server 103) by providing the user information to the information processing device (store terminal device 102). When permission for imaging is started, the store entrance proof processing ends, and the processing returns to FIG. 11.

<Flow of Imaging Verification Processing>

Figure 14:
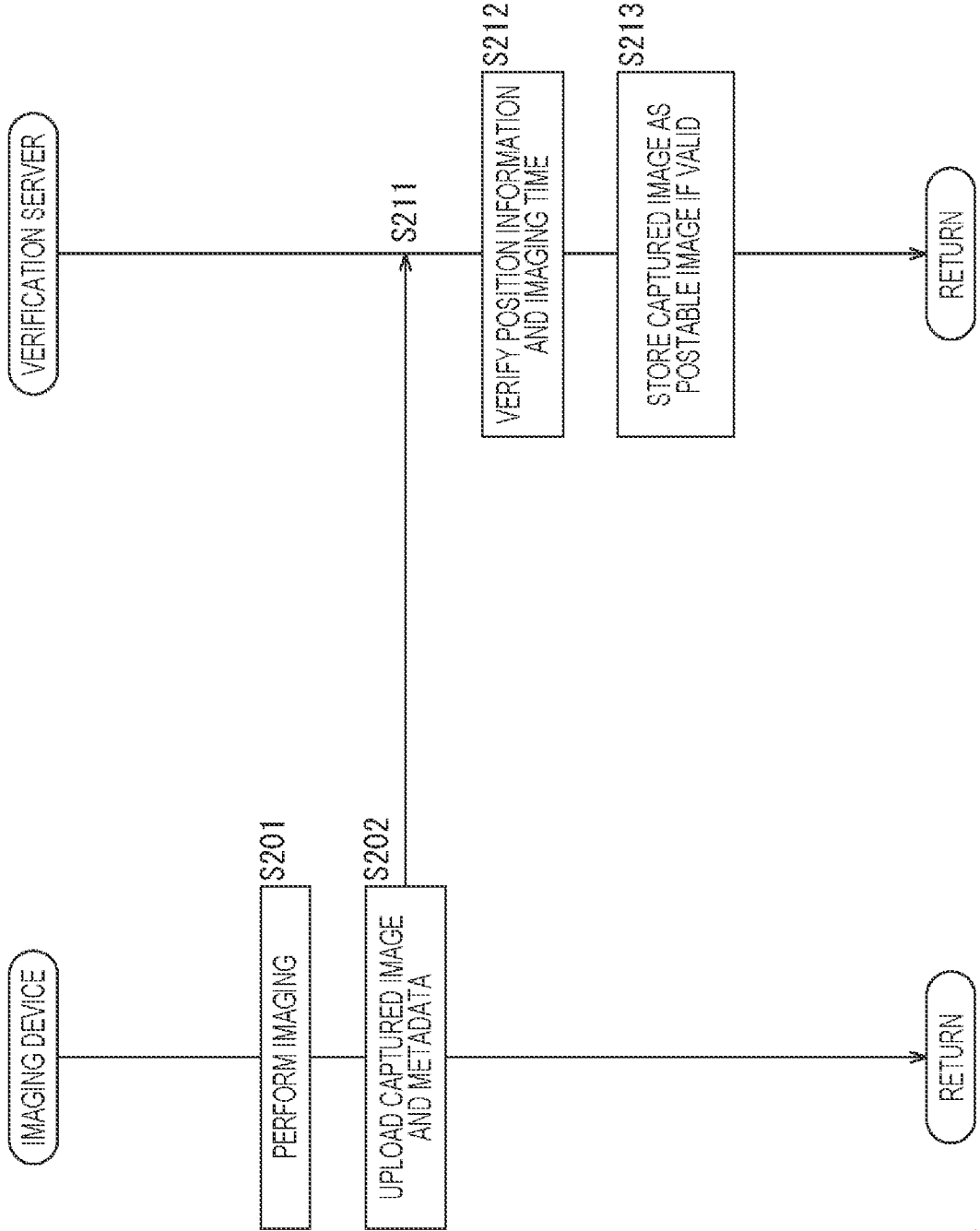
FIG. 14 is a flowchart illustrating an example of a flow of imaging verification processing.

An example of a flow of the imaging verification processing executed in FIG. 11 will be described with reference to a flowchart in FIG. 14.

When the imaging verification processing is started, in step S201, the imaging control unit 145 of the imaging device 101 controls the imaging unit 112 according to the operation of the user, and performs imaging by the dedicated application. The user uses the imaging unit 112 of the imaging device 101 to capture, for example, a landscape in a store, goods sold in a store, and the like. The imaging unit 112 is controlled by a dedicated application to perform imaging, generate a captured image, and supply the captured image to the imaging control unit 145. The imaging control unit 145 associates the information such as the imaging time and the imaging location with the captured image as metadata.

In step S202, the captured image providing unit 146 controls the communication unit 124 to supply the captured image and the metadata to the verification server 103. In accordance with the control, the communication unit 124 transmits the captured image and the metadata supplied from the information processing unit 111 to the verification server via the network 105. In step S211, the captured image acquisition unit 246 of the verification server 103 acquires the captured image and the metadata via the communication unit 224. Note that the provision of the captured image and the like can be performed at any timing. For example, a plurality of captured images and the like may be collectively provided, or may be provided each time a captured image is generated.

In step S212, the captured image verification unit 247 verifies the captured image on the basis of the metadata and the verification data stored in the verification data storage unit 212. For example, in a case where the position information indicating the imaging location included in the metadata corresponds to (matches or is located in the vicinity of) the position information of the store, the captured image verification unit 247 determines that the captured image is valid. Furthermore, in a case where the imaging time included in the metadata is a time between the store entrance time and the store exit time (described later), the captured image verification unit 247 determines that the captured image is valid. Of course, the captured image may be determined to be valid only when both the imaging location and the imaging time are valid.

In a case where the captured image is valid, the captured image management unit 248 stores the captured image in the storage unit 223 as a postable image in step S213. When the processing of step S213 ends, the imaging verification processing ends, and the processing returns to FIG. 11.

<Flow of Store Exit Proof Processing>

Figure 15:
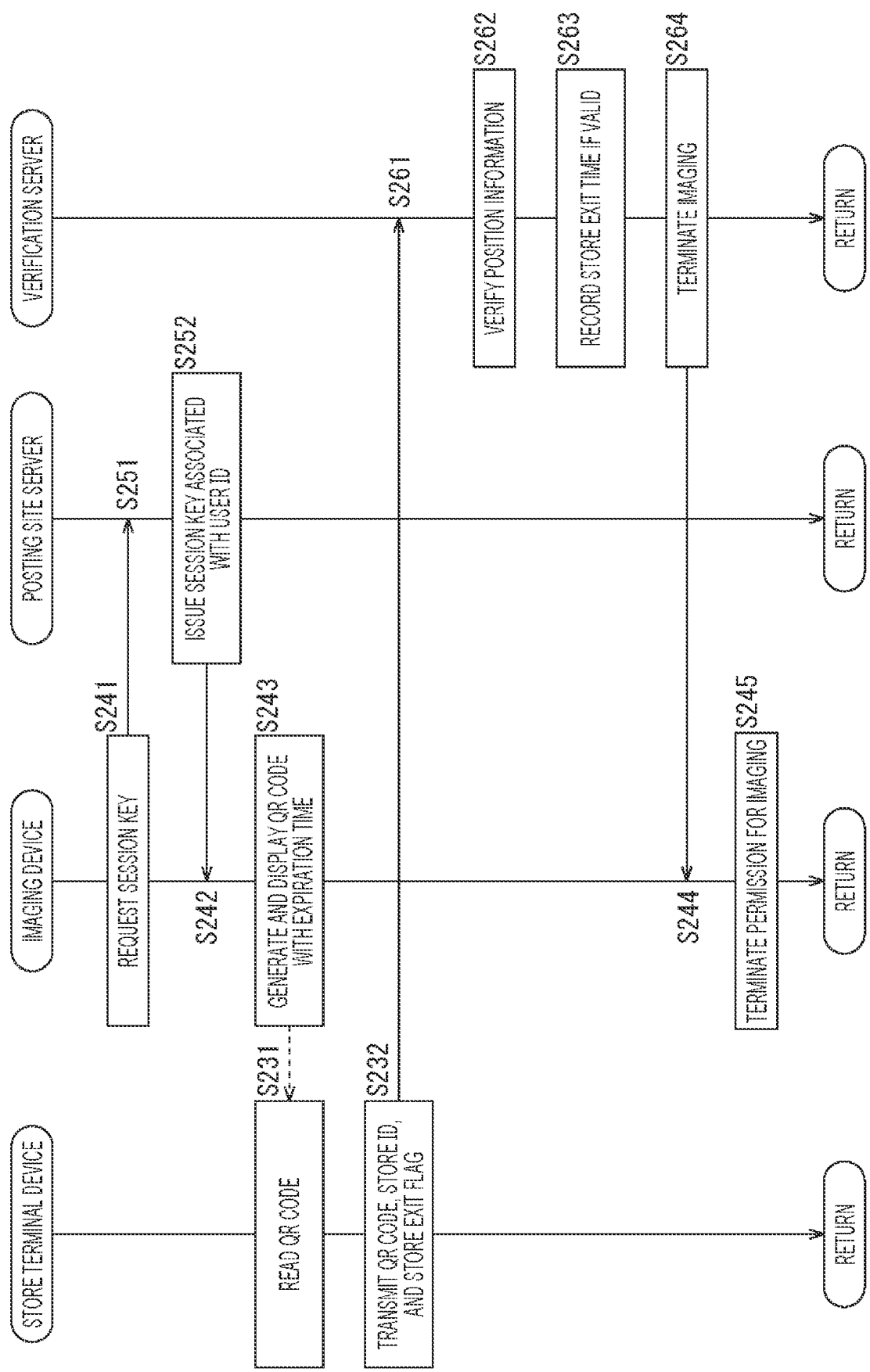
FIG. 15 is a flowchart illustrating an example of a flow of store exit proof processing.

An example of a flow of the store exit proof processing executed in FIG. 11 will be described with reference to a flowchart of FIG. 15.

When the store exit proof processing is started, in step S241, the session key request unit 141 of the imaging device 101 controls the communication unit 124 to request a session key from the posting site server 104. In step S251, the request acceptance unit 291 of the posting site server 104 accepts the request. In step S252, the session key issuing unit 292 issues a session key associated with the user ID. In step S242, the session key request unit 141 of the imaging device 101 acquires the session key via the communication unit 124.

When the session key is acquired, the QR code generation unit 142 of the imaging device 101 generates a QR code with expiration time using the session key in step S243. This QR code includes information similar to that in the case of the store entrance proof processing (for example, FIG. 13). That is, the QR code generation unit 142 generates the user information on condition that a session is being established with the posting site server 104 that is a provision destination of the captured image. Note that the position information may be omitted. However, the reliability of the store exit proof is improved by including the position information of the imaging device 101 in the QR code.

In step S243, the QR code providing unit 143 controls the display (display unit) of the output unit 122 to display the image of the QR code with expiration time generated by the QR code generation unit 142. Then, the user holds the display on which the image of the QR code with expiration time is displayed over the reader 162 of the store terminal device 102. That is, the QR code providing unit 143 provides the user information to the store terminal device 102 which is an information processing device that stores imaging location information which is information indicating an imaging location (that is, a store location).

In step S231, the QR code reading unit 192 of the store terminal device 102 controls the reader to read the QR code held over the reader 162 (that is, the information indicated by the QR code). The reader 162 supplies the read information to the information processing unit 161 (QR code reading unit 192). As described above, the user information and the like are provided from the imaging device 101 to the store terminal device 102 using the QR code.

In step S232, the store exit proof information providing unit 194 of the store terminal device 102 controls the communication unit 174 to supply the QR code (information indicated by the QR code) read as described above, the store ID issued from the verification server 103, and a store exit flag, which is flag information indicating that the information is for proving the user's exit, to the verification server 103 as the store exit proof information, which is information for proving user's exit from the store. In accordance with the control, the communication unit 174 transmits the store exit proof information supplied from the store exit proof information providing unit 195 to the verification server 103 via the network 105. In step S261, the store exit proof information acquisition unit 249 of the verification server 103 acquires the store exit proof information via the communication unit 224.

In step S262, the store exit proof information verification unit 250 verifies whether the position information (information indicating the position of the imaging device 101) that is the information indicated by the QR code included in the store exit proof information is valid.

For example, the store exit proof information verification unit 250 determines whether or not the position information of the imaging device 101 corresponds to the position information of the store corresponding to the store ID on the basis of the verification data stored in the verification data storage unit 212. For example, in a case where it is determined that the position information (the position information of the imaging device 101) indicated by the QR code matches the position information of the store or is located sufficiently near the store, the store exit proof information verification unit 250 determines that the position information indicated by the QR code is valid.

In a case where the position information indicated by the QR code is determined to be valid, the store exit time recording unit 215 records the current time (which may be the transmission time or the reception time of the store exit proof information) in the verification data storage unit 212 as the store exit time in step S263.

Then, in step S264, the imaging control unit 245 controls the communication unit 224 and supplies control information for terminating the permission for imaging to the imaging device 101. In accordance with the control, the communication unit 224 transmits control information (control information for terminating permission for imaging) supplied from the imaging control unit 245 to the imaging device 101 via the network 105. In step S244, the control information acquisition unit 144 of the imaging device 101 acquires the control information via the communication unit 124.

In step S245, the imaging control unit 145 terminates the dedicated application on the basis of the control information, and terminates the permission for imaging using the imaging unit 112. That is, the imaging control unit 145 stops (terminates) the permission for imaging by the imaging unit 112 on the basis of the permission stop information (control information for terminating the permission for imaging) obtained from the external device (verification server 103) by providing the user information to the information processing device (store terminal device 102). When the permission for imaging is terminated, the store exit proof processing is terminated, and the processing returns to FIG. 11.

By executing each processing as described above, the store entrance time and the store exit time of the user are proved, and imaging is permitted in the time between the store entrance time and the store exit time. That is, it is guaranteed that the captured image is captured in the time from the store entrance time to the store exit time. Moreover, since it is guaranteed by the position information that the imaging device 101 is located in the store from the store entrance time to the store exit time, it is guaranteed that the captured image is captured in the store by the user who has actually visited the store.

Therefore, posting of fictitious reviews can be suppressed, and a reduction in reliability of the review can be suppressed. That is, it is possible to suppress a decrease in reliability of the service of the posting site.

<Posting Processing>

Figure 11:
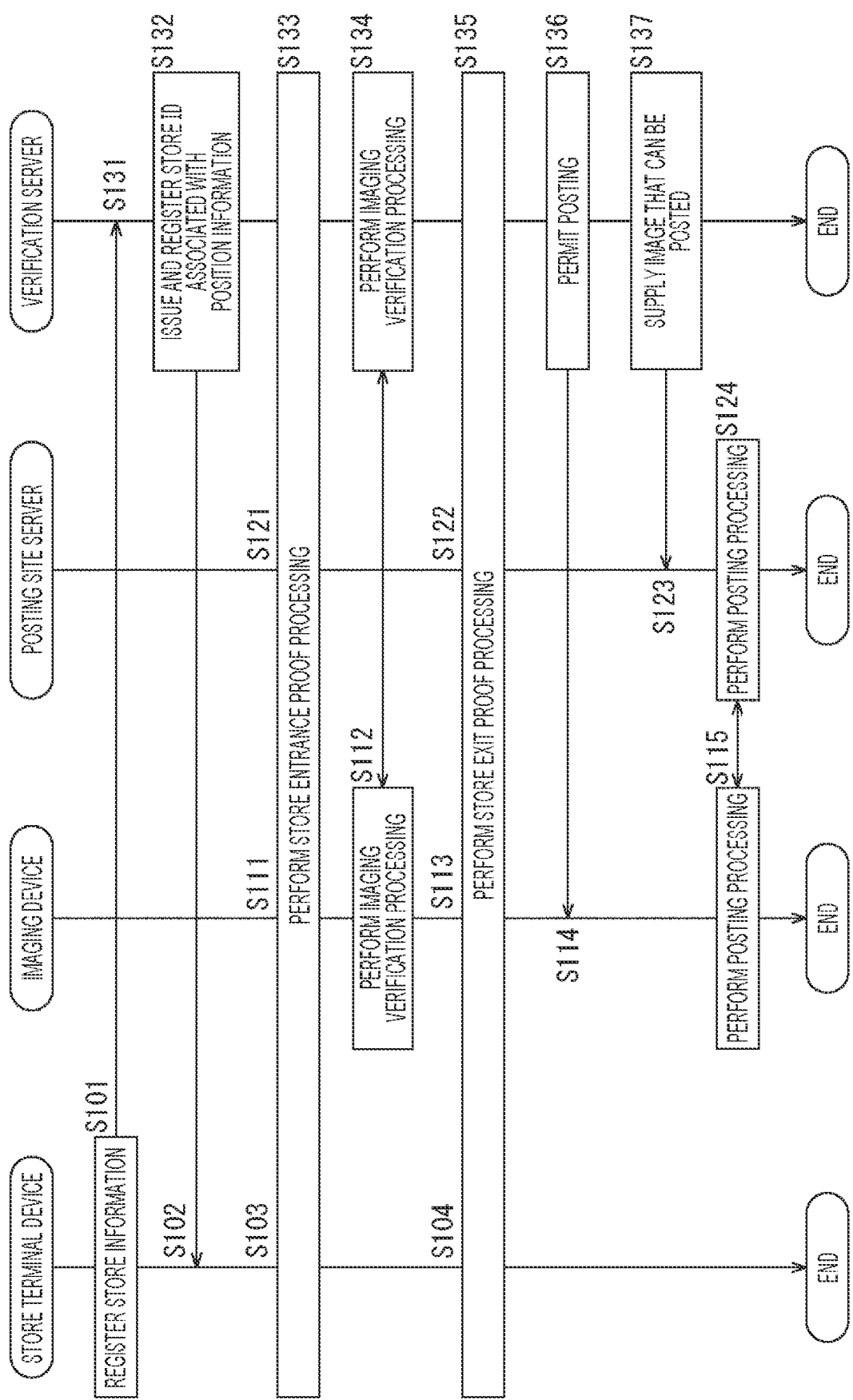
FIG. 11 is a flowchart illustrating an example of a flow of processing related to posting of review.
Figure 12:
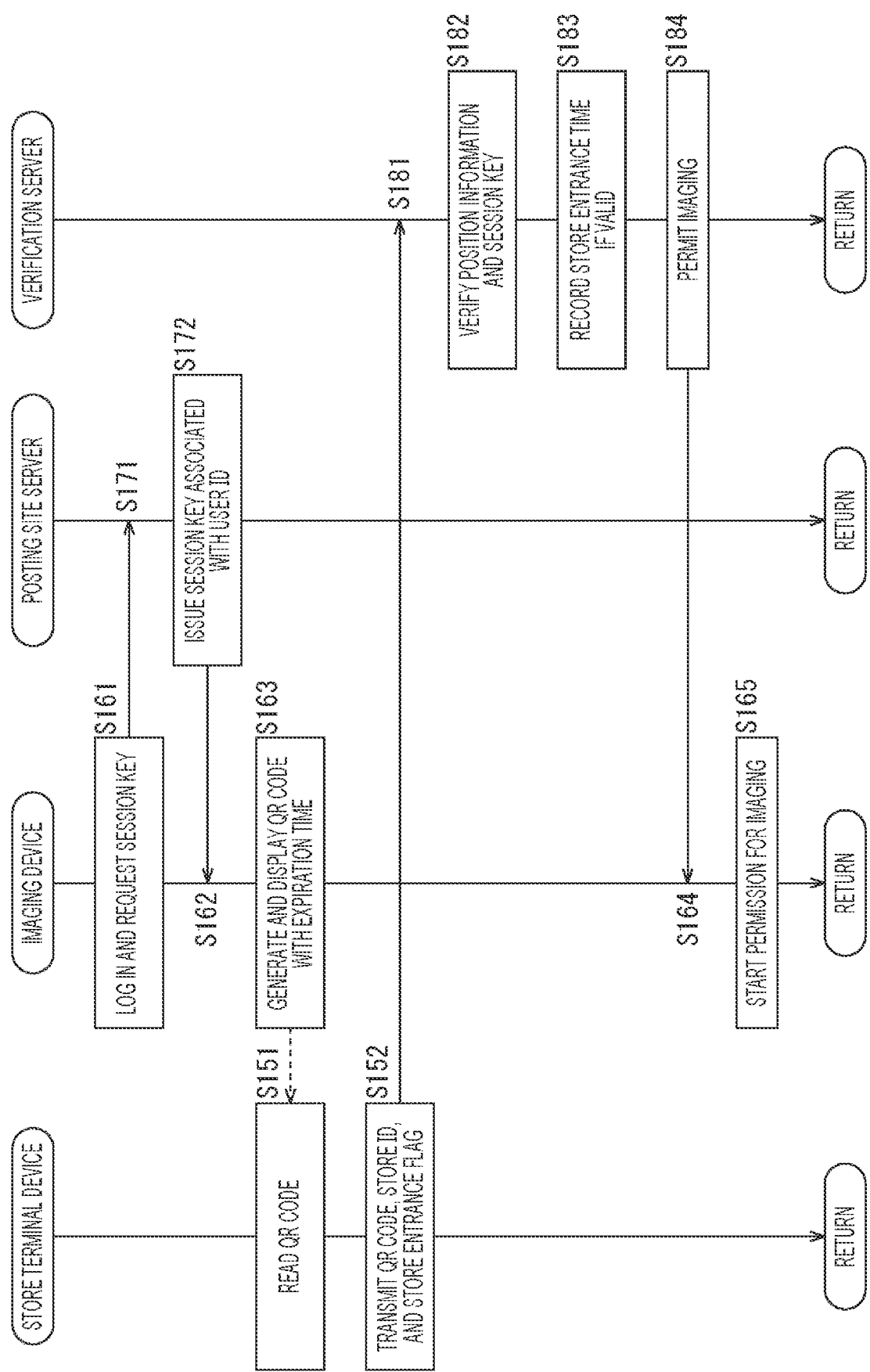
FIG. 12 is a flowchart illustrating an example of a flow of store entrance proof processing.

In the posting processing in steps S115 and S124 in FIG. 11, the posting site server 104 presents a list of images that can be posted to the imaging device 101, and the user of the imaging device 101 selects a desired image from the list and inputs a review comment. When the imaging device 101 uploads the selection information and the review comment to the posting site server 104, the posting site server 104 associates the uploaded review comment with the selected captured image on the basis of the selection information. Then, the posting site server 104 publishes the associated review comment and the captured image.

Figure 16:
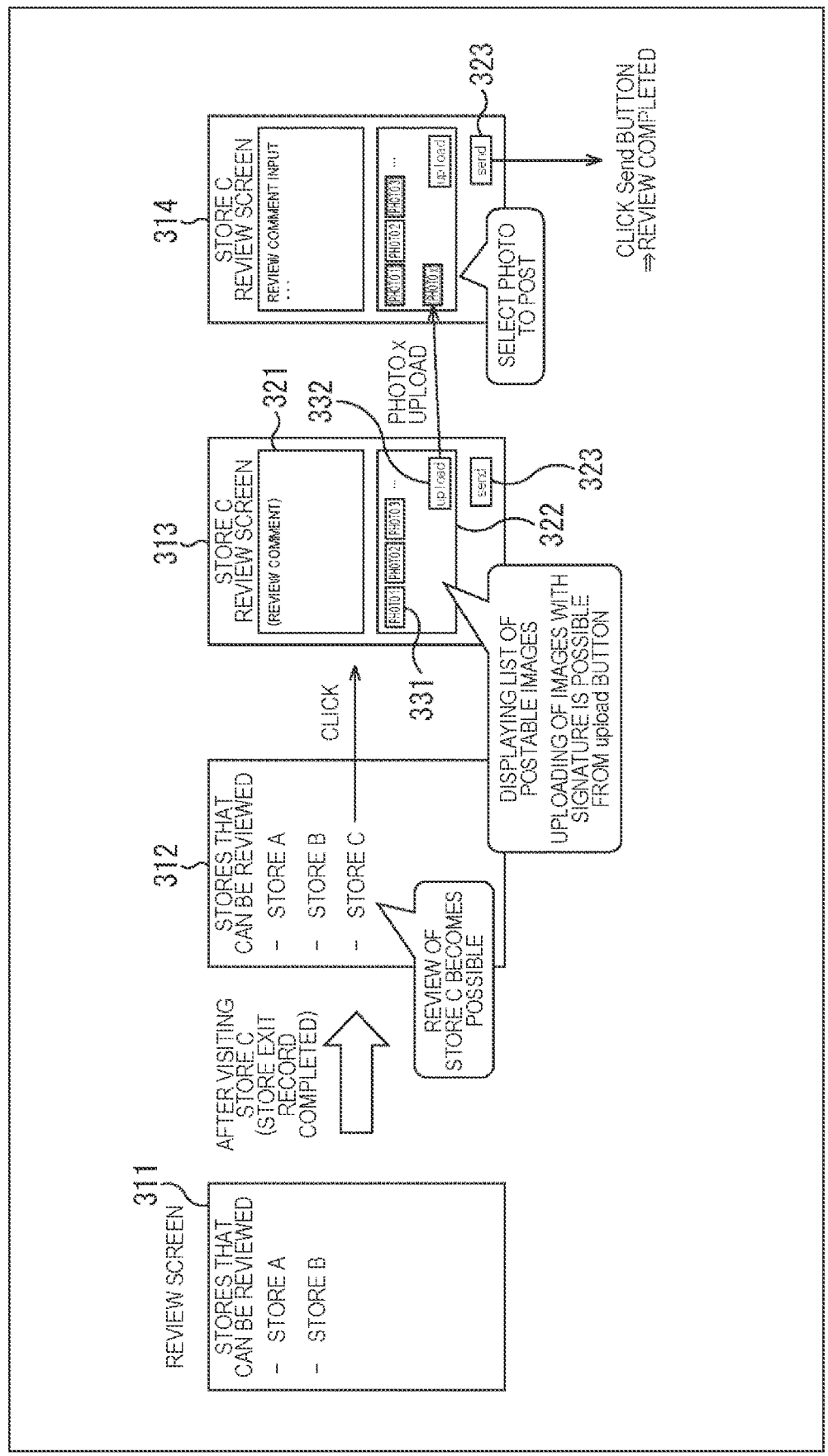
FIG. 16 is a diagram illustrating an example of a review screen.

At that time, the imaging device 101 displays a review screen displayed on the display (display unit) of the output unit 122 and receives a user's operation. A display example of the review screen is illustrated in FIG. 16. The review screen is a graphical user interface (GUI) for receiving an instruction of the user regarding posting of the review.

First, the post processing unit 147 of the imaging device 101 displays a review screen 311 at a right end of FIG. 16 on the display. For example, the review screen 311 is a screen showing a list of stores that the user can review. That is, a list of stores actually visited by the user is displayed on the review screen 311. For example, after visiting the store C (when the store C performs the store exit proof processing), the store C is added to the store list as illustrated on a review screen 312. Therefore, the user can select the store C as the review target. That is, it is possible to post a review of the store C.

For example, when an operation (for example, clicking and the like) of selecting the store C is performed, the post processing unit 147 of the imaging device 101 displays a review screen 313 on the display. The review screen 313 is a screen for creating a review of the store C. As illustrated in FIG. 16, the review screen 313 is provided with a review input field 321 in which a review comment is written, an image selection field 322 for selecting a captured image, and a send button 323 for instructing upload of a review.

In the image selection field 322, each postable image is displayed as an icon 331, and further, an upload button 332 for determining selection of an image is displayed. When the user performs an operation of selecting the icon 331 corresponding to a desired captured image and performs an operation of pressing the upload button 332 in the image selection field 322, a captured image to be used for review is designated. The post processing unit 147 of the imaging device 101 displays the review screen 314 on the display. On the review screen 314, the icon 331 corresponding to the captured image selected by the user is displayed in a mode different from the icon 331 corresponding to the captured image not selected by the user so as to be distinguishable from the icon.

When the user writes a review comment in the review input field 321, selects a captured image in the image selection field 322 as described above, and then performs an operation of pressing the send button 323, the post processing unit 147 uploads the input review comment and the selection information of the captured image to the posting site server 104.

By posting using such a review screen, the user can easily post a review using a valid captured image.

<Case of Store Entrance Proof Processing Only>

Figure 17:
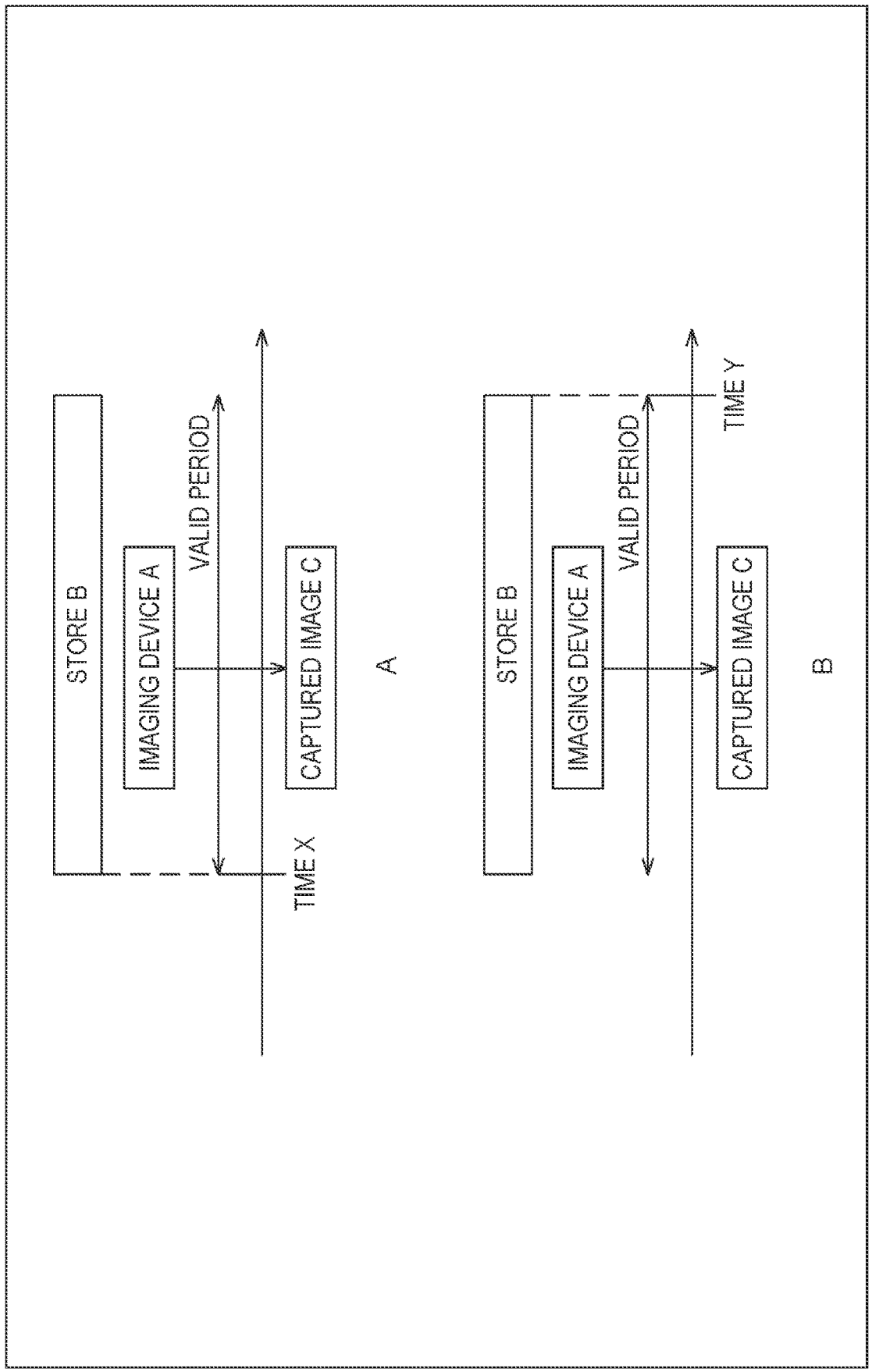
FIG. 17 is a diagram illustrating another example of the outline of the guarantee of the imaging location and the imaging time.

Note that, out of the store entrance proof processing and the store exit proof processing as described above, only the store entrance proof processing may be performed. In this case, for example, as illustrated in A of FIG. 17, imaging within a predetermined valid period from the store entrance time (time X) may be permitted by the store entrance proof processing.

That is, the imaging control unit 145 may permit imaging by the imaging unit 112 within the valid period indicated by captured image valid period information obtained from the external device (for example, the verification server 103) by providing the user information (for example, the QR code) to the information processing device (for example, the store terminal device 102). For example, the control information acquisition unit 144 may acquire the captured image valid period information indicating a predetermined valid period after provision of the user information from an external device (for example, the verification server 103), and the imaging control unit 145 may permit imaging within the designated valid period on the basis of the captured image valid period information.

In this way, the store exit proof processing can be omitted, and the reliability of the review can be more easily suppressed from being reduced.

<Case of Store Exit Proof Processing Only>

Note that, out of the store entrance proof processing and the store exit proof processing as described above, only the store exit proof processing may be performed. In this case, for example, as illustrated in B of FIG. 17, posting of the captured image generated within a predetermined valid period up to the store exit time (time Y) may be permitted by the store exit proof processing.

That is, the imaging may be always permitted, and the post processing unit 147 may provide the user information (for example, the QR code) to the information processing device (for example, the store terminal device 102) to permit the posting of the captured image captured within the valid period indicated by the captured image valid period information obtained from the external device (for example, the verification server 103). For example, the control information acquisition unit 144 may acquire captured image valid period information indicating a predetermined valid period before provision of the user information from an external device (for example, the verification server 103), and the post processing unit 147 may permit posting of a captured image captured within the valid period designated on the basis of the captured image valid period information.

In this way, the store entrance proof processing can be omitted, and the reduction in the reliability of the review can be more easily suppressed.

3. SECOND EMBODIMENT

<Transfer of Store Information>

In the first embodiment, it has been described that the user information is supplied from the imaging device 101 to the store terminal device 102 using the QR code in the store entrance proof processing and the store exit proof processing, but instead, the store information may be supplied from the store terminal device 102 to the imaging device 101 using the QR code. That is, in the store entrance proof processing of the first embodiment, the store terminal device 102 supplies the store entrance proof information to the verification server 103, but in the case of the present embodiment, the imaging device 101 supplies the store entrance proof information to the verification server 103. Similarly, in the store exit proof processing of the first embodiment, the store terminal device 102 supplies the store exit proof information to the verification server 103, but in the case of the present embodiment, the imaging device 101 supplies the store exit proof information to the verification server 103.

For example, in an information processing system (for example, the review system 100) including an image processing apparatus (for example, the imaging device 101), a first information processing apparatus (for example, the store terminal device 102), and a second information processing apparatus (for example, the verification server 103), the image processing apparatus may include: an acquisition control unit that permits acquisition of imaging location information on the basis of permission information obtained from a provision destination (for example, the posting site server 104) on condition that a session is being established with the provision destination of a captured image; an imaging location information acquisition unit that acquires imaging location information provided from the first information processing apparatus in a state permitted by the acquisition control unit; an imaging location information and user information providing unit that provides the imaging location information acquired by the imaging location information acquisition unit and user information to the second information processing apparatus; a captured image valid period information acquisition unit that acquires captured image valid period information provided by the second information processing apparatus and corresponding to the imaging location information and the user information provided by the imaging location information and user information providing unit; and an imaging control unit that permits imaging by an imaging unit within a valid period indicated by the captured image valid period information acquired by the captured image valid period information acquisition unit. The first information processing apparatus may include: an imaging location information generation unit that generates the imaging location information on condition that a session is being established with the provision destination of the captured image; and an imaging location information providing unit that provides the imaging location information generated by the imaging location information generation unit to the image processing apparatus. The second information processing apparatus may include: an imaging location information and user information acquisition unit that acquires the imaging location information and the user information provided by the image processing apparatus; a verification unit that verifies the imaging location information and the user information acquired by the imaging location information and user information acquisition unit; and a captured image valid period information providing unit that provides the captured image valid period information corresponding to the imaging location information and the user information to the image processing apparatus in a case where the imaging location information and the user information are determined to be valid as a result of verification by the verification unit.

<Functional Block of Imaging Device>

Figure 18:
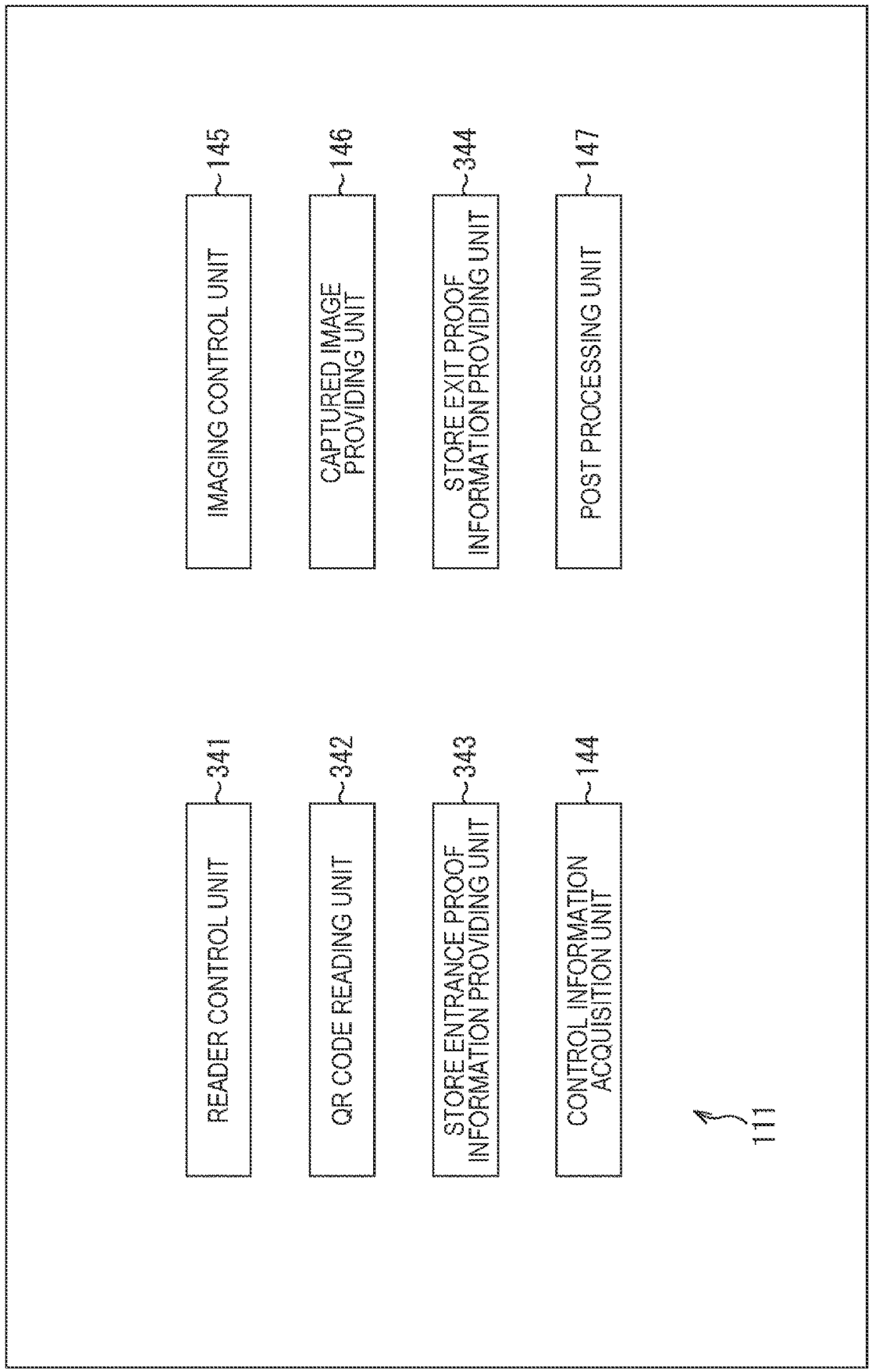
FIG. 18 is a functional block diagram illustrating functions implemented in an imaging device.

FIG. 18 illustrates functions implemented by the information processing unit 111 of the imaging device 101 in this case executing the application program as functional blocks. As illustrated in FIG. 18, the information processing unit 111 can include a reader control unit 341, a QR code reading unit 342, a store entrance proof information providing unit 343, a control information acquisition unit 144, an imaging control unit 145, a store exit proof information providing unit 344, and a post processing unit 147 as functional blocks by executing an application program.

The reader control unit 341 performs processing related to the control of the reader. In this case, the imaging device 101 can use the imaging unit 112 as a reader of a QR code. The reader control unit 341 performs processing related to control of the imaging unit 112.

The QR code reading unit 342 performs processing related to reading of the QR code. The store entrance proof information providing unit 343 performs processing related to provision of the store entrance proof information which is information for proving user's entrance into a store. The store exit proof information providing unit 344 performs processing related to the provision of the store exit proof information which is information proving user's exit from the store.

<Functional Block of Store Terminal Device>

Figure 19:
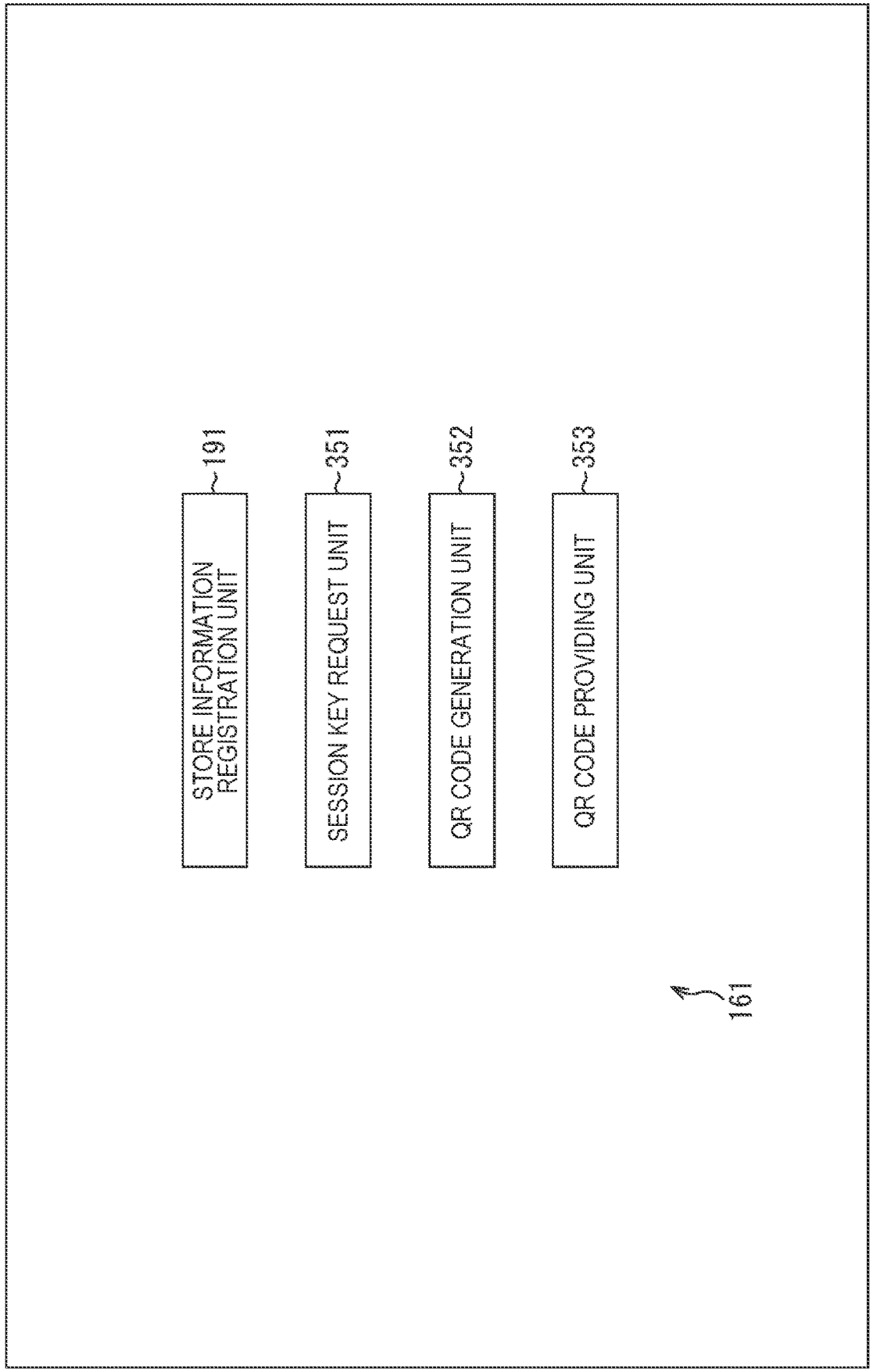
FIG. 19 is a functional block diagram illustrating functions implemented in a store terminal device.

FIG. 19 illustrates, as functional blocks, functions implemented by the information processing unit 161 of the store terminal device 102 in this case executing the application program. As illustrated in FIG. 19, the information processing unit 161 can include a store information registration unit 191, a session key request unit 351, a QR code generation unit 352, and a QR code providing unit 353 as functional blocks by executing an application program.

The session key request unit 351 performs processing related to a request for a session key. The QR code generation unit 352 performs processing related to generation of a QR code. The QR code providing unit 353 performs processing related to provision of the QR code.

<Functional Block of Posting Site Server>

Figure 20:
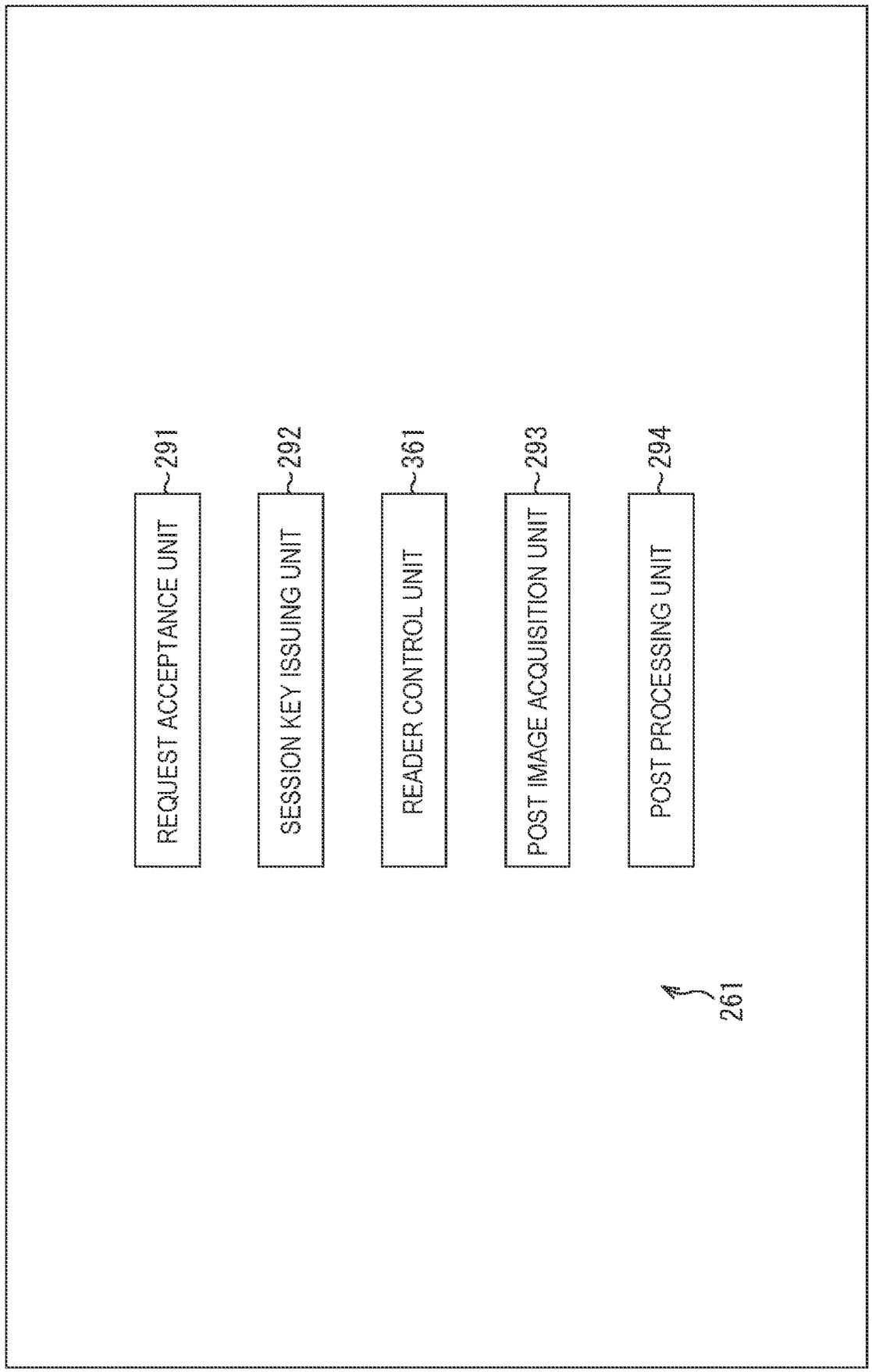
FIG. 20 is a functional block diagram illustrating functions implemented in a posting site server.

FIG. 20 illustrates, as functional blocks, functions implemented by the information processing unit 211 of the posting site server 104 in this case executing the application program. As illustrated in FIG. 20, the information processing unit 261 can include a request acceptance unit 291, a session key issuing unit 292, a reader control unit 361, a post image acquisition unit 293, and a post processing unit 294 as functional blocks by executing an application program.

The reader control unit 361 performs processing related to control of the reader (imaging unit 112) of the imaging device 101.

<Flow of Store Entrance Proof Processing>

In this case, the processing related to the review posting executed by the review system 100 is executed in a similar flow to the case of the first embodiment (FIG. 11). Furthermore, the imaging verification processing executed therein is also executed in a similar flow to the case of the first embodiment (FIG. 13).

An example of a flow of the store entrance proof processing in this case will be described with reference to the flowcharts of FIGS. 21 and 22.

Figure 21:
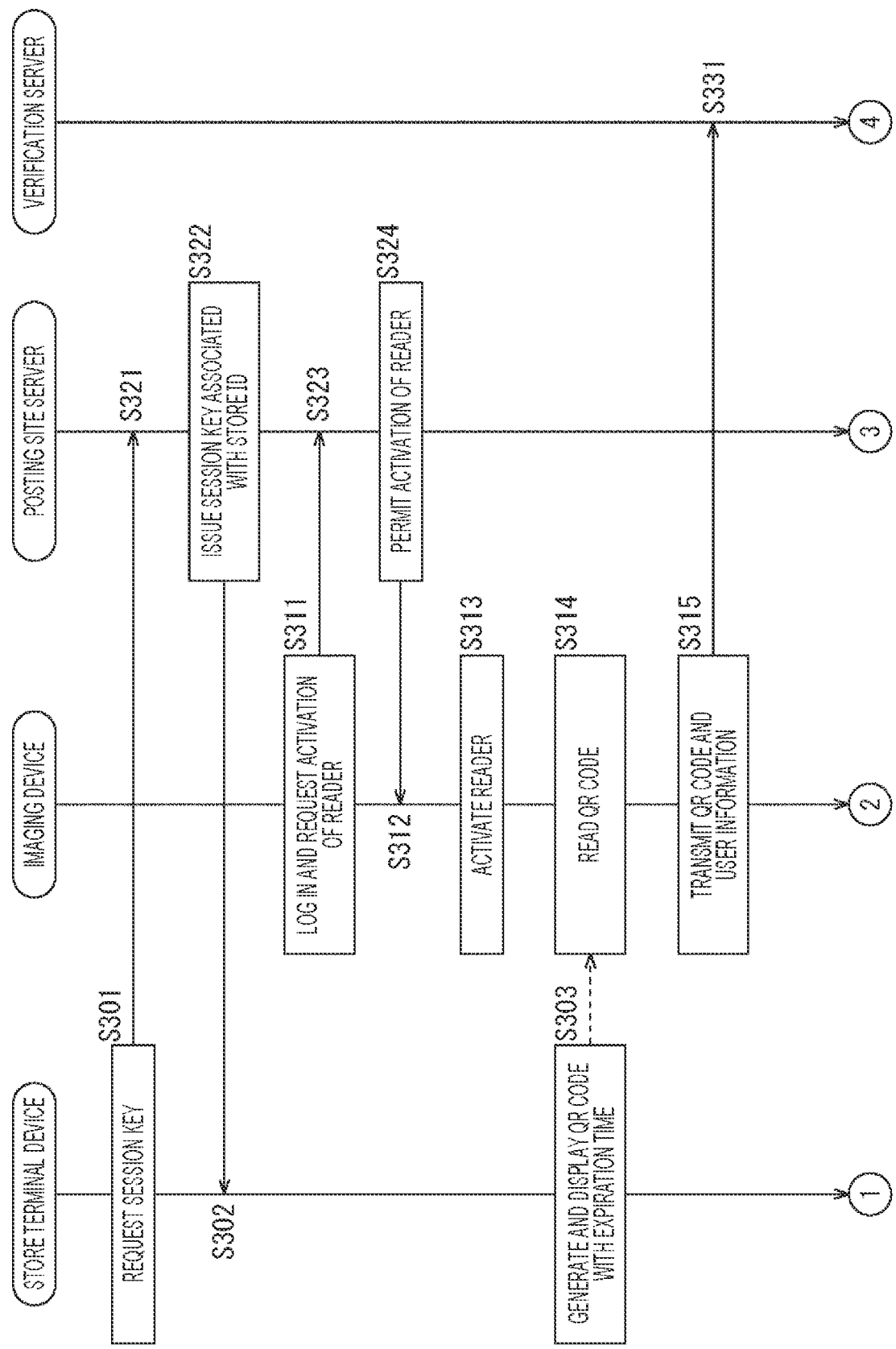
FIG. 21 is a flowchart illustrating an example of a flow of store entrance proof processing.

When the store entrance proof processing is started, the session key request unit 351 of the store terminal device 102 controls the communication unit 174 to request a session key from the posting site server 104 in step S301 of FIG. 21. At that time, the session key request unit 351 supplies the posting site server 104 with store information that is information regarding the store. The store information includes, for example, a store ID and the like which are identification information of a store. As described in the first embodiment, the store ID is associated with the position information of the store by the verification server 103. That is, the store ID can also be referred to as position information of the store. Therefore, this store information can also be said to be position information indicating a location of the store (in other words, the imaging location). In step S321, the request acceptance unit 291 of the posting site server 104 accepts the request.

In step S322, the session key issuing unit 292 issues a session key associated with the supplied store ID. That is, the session key issuing unit 292 generates a session key associated with the store ID, and controls the communication unit 274 to supply the session key to the store terminal device 102. In step S302, the session key request unit 351 of the store terminal device 102 acquires the session key via the communication unit 174.

Furthermore, in step 3311, the reader control unit 341 of the imaging device 101 controls the communication unit 124 to log in to the posting site server 104, and requests activation permission of the reader. At the time of login, the reader control unit 341 supplies user information, which is information regarding the user, to the posting site server 104. The user information includes information necessary for login, for example, a user ID, a password, and the like that are identification information of the user. In step S323, the request acceptance unit 291 of the posting site server 104 accepts the access, performs login processing of the imaging device 101, and accepts the request.

In step S324, the reader control unit 361 permits activation of the reader. That is, the reader control unit 361 controls the communication unit 274 and supplies control information for permitting activation of the reader to the imaging device 101. In step S312, the reader control unit 341 of the imaging device 101 acquires the control information via the communication unit 124. In step S313, the reader control unit 341 activates an application that uses the imaging unit 112 as a reader of the QR code on the basis of the control information. The imaging unit 112 is used as a reader by this application. That is, on condition that a session is being established with the provision destination of the captured image (for example, the posting site server 104), the acquisition of the imaging location information (store information) is permitted on the basis of the permission information (control information for permitting activation of the reader) obtained from the provision destination.

When the session key is acquired in the store terminal device 102, the QR code generation unit 352 generates a QR code with expiration time using the session key in step S303.

Figure 23:
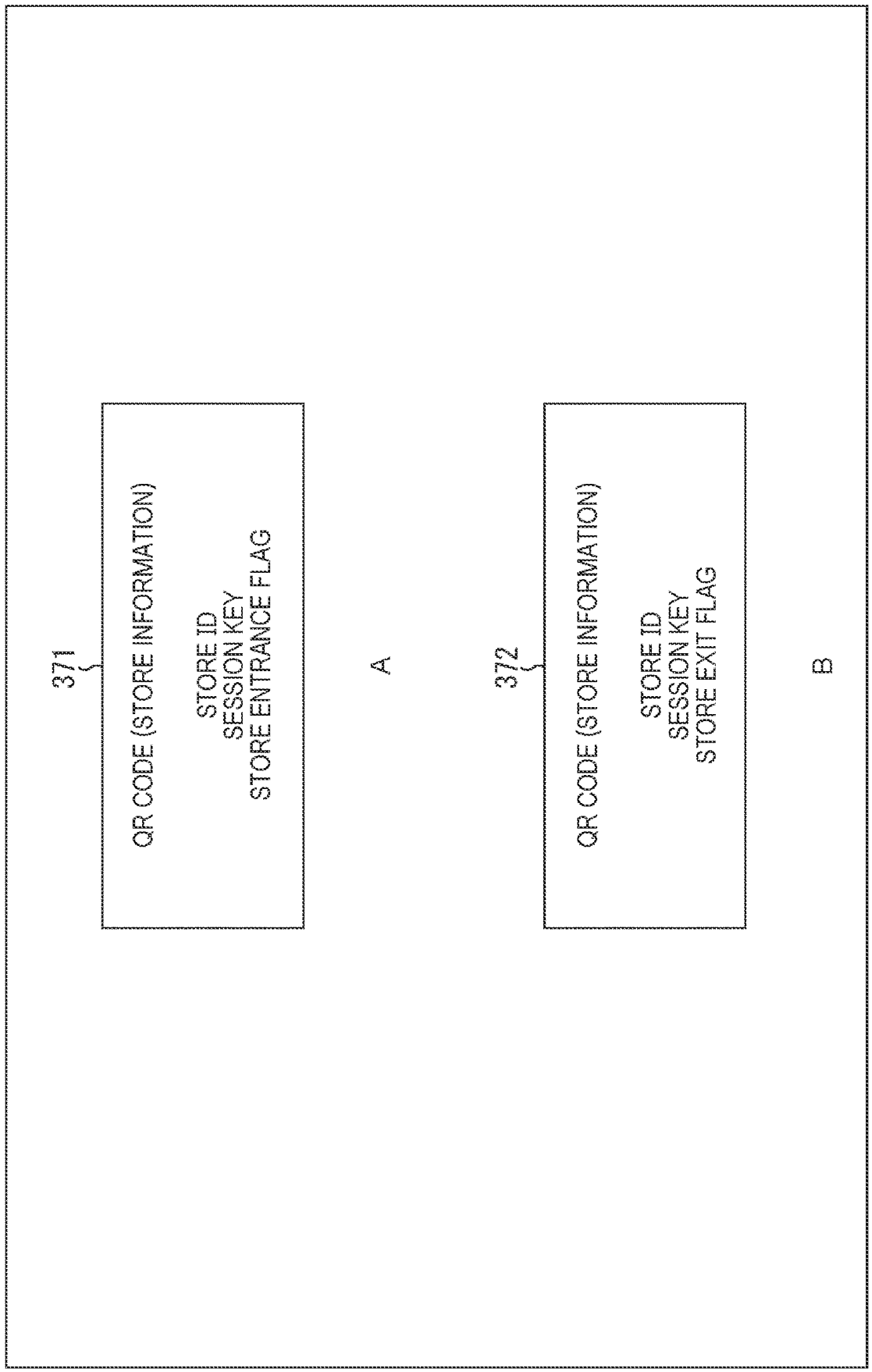
FIG. 23 is a diagram illustrating an example of information included in a QR code.

An example of the information indicated by the QR code is illustrated in A of FIG. 23. As illustrated in A of FIG. 23, the information indicated by the QR code 371 includes store information. For example, a store ID, a session key issued from the posting site server 104 by the above-described processing, a store entrance flag, and the like are included. Of course, information other than these may be included. That is, the QR code generation unit 352 generates the store information on condition that a session is being established with the posting site server 104 that is the provision destination of the captured image.

Returning to FIG. 21, in step S303, the QR code providing unit 353 controls the display (display unit) of the output unit 172 to display the image of the QR code with expiration time generated by the QR code generation unit 352. The user holds the reader (imaging unit 112) of the imaging device 101 over the display of the store terminal device 102 on which the image of the QR code with expiration time is displayed. That is, the QR code providing unit 353 provides the store information to the imaging device 101.

In step S314, the QR code reading unit 342 of the imaging device 101 controls the imaging unit 112 to read the QR code displayed on the display of the store terminal device 102 (that is, the information indicated by the QR code). The imaging unit 112 captures an image of the QR code displayed on the display of the store terminal device 102, analyzes the QR code included in the captured image, and reads information. The imaging unit 112 supplies the read information to the information processing unit 111 (QR code reading unit 342). As described above, the store information and the like are provided from the store terminal device 102 to the imaging device 101 using the QR code.

In step S315, the store entrance proof information providing unit 343 of the imaging device 101 controls the communication unit 124 to supply the QR code (information indicated by the QR code) read as described above and the user information as the store entrance proof information to the verification server 103. Note that the user information includes a user ID and position information of the imaging device 101. In accordance with the control, the communication unit 124 transmits the store entrance proof information supplied from the store entrance proof information providing unit 343 to the verification server 103 via the network 105. In step S331, the store entrance proof information acquisition unit 242 of the verification server 103 acquires the store entrance proof information via the communication unit 224.

Figure 22:
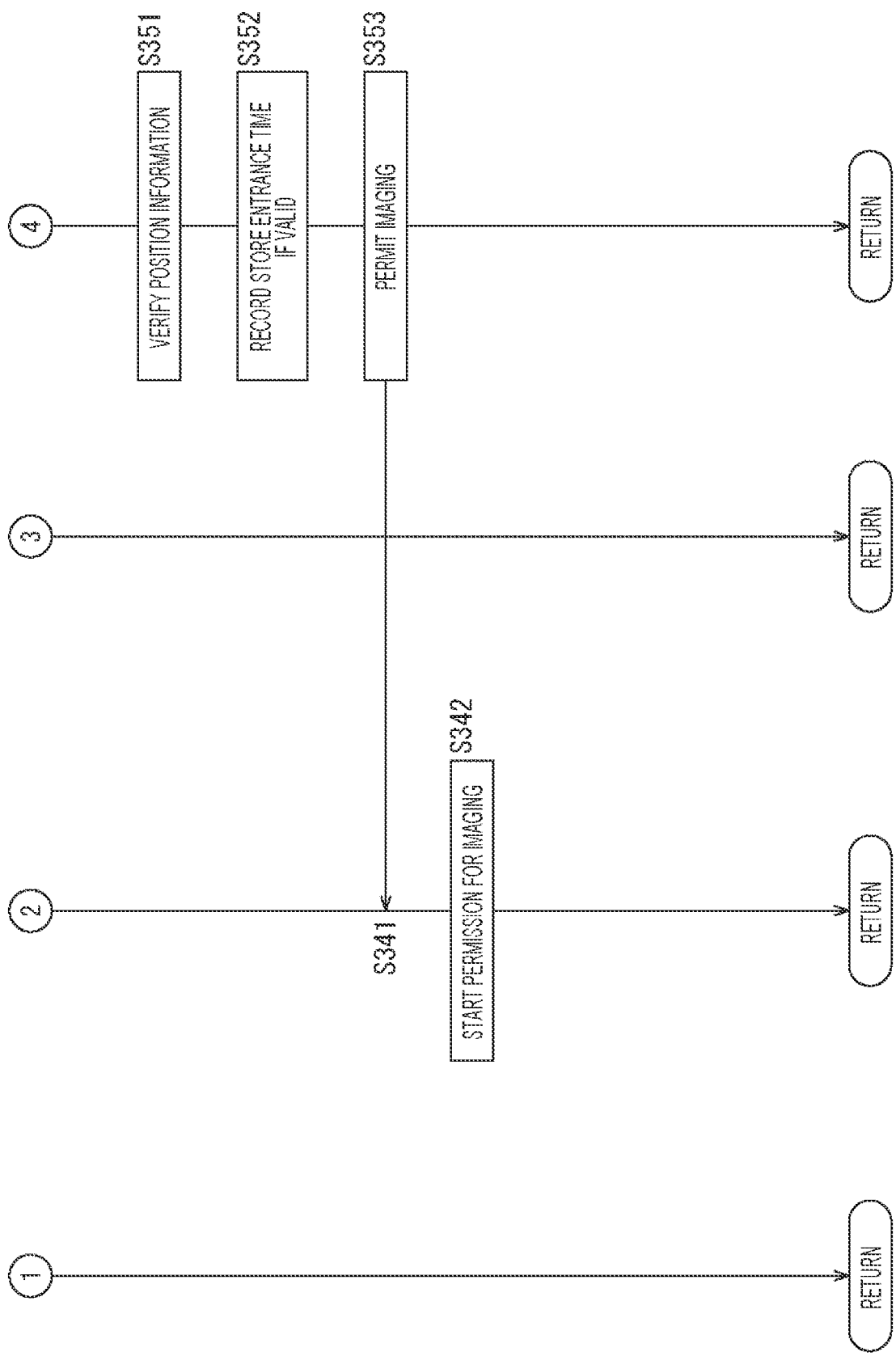
FIG. 22 is a flowchart illustrating an example of the flow of the store entrance proof processing, following FIG. 21.

In step S351 of FIG. 22, the store entrance proof information verification unit 243 verifies whether the position information of the imaging device 101 included in the store entrance proof information is valid. For example, in a case where it is determined that the position information of the imaging device 101 matches the position information corresponding to the store ID indicated by the QR code or is located sufficiently close to the store ID, the store entrance proof information verification unit 243 determines that the position information of the imaging device 101 is valid.

In a case where the position information of the imaging device 101 is determined to be valid, the store entrance time recording unit 244 records the current time (which may be the transmission time or the reception time of the store entrance proof information) in the verification data storage unit 212 as the store entrance time in step S352.

Then, in step S353, the imaging control unit 245 controls the communication unit 224 and supplies control information for permitting imaging to the imaging device 101. In accordance with the control, the communication unit 224 transmits the control information (control information for permitting imaging) supplied from the imaging control unit 245 to the imaging device 101 via the network 105. In step S341, the control information acquisition unit 144 of the imaging device 101 acquires the control information via the communication unit 124.

In step S342, the imaging control unit 145 activates a dedicated application on the basis of the control information, and permits imaging using the imaging unit 112 (starts permitting imaging). When permission for imaging is started, the store entrance proof processing ends, and the processing returns to FIG. 11.

<Flow of Store Exit Proof Processing>

An example of a flow of the store exit proof processing in this case will be described with reference to flowcharts of FIGS. 24 and 25.

Figure 24:
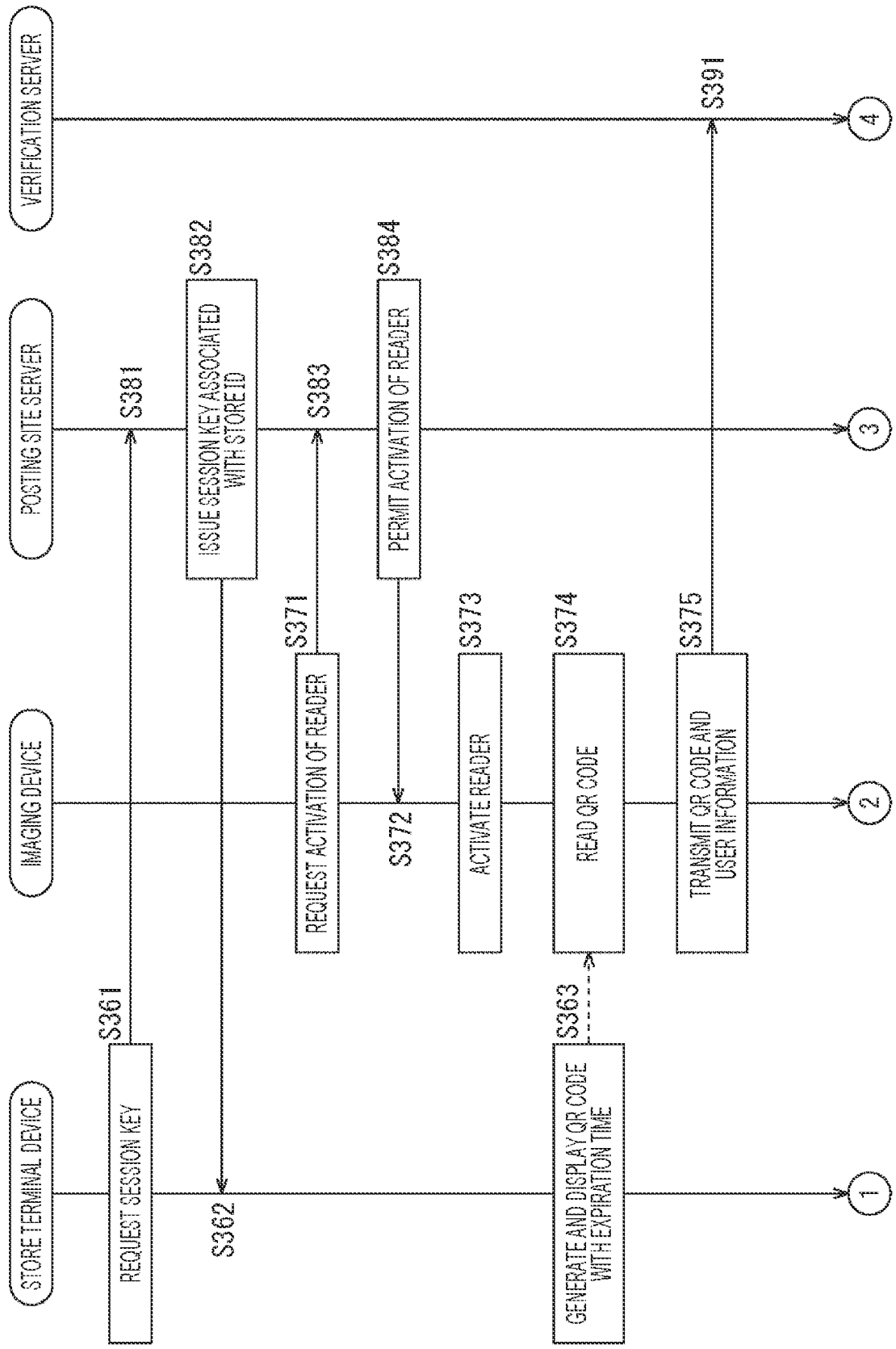
FIG. 24 is a flowchart illustrating an example of a flow of store exit proof processing.

When the store exit proof processing is started, the session key request unit 351 of the store terminal device 102 controls the communication unit 174 to request a session key from the posting site server 104 in step S361 of FIG. 24. At that time, the session key request unit 351 supplies the posting site server 104 with store information that is information regarding the store. The store information includes, for example, a store ID and the like which are identification information of a store. In step S381, the request acceptance unit 291 of the posting site server 104 accepts the request.

In step S382, the session key issuing unit 292 issues a session key associated with the supplied store ID. That is, the session key issuing unit 292 generates a session key associated with the store ID, and controls the communication unit 274 to supply the session key to the store terminal device 102. In step S362, the session key request unit 351 of the store terminal device 102 acquires the session key via the communication unit 174.

Furthermore, in step S371, the reader control unit 341 of the imaging device 101 controls the communication unit 124 to request the posting site server 104 to activate the reader. In step S383, the request acceptance unit 291 of the posting site server 104 accepts the request.

In step S384, the reader control unit 361 permits activation of the reader. That is, the reader control unit 361 controls the communication unit 274 and supplies control information for permitting activation of the reader to the imaging device 101. In step S372, the reader control unit 341 of the imaging device 101 acquires the control information via the communication unit 124. In step S373, the reader control unit 341 activates an application that uses the imaging unit 112 as a reader of the QR code on the basis of the control information. The imaging unit 112 is used as a reader by this application.

When the session key is acquired in the store terminal device 102, the QR code generation unit 352 generates a QR code with expiration time using the session key in step S363. An example of the information indicated by the QR code is illustrated in B of FIG. 23. As illustrated in B of FIG. 23, the information indicated by the QR code 372 includes store information. For example, a store ID, a session key issued from the posting site server 104 by the above-described processing, a store exit flag, and the like are included. Of course, information other than these may be included. That is, the QR code generation unit 352 generates the store information on condition that a session is being established with the posting site server 104 that is the provision destination of the captured image.

Returning to FIG. 24, in step S363, the QR code providing unit 353 controls the display (display unit) of the output unit 172 to display the image of the QR code with expiration time generated by the QR code generation unit 352. The user holds the reader (imaging unit 112) of the imaging device 101 over the display of the store terminal device 102 on which the image of the QR code with expiration time is displayed. That is, the QR code providing unit 353 provides the store information to the imaging device 101.

In step S374, the QR code reading unit 342 of the imaging device 101 controls the imaging unit 112 to read the QR code displayed on the display of the store terminal device 102 (that is, the information indicated by the QR code). The imaging unit 112 captures an image of the QR code displayed on the display of the store terminal device 102, analyzes the QR code included in the captured image, and reads information. The imaging unit 112 supplies the read information to the information processing unit 111 (QR code reading unit 342). As described above, the store information and the like are provided from the store terminal device 102 to the imaging device 101 using the QR code.

In step S375, the store exit proof information providing unit 344 of the imaging device 101 controls the communication unit 124 to supply the QR code (information indicated by the QR code) read as described above and the user information to the verification server 103 as the store exit proof information. Note that the user information includes a user ID and position information of the imaging device 101. In accordance with the control, the communication unit 124 transmits the store exit proof information supplied from the store exit proof information providing unit 344 to the verification server 103 via the network 105. In step S391, the store exit proof information acquisition unit 249 of the verification server 103 acquires the store exit proof information via the communication unit 224.

Figure 25:
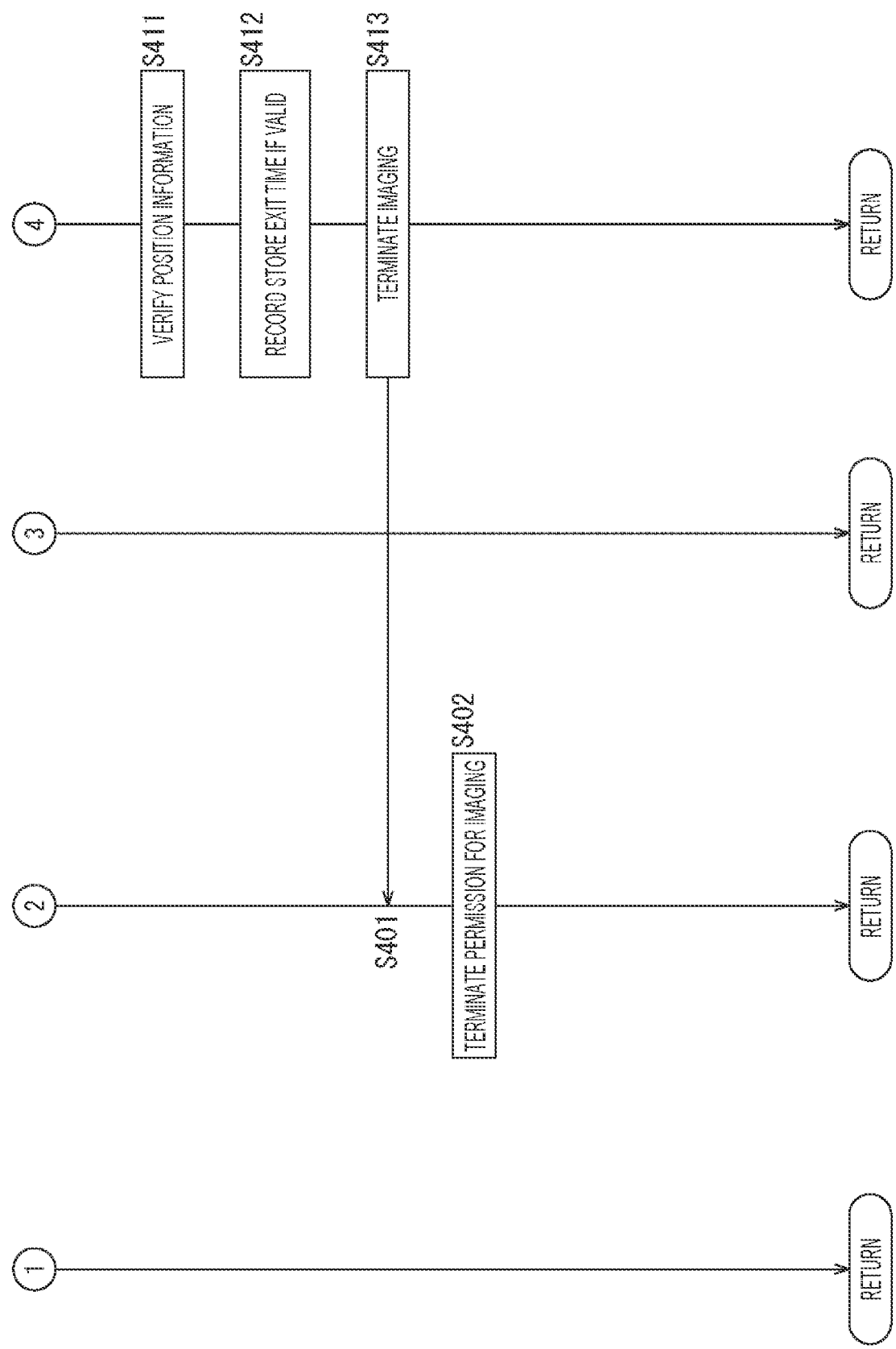
FIG. 25 is a flowchart illustrating an example of the flow of the store exit proof processing, following FIG. 24.

In step S411 of FIG. 25, the store exit proof information verification unit 250 verifies whether the position information of the imaging device 101 included in the store exit proof information is valid. For example, in a case where it is determined that the position information of the imaging device 101 matches the position information corresponding to the store ID indicated by the QR code or is located sufficiently close to the store ID, the store exit proof information verification unit 250 determines that the position information of the imaging device 101 is valid.

In a case where the position information of the imaging device 101 is determined to be valid, the store exit time recording unit 251 records the current time (which may be the transmission time or the reception time of the store entrance proof information) in the verification data storage unit 212 as the store exit time in step S412.

Then, in step S413, the imaging control unit 245 controls the communication unit 224 and supplies control information for terminating the permission for imaging to the imaging device 101. In accordance with the control, the communication unit 224 transmits control information (control information for terminating permission for imaging) supplied from the imaging control unit 245 to the imaging device 101 via the network 105. In step S401, the control information acquisition unit 144 of the imaging device 101 acquires the control information via the communication unit 124.

In step S402, the imaging control unit 145 terminates the dedicated application on the basis of the control information, and terminates the imaging using the imaging unit 112 (terminates the permission for imaging). When the permission for imaging is terminated, the store exit proof processing is terminated, and the processing returns to FIG. 11.

By executing each processing in this manner, it is possible to suppress the posting of the fictitious review and to suppress the reduction in the reliability of the review, similarly to the case of the first embodiment. That is, it is possible to suppress a decrease in reliability of the service of the posting site.

<Case of Store Entrance Proof Processing Only>

Note that, also in this case as well, as in the case of the first embodiment, out of the store entrance proof processing and the store exit proof processing as described above, only the store entrance proof processing may be performed. For example, as illustrated in A of FIG. 17, imaging within a predetermined valid period from the store entrance time (time X) may be permitted by the store entrance proof processing.

That is, the imaging control unit 145 may permit imaging by the imaging unit 112 within the valid period indicated by the captured image valid period information obtained from the external device by providing the imaging location information and the user information to the external device (for example, the verification server 103). For example, when the store entrance proof information providing unit 343 provides the imaging location information and the user information to the external device, the control information acquisition unit 144 may acquire the captured image valid period information indicating the valid period after the provision of the user information from the external device, and the imaging control unit 145 may permit imaging within the valid period designated on the basis of the captured image valid period information.

In this way, the store exit proof processing can be omitted, and the reliability of the review can be more easily suppressed from being reduced.

<Case of Store Exit Proof Processing Only>

Furthermore, also in this case, similarly to the case of the first embodiment, out of the store entrance proof processing and the store exit proof processing as described above, only the store exit proof processing may be performed. For example, as illustrated in B of FIG. 17, posting of a captured image generated within a predetermined valid period up to the store exit time (time Y) may be permitted by the store exit proof processing.

That is, imaging may be always permitted, and the post processing unit 147 may provide the imaging location information and the user information to an external device (for example, the verification server 103) to permit posting of the captured image captured within the valid period indicated by the captured image valid period information obtained from the external device. For example, when the store exit proof information providing unit 344 provides the imaging location information and the user information to the external device, the control information acquisition unit 144 may acquire the captured image valid period information indicating the valid period before the provision of the user information from the external device, and the imaging control unit 145 may permit imaging within the valid period designated on the basis of the captured image valid period information.

In this way, the store entrance proof processing can be omitted, and the reduction in the reliability of the review can be more easily suppressed.

4. THIRD EMBODIMENT

<Imaging by Registered Imaging Device>

In the first embodiment and the second embodiment, the imaging device 101 has been described to perform the store entrance proof processing, the store exit proof processing, and the like. However, processing such as the store entrance proof processing and the store exit proof processing may be performed by a device other than the imaging device. Information regarding the imaging device in that case may be registered in the review system 100 (the verification server 103 and the like). In a case where the imaging device has been registered, similarly to the case of the first embodiment and the second embodiment, the captured image is guaranteed (that is, the store entrance proof processing and the store exit proof processing are performed) using the identification information of the imaging device.

<Review System>

Figure 26:
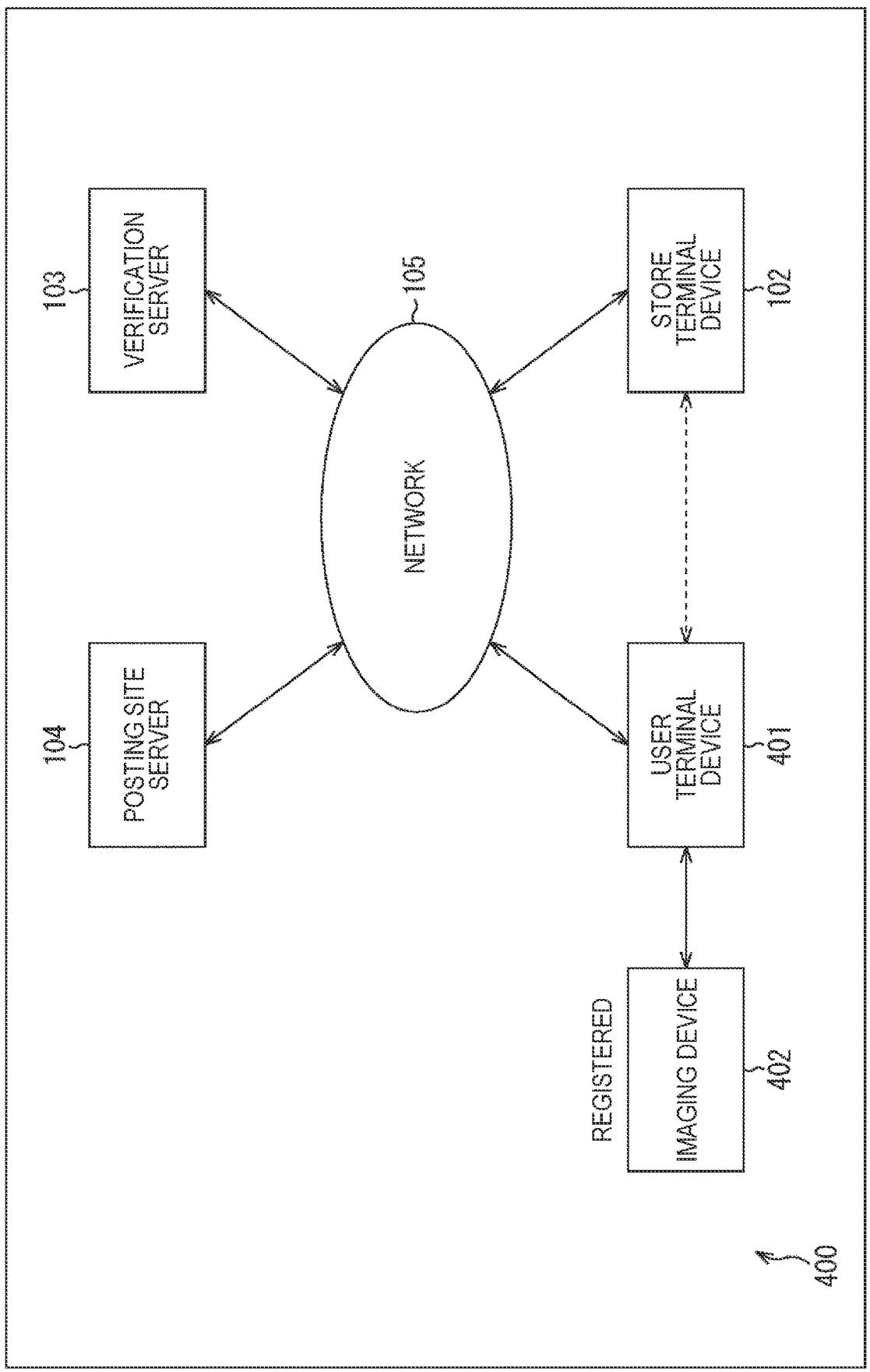
FIG. 26 is a diagram illustrating a main configuration example of a review system.

A main configuration example of the review system in this case is illustrated in FIG. 26. A review system 400 illustrated in FIG. 26 is a system similar to the review system 100 (FIG. 2). The review system 400 includes a user terminal device 401 and an imaging device 402 instead of the imaging device 101. The user terminal device 401 and the imaging device 402 are image processing apparatuses owned by a user who posts reviews.

Similarly to the imaging device 101, the user terminal device 401 has a communication function, and can communicate with each device of the store terminal device 102 to the posting site server 104 via the network 105 using the communication function. Furthermore, the user terminal device 401 can exchange information with the store terminal device 102 using a QR code. For example, the user terminal device 401 has a display function and can display the QR code and the like. Furthermore, the user terminal device 401 may have a QR code reader function and be able to read information of the QR code. The user terminal device 401 has a communication function, communicates with the imaging device 402, and can exchange information (for example, a captured image, control information, and the like).

The imaging device 402 has an imaging function, and can generate a captured image by imaging a subject. Furthermore, the imaging device 402 has a communication function, communicates with the user terminal device 401, and can exchange information (for example, a captured image, control information, and the like).

In the review system 400, the user terminal device 401 and the like perform store entrance proof processing and store exit proof processing, and imaging by the imaging device 402 is permitted from user's store entrance to store exit on the basis of these processing. Furthermore, the user terminal device 401 supplies the user information to the store terminal device 102 using the QR code. The store terminal device 102 performs the store entrance proof processing and the store exit proof processing using the user information and the location information indicating the location of the store.

With such processing, it is guaranteed that the user has captured an image and generated a captured image in the store before actually entering and exiting the store.

<User Terminal Device>

Figure 27:
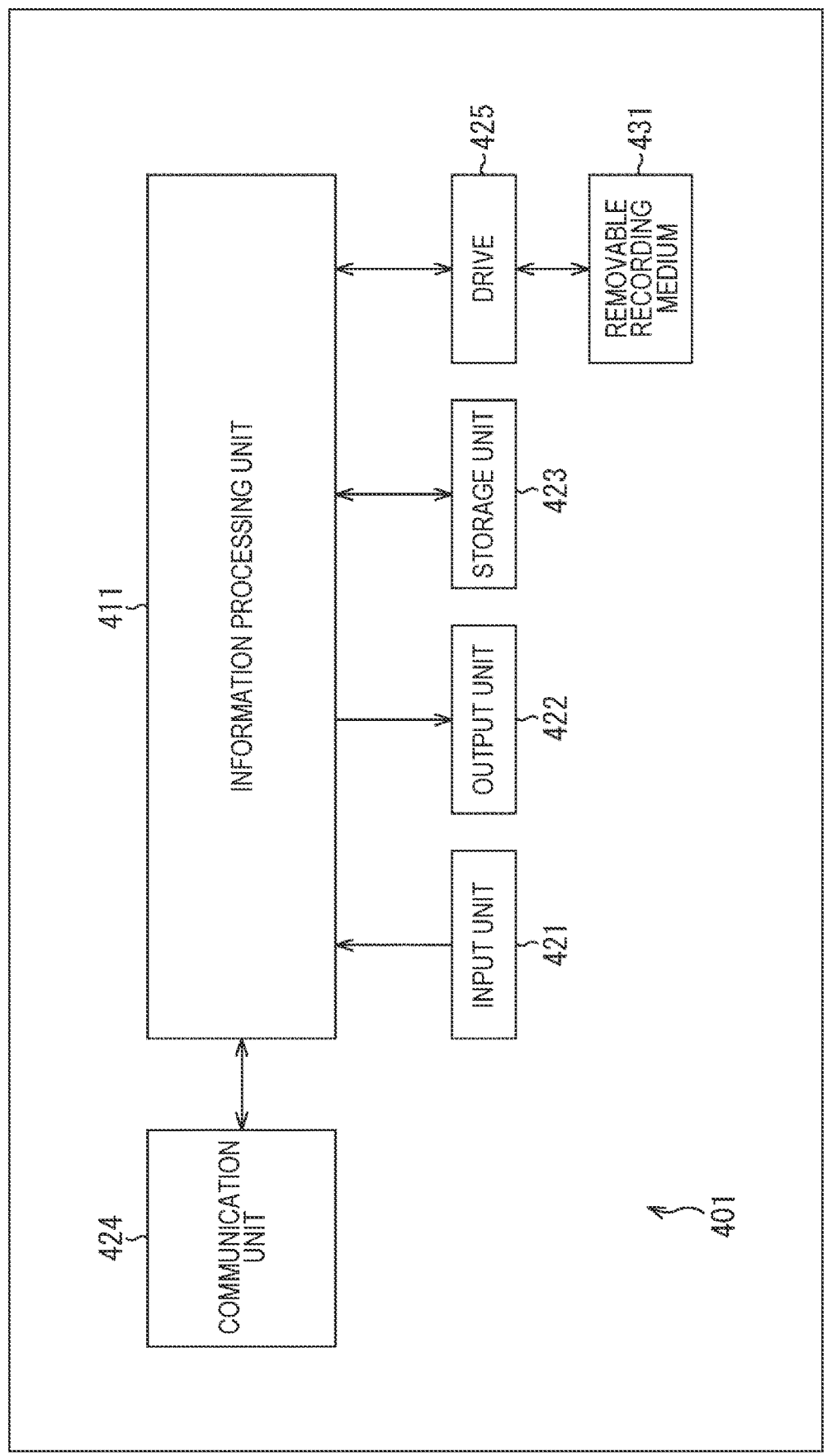
FIG. 27 is a block diagram illustrating a main configuration example of a user terminal device.

FIG. 27 is a diagram illustrating a main configuration example of a user terminal device 401 which is an embodiment of an image processing apparatus to which the present technology is applied. As illustrated in FIG. 27, the user terminal device 401 includes an information processing unit 411, an input unit 421, an output unit 422, a storage unit 423, a communication unit 424, and a drive 425.

The information processing unit 411 is a computer that includes, for example, a CPU, a ROM, a RAM, and the like, and can implement various functions by executing an application program (software) using the CPU, the ROM, the RAM, and the like. For example, the information processing unit 411 can install and execute an application program (software) that performs processing related to posting of a review.

The input unit 421 includes, for example, input devices such as a keyboard, a mouse, a microphone, a touch panel, and an input terminal, and can supply information input via these input devices to the information processing unit 411.

The output unit 422 includes, for example, output devices such as a display (display unit), a speaker (audio output unit), and an output terminal, and can output the information supplied from the information processing unit 411 via these output devices.

The storage unit 423 includes, for example, a storage medium such as a hard disk, a RAM disk, or a non-volatile memory, and can store the information supplied from the information processing unit 411 in the storage medium. The storage unit 423 can read information stored in the storage medium and supply the information to the information processing unit 411.

The communication unit 424 includes, for example, a network interface, can receive information transmitted from another device via the network 105, and can supply the received information to the information processing unit 411. The communication unit 424 can transmit the information supplied from the information processing unit 411 to another device via the network 105.

The drive 425 has an interface of a removable recording medium 431 such as a magnetic disk, an optical disk, a magneto-optical disk, or a semiconductor memory, and can read information recorded on the removable recording medium 431 attached thereto and supply the information to the information processing unit 411. The drive 425 can record the information supplied from the information processing unit 411 in the writable removable recording medium 431 attached to itself.

For example, the information processing unit 411 loads and executes an application program stored in the storage unit 423. At that time, the information processing unit 411 can appropriately store data and the like necessary for executing various types of processing. The application program, data, and the like can be provided by being recorded in the removable recording medium 431 as a package medium and the like, for example. In that case, the application program, data, and the like are read by the drive 425 to which the removable recording medium 431 is attached, and are installed in the storage unit 423 via the information processing unit 411. Furthermore, the application program can also be provided via a wired or wireless transmission medium such as a local area network, the Internet, or digital satellite broadcasting. In this case, the application program, the data, and the like are received by the communication unit 424 and installed in the storage unit 423 via the information processing unit 411. Furthermore, the application program, data, and the like can be installed in advance in the ROM or the storage unit 423 in the information processing unit 411.

<Functional Block of User Terminal Device>

Figure 28:
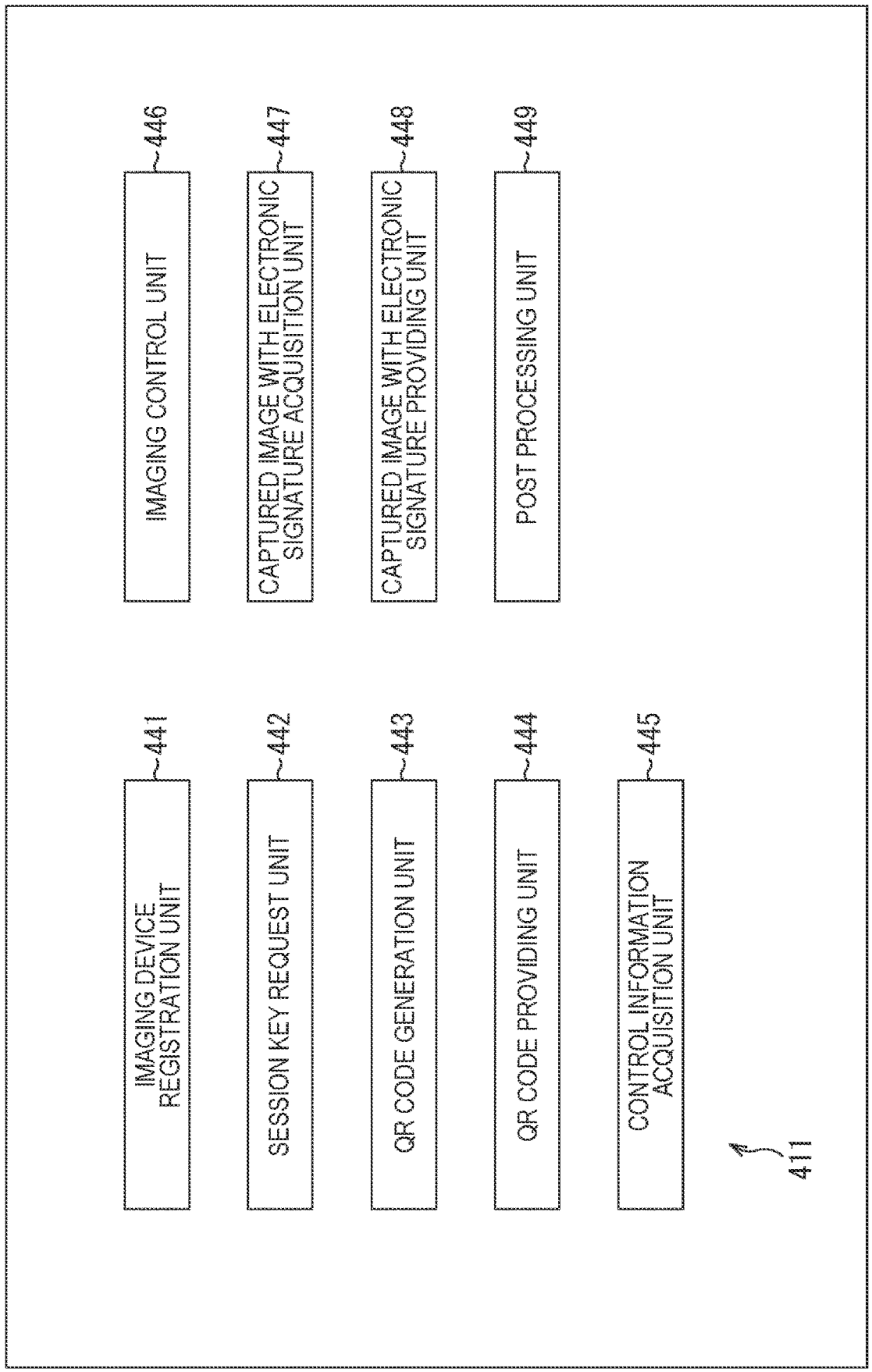
FIG. 28 is a functional block diagram illustrating functions implemented in the user terminal device.

A function implemented by the information processing unit 411 executing the application program is illustrated in FIG. 28 as a functional block. As illustrated in FIG. 28, the information processing unit 411 can include, as functional blocks, an imaging device registration unit 441, a session key request unit 442, a QR code generation unit 443, a QR code providing unit 444, a control information acquisition unit 445, an imaging control unit 446, a captured image with electronic signature acquisition unit 447, a captured image with electronic signature providing unit 448, and a post processing unit 449 by executing an application program.

The imaging device registration unit 441 performs processing related to registration of the imaging device 402. The session key request unit 442 performs processing related to a request for a session key. The QR code generation unit 443 performs processing related to generation of a QR code. The QR code providing unit 444 performs processing related to provision of the QR code. The control information acquisition unit 445 performs processing related to acquisition of control information. The imaging control unit 446 performs processing related to control of the imaging unit 112. The captured image with electronic signature acquisition unit 447 performs processing related to acquisition of the captured image with electronic signature. The captured image with electronic signature providing unit 448 performs processing related to provision of the captured image with electronic signature. The post processing unit 449 performs processing related to review posting.

<Functional Block of Imaging Device>

The imaging device 402 has a configuration similar to that of the imaging device 101. That is, the configuration described with reference to FIG. 3 can also be applied to the imaging device 402.

Figure 29:
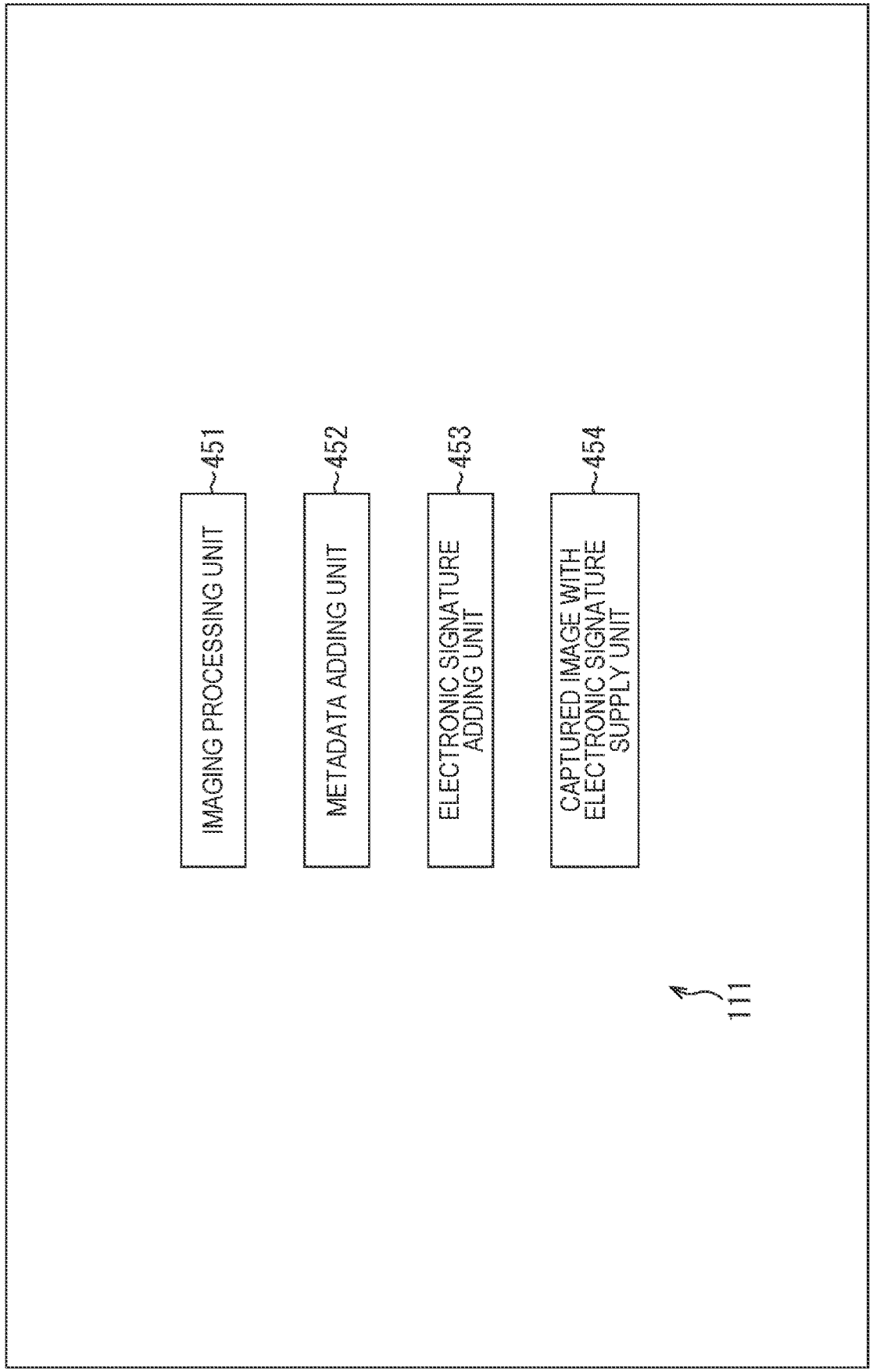
FIG. 29 is a functional block diagram illustrating functions implemented in an imaging device.

FIG. 29 illustrates functions implemented by the information processing unit 111 of the imaging device 402 executing the application program as functional blocks. As illustrated in FIG. 29, the information processing unit 111 can include an imaging processing unit 451, a metadata adding unit 452, an electronic signature adding unit 453, and a captured image with electronic signature supply unit 454 as functional blocks by executing an application program.

The imaging processing unit 451 performs processing related to imaging. The metadata adding unit 452 performs processing related to adding (associating) metadata to the captured image. The electronic signature adding unit 453 performs processing related to addition (association) of an electronic signature to a captured image and metadata. The captured image with electronic signature supply unit 454 performs processing related to supply of the captured image with electronic signature.

<Functional Block of Verification Server>

Each of the store terminal device 102 and the posting site server 104 has a similar configuration to the case of the first embodiment and the second embodiment, and can implement similar functions (has similar functional blocks).

Figure 30:
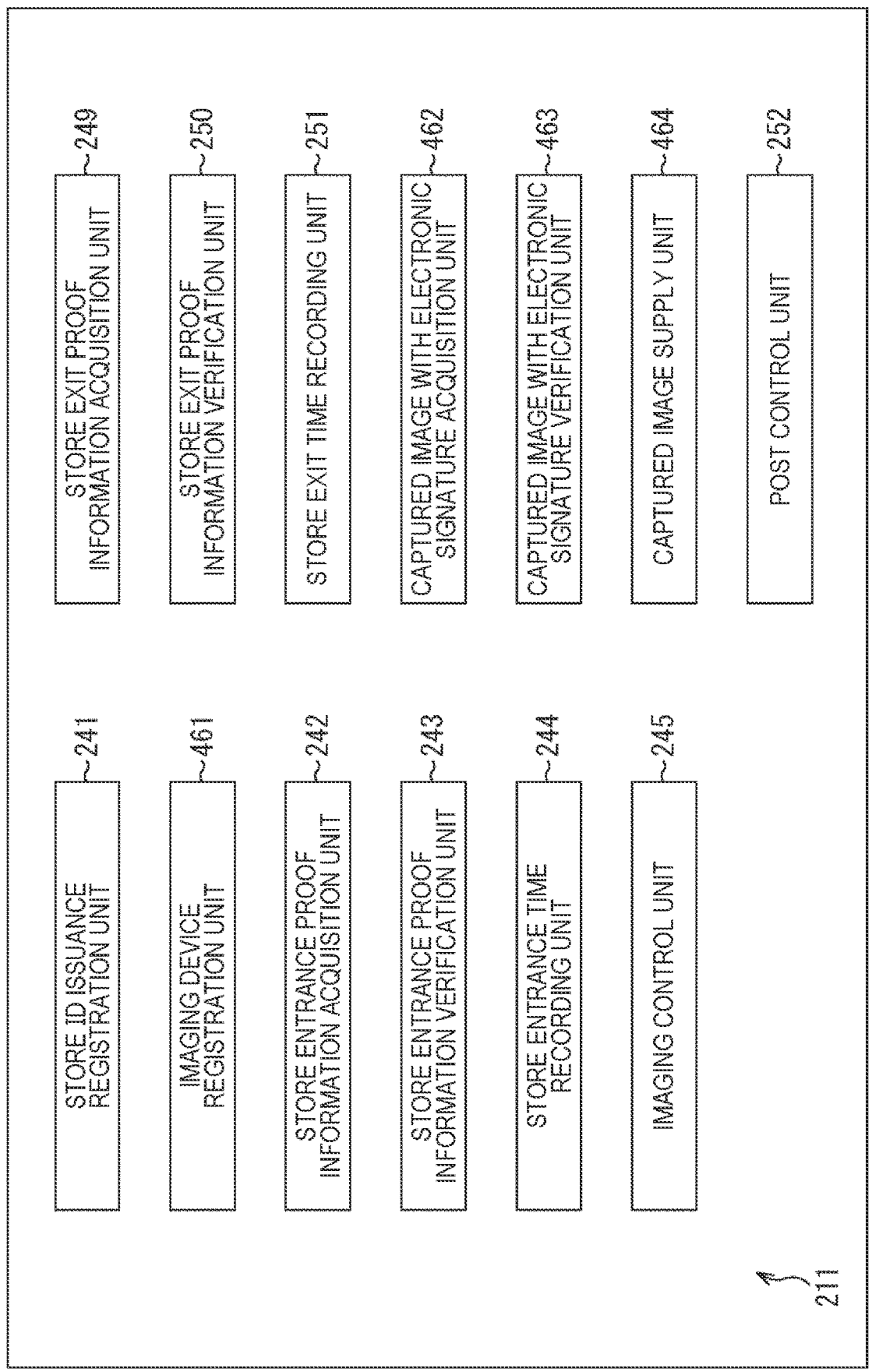
FIG. 30 is a functional block diagram illustrating functions implemented in a verification server.

A function implemented by the information processing unit 211 of the verification server 103 executing the application program is illustrated in FIG. 30 as a functional block. As illustrated in FIG. 30, the information processing unit 211 can include, as functional blocks, a store ID issuance registration unit 241, an imaging device registration unit 461, a store entrance proof information acquisition unit 242, a store entrance proof information verification unit 243, a store entrance time recording unit 244, an imaging control unit 245, a store exit proof information acquisition unit 249, a store exit proof information verification unit 250, a store exit time recording unit 251, a captured image with electronic signature acquisition unit 462, a captured image with electronic signature verification unit 463, a captured image supply unit 464, and a post control unit 252 by executing an application program.

The imaging device registration unit 461 performs processing related to registration of the imaging device 402. The captured image with electronic signature acquisition unit 462 performs processing related to acquisition of the captured image with electronic signature. The captured image with electronic signature verification unit 463 performs processing related to verification of the captured image with an electronic signature. The captured image supply unit 464 performs processing related to supply of a captured image.

<Flow of Processing Related to Review Posting>

An example of a flow of processing related to review posting executed by the review system 400 will be described with reference to flowcharts of FIGS. 31 and 32. Each device of the review system 400 realizes posting of review by the user by executing each processing in a flow as in this flowchart.

When the processing is started, processing of registering a store (store information) is performed. In step S501 of FIG. 31, the store information registration unit 191 of the store terminal device 102 controls the communication unit 174 to supply store information, which is information regarding the store in which it is installed, to the verification server 103 via the network 105, and causes the verification server 103 to register the store information. In step S541, the store ID issuance registration unit 241 of the verification server 103 controls the communication unit 224 to receive the store information transmitted by the processing in step S501. The communication unit 224 receives the store information transmitted via the network 105 on the basis of the control, and supplies the store information to the information processing unit 211.

The store information includes position information indicating a location of the store. In step S542, the store ID issuance registration unit 241 generates a store ID which is identification information of a store associated with the position information. The store ID issuance registration unit 241 controls the communication unit 224 to transmit the store ID to the store terminal device 102. On the basis of the control, the communication unit 224 transmits the store ID supplied from the information processing unit 211 to the store terminal device 102 via the network 105. Furthermore, the store ID issuance registration unit 241 supplies the store ID to the verification data storage unit 212 to store (register) the store ID.

In step S502, the store information registration unit 191 controls the communication unit 174 to receive the store ID transmitted by the processing in step S542. The communication unit 174 receives the store ID transmitted via the network 105 on the basis of the control, and supplies the store ID to the information processing unit 161. The store information registration unit 191 supplies the store ID to the storage unit 173 and stores the store ID therein.

Next, processing of registering the imaging device 402 is performed. In step S511, the imaging device registration unit 441 of the user terminal device 401 controls the communication unit 424 to supply the imaging device ID, which is identification information of the imaging device 402, to the verification server 103. In step S543, the imaging device registration unit 461 of the verification server 103 acquires the imaging device ID via the communication unit 224, and stores the imaging device ID in the verification data storage unit 212 in association with the user ID (registers the imaging device ID).

When the imaging device 402 is registered, the store terminal device 102 to the posting site server 104, and the user terminal device 401 perform the store entrance proof processing (step S503, step S512, step S531, step S544). This store entrance proof processing is performed in the similar flow as in the first embodiment (FIG. 12). However, the processing executed by the imaging device 101 is executed by the user terminal device 401.

Upon completion of the store entrance proof processing, the user terminal device 401 and the imaging device 402 perform imaging processing to perform imaging in the store and generate a captured image (step S513, step S521).

When the user exits the store, the store terminal device 102 to the posting site server 104 and the user terminal device 401 perform the store exit proof processing (step S504, step S514, step S532, step S545). This store exit proof processing is performed in the similar flow as in the case of the first embodiment (FIG. 15). However, the processing executed by the imaging device 101 is executed by the user terminal device 401.

After the store exit proof processing is performed, the captured image is uploaded. In step S571 of FIG. 32, the captured image with electronic signature acquisition unit 462 of the verification server 103 controls the communication unit 224 to supply control information for permitting posting to the user terminal device 401. In step S551, the captured image with electronic signature providing unit 448 of the user terminal device 401 acquires the control information via the communication unit 424.

In step S552, the captured image with electronic signature providing unit 448 controls the communication unit 424 on the basis of the permission, and supplies (uploads) the captured image with electronic signature acquired from the imaging device 402 to the verification server 103. In step S572, the captured image with electronic signature acquisition unit 462 of the verification server 103 acquires the captured image with electronic signature transmitted from the user terminal device 401 via the communication unit 224. Since the electronic signature is added, falsification of the captured image is suppressed.

In step S573, the captured image with the electronic signature verification unit 463 verifies the position information indicating the imaging position included in the metadata of the acquired captured image with the electronic signature, the imaging time, and the imaging device ID that is the identification information of the imaging device 402 that has generated the captured image, using the verification data stored in the verification data storage unit 212.

In a case where the imaging device ID is the registered ID, the imaging position corresponds to the position of the store, and the imaging time is between the store entrance time and the store exit time, the captured image with electronic signature verification unit 463 determines that the captured image is valid. In a case where the captured image is determined to be valid, in step S574, the captured image supply unit 464 controls the communication unit 224 to supply the captured image to the posting site server 104 as an image that can be posted. In step 3561, the post image acquisition unit 293 of the posting site server 104 acquires the captured image via the communication unit 274. Note that an electronic signature may be added to this captured image.

In step S553, the post processing unit 449 of the user terminal device 401 performs post processing to post a review. In response to this processing, the post processing unit 294 of the posting site server 104 performs the posting processing in step 3562, accepts the post of the review, and publishes the accepted review. When the review posting ends in this manner, a series of processing related to the review posting ends.

<Flow of Imaging Processing>

Figure 33:
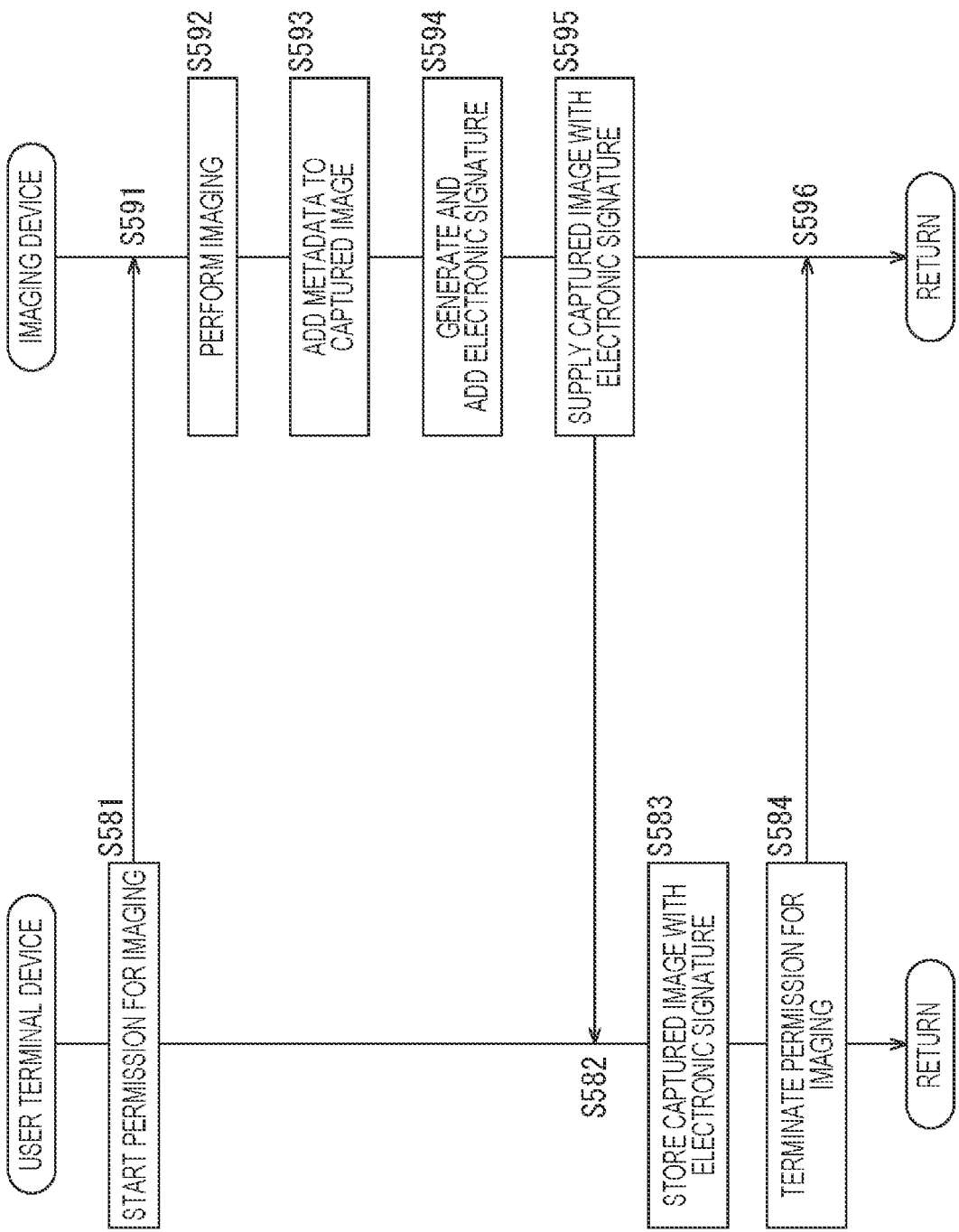
FIG. 33 is a flowchart illustrating an example of a flow of imaging processing.

An example of a flow of the imaging processing executed in FIG. 31 will be described with reference to a flowchart of FIG. 33.

When the imaging processing is started, in step S581, the imaging control unit 446 of the user terminal device 401 controls the communication unit 424 and supplies control information to the imaging device 402, thereby starting permission for imaging. In step 3591, the imaging processing unit 451 of the imaging device 402 acquires the control information via the communication unit 124.

In step S592, the imaging processing unit 451 of the imaging device 402 performs imaging using the imaging unit 112 according to the user's operation. The user uses the imaging unit 112 of the imaging device 402 to capture, for example, a landscape in a store, goods and the like sold in a store. The imaging unit 112 images a subject to generate a captured image, and supplies the captured image to the imaging processing unit 451.

Figure 34:
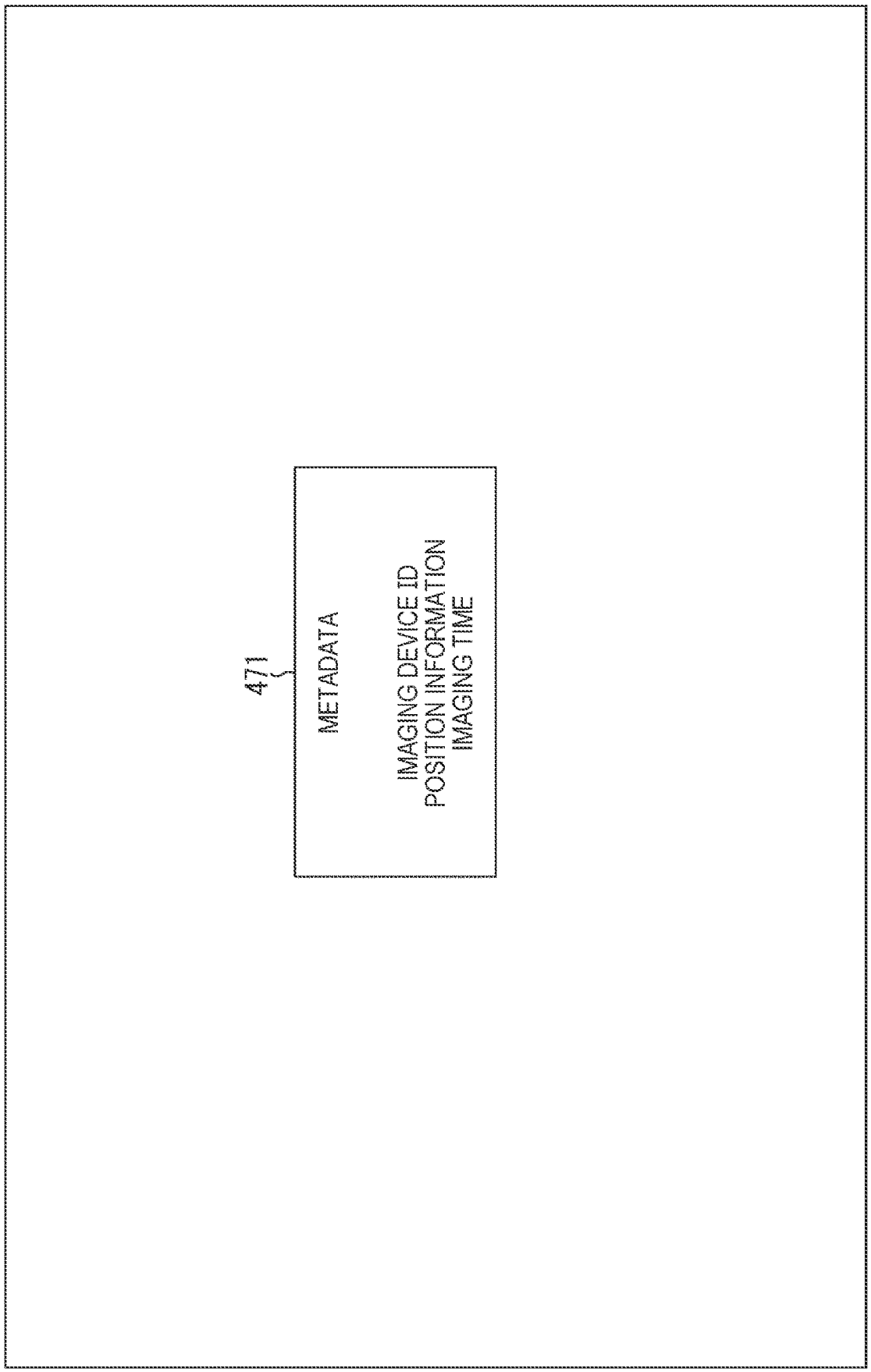
FIG. 34 is a diagram illustrating an example of metadata.

In step S593, the metadata adding unit 452 adds (associates) information such as the imaging time and the imaging location to the captured image as metadata. FIG. 34 illustrates an example of information included in the metadata. The metadata 471 illustrated in FIG. 34 includes an imaging device ID that is identification information of the imaging device 402 that has performed imaging, position information indicating an imaging location (location of the imaging device 402), and imaging time. Of course, information other than these may be included in the metadata. In step S594, the electronic signature adding unit 453 generates an electronic signature of the captured image and the metadata, and adds (associates) the electronic signature to the captured image.

In step S595, the captured image with electronic signature supply unit 454 controls the communication unit 124 to supply the captured image with electronic signature (captured image+metadata+electronic signature) generated as described above to the user terminal device 401. In step S582, the captured image with electronic signature acquisition unit 447 of the user terminal device 401 acquires the captured image with electronic signature via the communication unit 424. In step S583, the captured image with electronic signature acquisition unit 447 stores the acquired captured image with electronic signature in the storage unit 423.

In step S584, the imaging control unit 446 controls the communication unit 424 and supplies control information for terminating the permission for imaging to the imaging device 402. In step S596, the imaging processing unit 451 of the imaging device 402 acquires the control information via the communication unit 124. The imaging processing unit 451 ends imaging on the basis of the acquired control information. When the imaging ends, the imaging processing ends, and the processing returns to FIG. 31.

By executing each processing as described above, even in a case where imaging is performed using the registered imaging device 402, the store entrance proof processing and the store exit proof processing can be performed similarly to the case of the first embodiment, and it is possible to guarantee that the user who has actually visited the store is the captured image captured in the store.

Therefore, posting of fictitious reviews can be suppressed, and a reduction in reliability of the review can be suppressed. That is, it is possible to suppress a decrease in reliability of the service of the posting site.

<Case of Store Entrance Proof Processing Only>

Also in the case of the present embodiment, similarly to the case of the first embodiment, out of the store entrance proof processing and the store exit proof processing, only the store entrance proof processing may be performed. In this case, for example, as illustrated in A of FIG. 17, imaging within a predetermined valid period from the store entrance time (time X) may be permitted by the store entrance proof processing. In this way, the store exit proof processing can be omitted, and the reliability of the review can be more easily suppressed from being reduced.

<Case of Store Exit Proof Processing Only>

Also in the present embodiment, similarly to the first embodiment, out of the store entrance proof processing and the store exit proof processing, only the store exit proof processing may be performed. In this case, for example, as illustrated in B of FIG. 17, posting of the captured image generated within a predetermined valid period up to the store exit time (time Y) may be permitted by the store exit proof processing. In this way, the store entrance proof processing can be omitted, and the reduction in the reliability of the review can be more easily suppressed.

<Transfer of Store Information>

As in the case of the second embodiment, the store information may be supplied from the store terminal device 102 to the user terminal device 401 using the QR code in the store entrance proof processing and the store exit proof processing. In this case, the user terminal device 401 supplies the store entrance proof information and the store exit proof information to the verification server 103.

<Functional Block of User Terminal Device>

Figure 35:
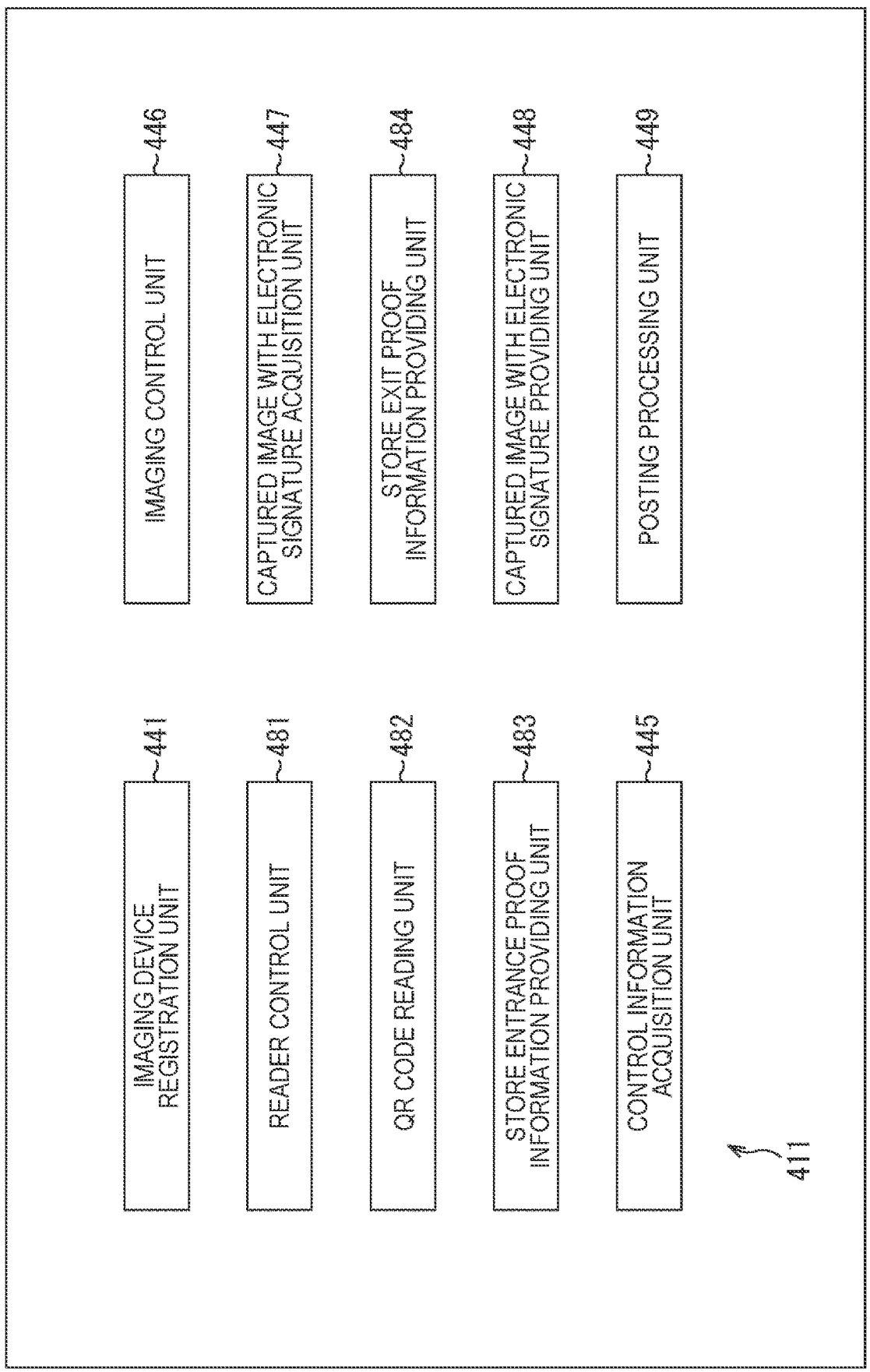
FIG. 35 is a functional block diagram illustrating functions implemented in a user terminal device.

FIG. 35 illustrates, as functional blocks, functions implemented by the information processing unit 411 of the user terminal device 401 in this case executing the application program. As illustrated in FIG. 35, the information processing unit 411 can include, as functional blocks, an imaging device registration unit 441, a reader control unit 481, a QR code reading unit 482, a store entrance proof information providing unit 483, a control information acquisition unit 445, an imaging control unit 446, a captured image with electronic signature acquisition unit 447, a store exit proof information providing unit 484, a captured image with electronic signature providing unit 448, and a post processing unit 449 by executing an application program.

The reader control unit 481 performs processing related to the control of the reader. In this case, the user terminal device 401 includes a reader of a QR code as an input device of the input unit 421. The reader control unit 481 performs processing related to control of the reader (input unit 421).

The QR code reading unit 482 performs processing related to reading of the QR code. The store entrance proof information providing unit 483 performs processing related to provision of the store entrance proof information which is information for proving user's entrance into a store. The store exit proof information providing unit 484 performs processing related to the provision of the store exit proof information which is information proving user's exit from the store.

<Functional Blocks of Other Devices>

In this case, the imaging device 402 can have functional blocks similar to those in the example of FIG. 29. The store terminal device 102 can have functional blocks similar to those in the example of FIG. 19. The verification server 103 may have functional blocks similar to those in the example of FIG. 30. The posting site server 104 can have functional blocks similar to those in the example of FIG. 20.

<Flow of Each Processing>

Figure 31:
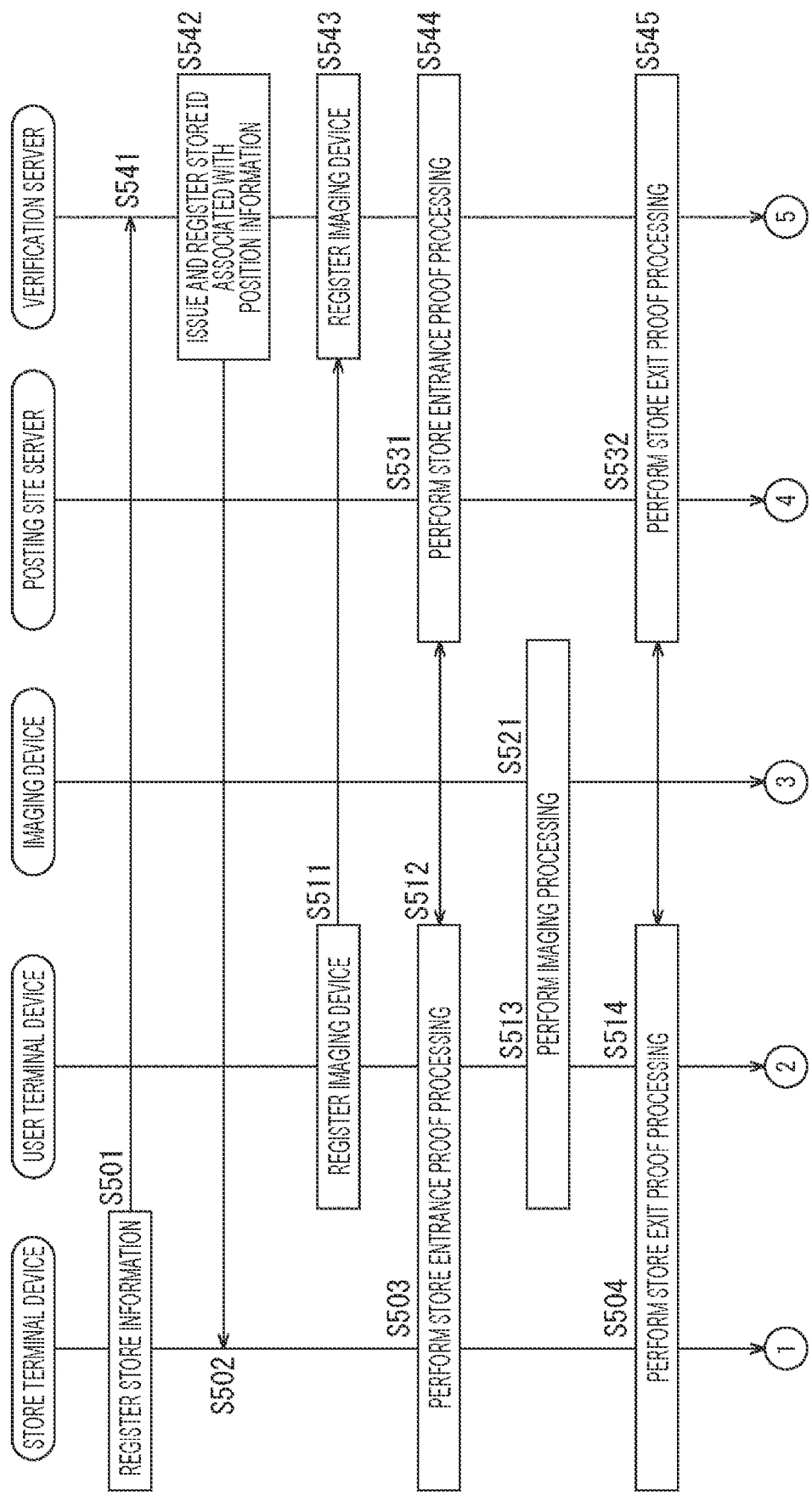
FIG. 31 is a flowchart illustrating an example of a flow of processing related to review posting.
Figure 32:
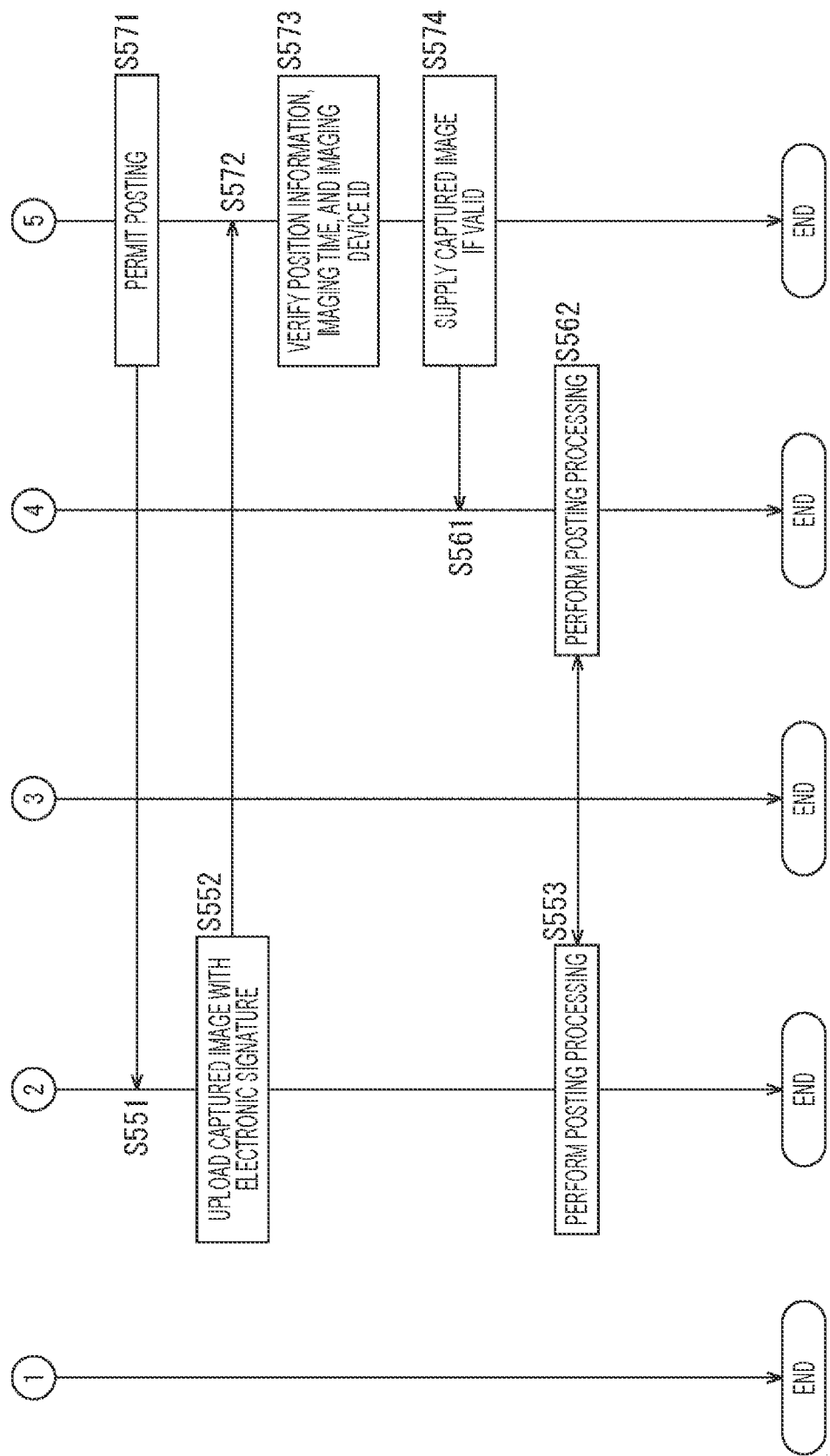
FIG. 32 is a flowchart illustrating an example of the flow of the processing related to review posting, following FIG. 31.

In this case, the processing related to the review posting is executed in a flow similar to the flowcharts of FIGS. 31 and 32. Furthermore, the imaging processing is executed in a flow similar to the flowchart of FIG. 33. The store entrance proof processing is executed in a flow similar to the flowcharts of FIGS. 21 and 22, and the store exit proof processing is executed in a flow similar to the flowcharts of FIGS. 24 and 25. However, in the store entrance proof processing and the store exit proof processing, the processing described to be executed by the imaging device 101 is executed by the user terminal device 401.

By executing each processing in this manner, in the store entrance proof processing and the store exit proof processing, it is possible to suppress the posting of the fictitious review and to suppress the reduction in the reliability of the review, similarly to the case where the user information is supplied from the user terminal device 401 to the store terminal device 102 using the QR code. That is, it is possible to suppress a decrease in reliability of the service of the posting site.

<Case of Store Entrance Proof Processing Only>

Also in this case, as in the case of the second embodiment, out of the store entrance proof processing and the store exit proof processing, only the store entrance proof processing may be performed. In this case, for example, as illustrated in A of FIG. 17, imaging within a predetermined valid period from the store entrance time (time X) may be permitted by the store entrance proof processing. In this way, the store exit proof processing can be omitted, and the reliability of the review can be more easily suppressed from being reduced.

<Case of Store Exit Proof Processing Only>

Also in this case, as in the case of the second embodiment, out of the store entrance proof processing and the store exit proof processing, only the store exit proof processing may be performed. In this case, for example, as illustrated in B of FIG. 17, posting of the captured image generated within a predetermined valid period up to the store exit time (time Y) may be permitted by the store exit proof processing. In this way, the store entrance proof processing can be omitted, and the reduction in the reliability of the review can be more easily suppressed.

5. FOURTH EMBODIMENT

<Imaging by Unregistered Imaging Device>

In the third embodiment. Although it has been described that imaging is performed by the registered imaging device 402, the present disclosure is not limited thereto, and a captured image generated using an unregistered imaging device may be guaranteed to be a captured image captured in a store by a user who has actually visited the store. In that case, since the imaging device is not registered, the identification information cannot be used, and thus, the captured image is guaranteed (that is, the store entrance proof processing and the store exit proof processing are performed) using the session key that is the identification information of the session.

<Review System>

Figure 36:
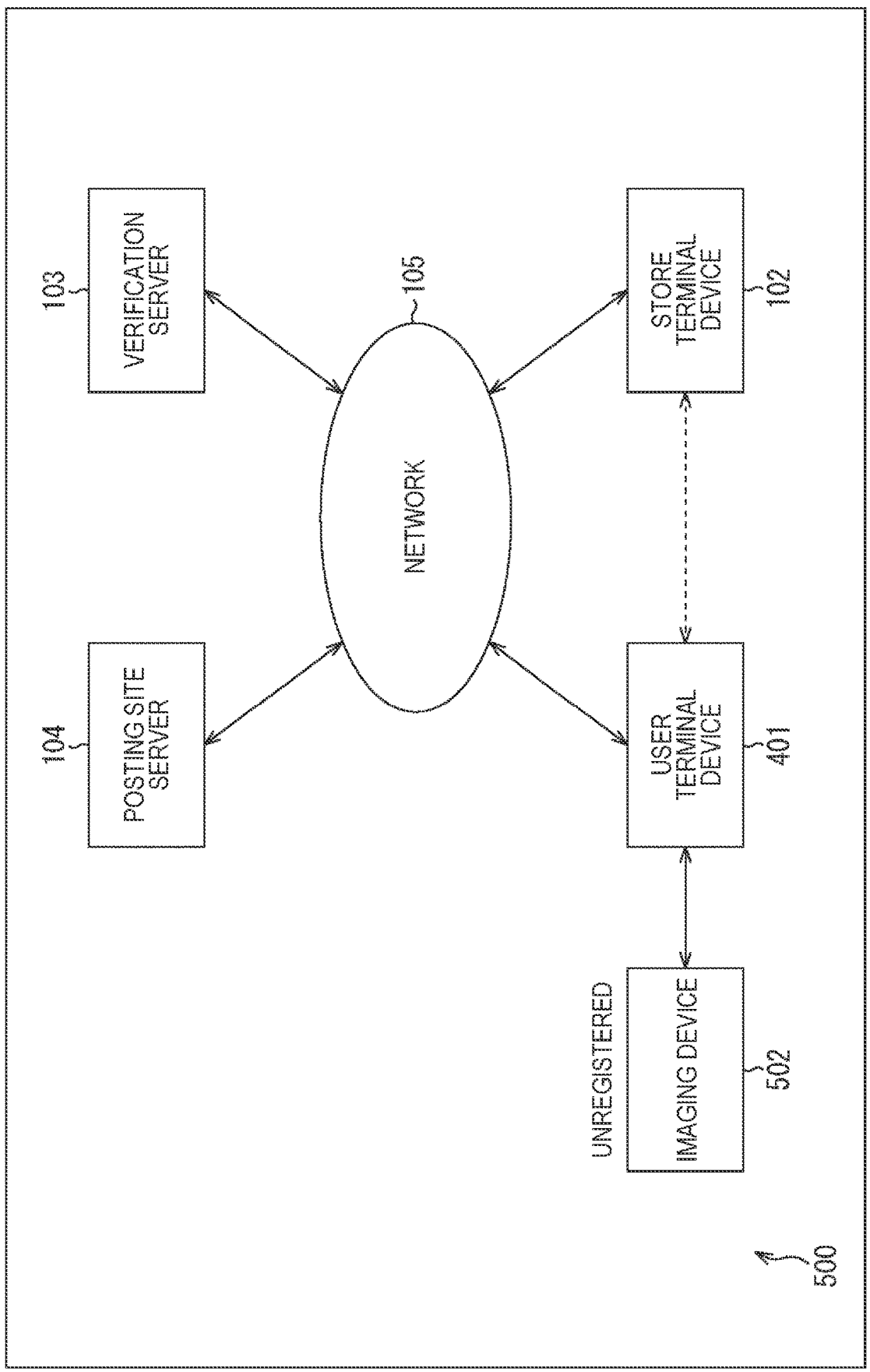
FIG. 36 is a diagram illustrating a main configuration example of a review system.

A main configuration example of the review system in this case is illustrated in FIG. 36. A review system 500 illustrated in FIG. 36 is a system similar to the review system 400 (FIG. 26). The review system 500 includes an unregistered imaging device 502 instead of the registered imaging device 402. Similarly to the user terminal device 401, the imaging device 502 is an image processing device owned by the user who posts the review.

The imaging device 502 is a device similar to the imaging device 402 except that it is not registered in the review system 500 (the verification server 103 or the like) (that is, except that the imaging device ID is not issued). That is, the imaging device 502 has a configuration similar to that of the imaging device 402 (that is, the configuration illustrated in FIG. 3), and can implement similar functions (functional blocks illustrated in FIG. 29) by executing an application program.

In the review system 500, the user terminal device 401 and the like perform the store entrance proof processing and the store exit proof processing, and imaging by the imaging device 502 is permitted during a period from when the user enters the store to when the user exits the store on the basis of these processing. Furthermore, the user terminal device 401 supplies the user information to the store terminal device 102 using the QR code. The store terminal device 102 performs the store entrance proof processing and the store exit proof processing using the user information and the location information indicating the location of the store.

With such processing, it is guaranteed that the user has captured an image and generated a captured image in the store before actually entering and exiting the store.

<Functional Block of User Terminal Device>

Figure 37:
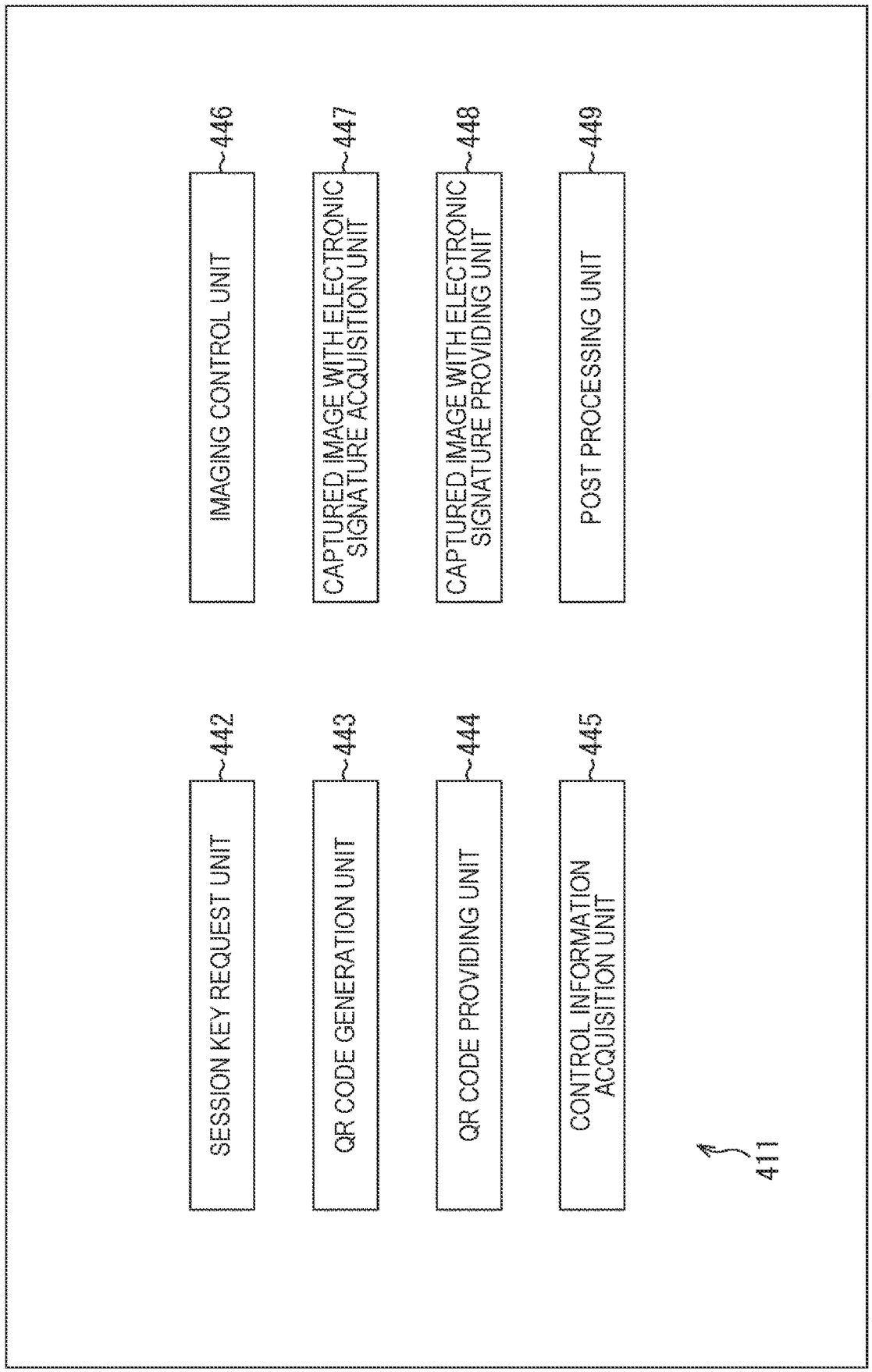
FIG. 37 is a functional block diagram illustrating functions implemented in a user terminal device.

A function implemented by the information processing unit 411 executing the application program in this case is illustrated in FIG. 37 as a functional block. As illustrated in FIG. 37, the information processing unit 411 can include, as functional blocks, a session key request unit 442, a QR code generation unit 443, a QR code providing unit 444, a control information acquisition unit 445, an imaging control unit 446, a captured image with electronic signature acquisition unit 447, a captured image with electronic signature providing unit 448, and a post processing unit 449 by executing an application program.

<Functional Block of Verification Server>

Figure 38:
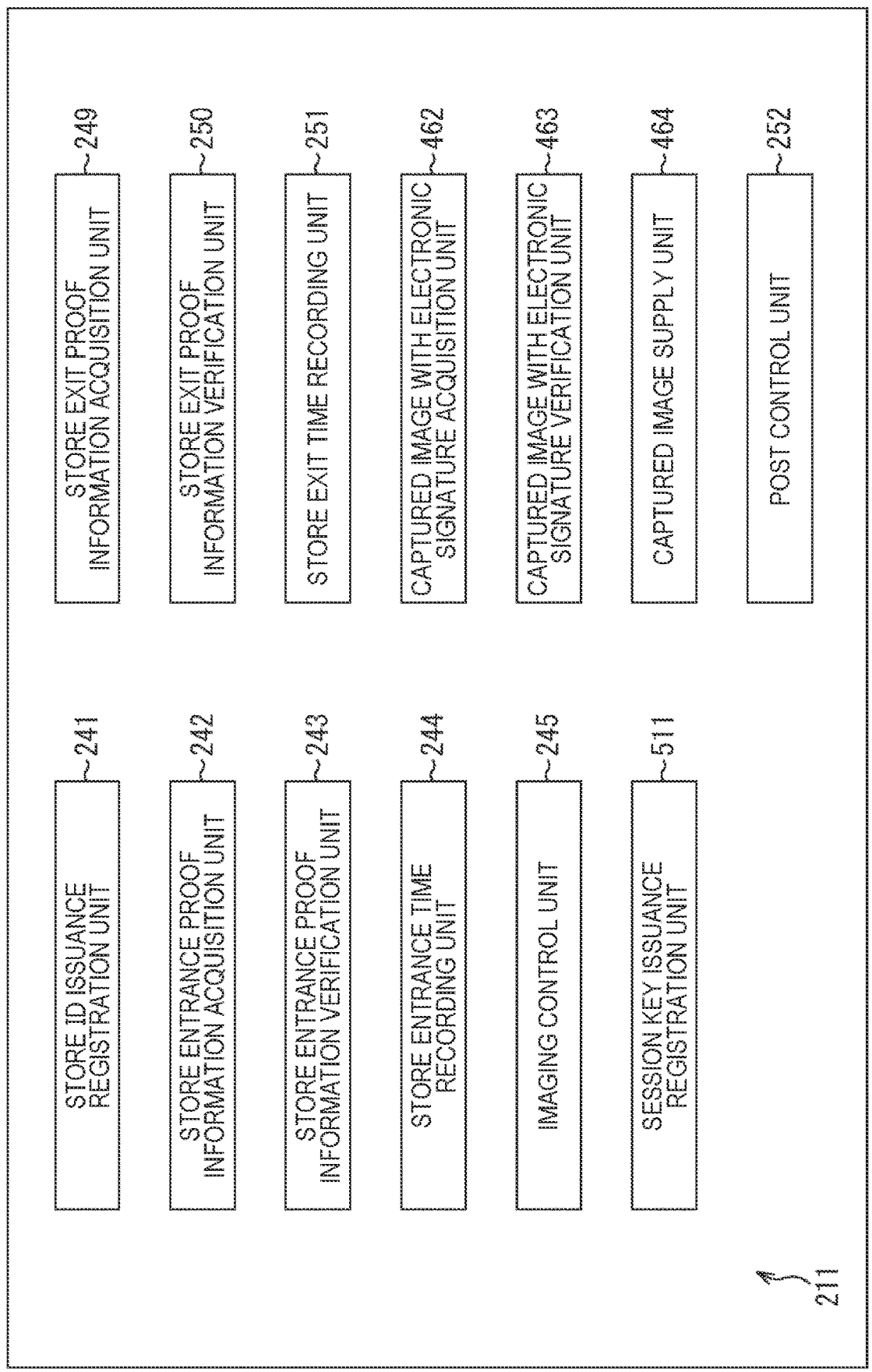
FIG. 38 is a functional block diagram illustrating functions implemented in a verification server.

FIG. 38 illustrates, as functional blocks, functions implemented by the information processing unit 211 of the verification server 103 in this case executing the application program. As illustrated in FIG. 38, the information processing unit 211 can include, as functional blocks, a store ID issuance registration unit 241, a store entrance proof information acquisition unit 242, a store entrance proof information verification unit 243, a store entrance time recording unit 244, an imaging control unit 245, a session key issuance registration unit 511, a store exit proof information acquisition unit 249, a store exit proof information verification unit 250, a store exit time recording unit 251, a captured image with electronic signature acquisition unit 462, a captured image with electronic signature verification unit 463, a captured image supply unit 464, and a post control unit 252 by executing an application program.

The session key issuance registration unit 511 performs processing related to issuance and registration of a session key.

<Other Devices>

Each of the store terminal device 102 and the posting site server 104 has a similar configuration to the case of the first embodiment and the second embodiment, and can implement similar functions (has similar functional blocks).

<Flow of Processing Related to Review Posting>

An example of a flow of processing related to review posting executed by the review system 500 will be described with reference to flowcharts of FIGS. 39 and 40. Each device of the review system 500 realizes posting of review by the user by executing each processing in a flow as in this flowchart.

When the processing is started, processing of registering a store (store information) is performed. In step S601 of FIG. 39, the store information registration unit 191 of the store terminal device 102 controls the communication unit 174 to supply store information, which is information regarding the store in which it is installed, to the verification server 103 via the network 105, and causes the verification server 103 to register the store information. In step S641, the store ID issuance registration unit 241 of the verification server 103 controls the communication unit 224 to receive the store information transmitted by the processing in step S601. The communication unit 224 receives the store information transmitted via the network 105 on the basis of the control, and supplies the store information to the information processing unit 211.

The store information includes position information indicating a location of the store. In step S642, the store ID issuance registration unit 241 generates a store ID which is identification information of a store associated with the position information. The store ID issuance registration unit 241 controls the communication unit 224 to transmit the store ID to the store terminal device 102. On the basis of the control, the communication unit 224 transmits the store ID supplied from the information processing unit 211 to the store terminal device 102 via the network 105. Furthermore, the store ID issuance registration unit 241 supplies the store ID to the verification data storage unit 212 to store (register) the store ID.

In step S602, the store information registration unit 191 controls the communication unit 174 to receive the store ID transmitted by the processing in step S642. The communication unit 174 receives the store ID transmitted via the network 105 on the basis of the control, and supplies the store ID to the information processing unit 161. The store information registration unit 191 supplies the store ID to the storage unit 173 and stores the store ID therein.

Next, the store terminal device 102 to the posting site server 104, and the user terminal device 401 perform store entrance proof processing (step S603, step S611, step S631, step S643). This store entrance proof processing is performed in the similar flow as in the first embodiment (FIG. 12). However, the processing executed by the imaging device 101 is executed by the user terminal device 401.

When the store entrance proof processing ends, in step S644, the session key issuance registration unit 511 of the verification server 103 generates a session key associated with the user ID and the store ID obtained by the store entrance proof processing, and controls the communication unit 224 to supply the session key to the user terminal device 401. That is, the session key issuance registration unit 511 issues a session key associated with the user ID and the store ID to the user terminal device 401. In step 3612, the control information acquisition unit 445 of the user terminal device 401 acquires the session key issued by the verification server 103 as control information via the communication unit 424.

Furthermore, in step S645, the session key issuance registration unit 511 of the verification server 130 stores the session key in the verification data storage unit 212 in association with the store entrance time obtained by the store entrance proof processing.

When the user terminal device 401 acquires the session key, the user terminal device 401 and the imaging device 502 perform imaging processing (step S613, step S621). That is, the imaging in the store is performed according to the operation of the user, and the captured image is generated.

When the user exits the store, the store terminal device 102 to the posting site server 104 and the user terminal device 401 perform the store exit proof processing (step S604, step S614, step S632, step S646). This store exit proof processing is performed in the similar flow as in the case of the first embodiment (FIG. 15). However, the processing executed by the imaging device 101 is executed by the user terminal device 401.

After the store exit proof processing is performed, the captured image is uploaded. In step S671 of FIG. 40, the captured image with electronic signature acquisition unit 462 of the verification server 103 controls the communication unit 224 to supply control information for permitting posting to the user terminal device 401. In step S651, the captured image with electronic signature providing unit 448 of the user terminal device 401 acquires the control information via the communication unit 424.

In step S652, the captured image with electronic signature providing unit 448 controls the communication unit 424 on the basis of the permission to supply (upload) the captured image with electronic signature acquired from the imaging device 402 to the verification server 103. In step S672, the captured image with electronic signature acquisition unit 462 of the verification server 103 acquires the captured image with electronic signature transmitted from the user terminal device 401 via the communication unit 224. Since the electronic signature is added, falsification of the captured image is suppressed.

In step S673, the captured image with the electronic signature verification unit 463 verifies the position information indicating the imaging position, the imaging time, and the session key included in the metadata of the acquired captured image with the electronic signature using the verification data stored in the verification data storage unit 212.

In a case where the session key of the metadata is a session key issued to the imaging device 502 by the verification server 103, the imaging position corresponds to the position of the store, and the imaging time is between the store entrance time and the store exit time, the captured image with electronic signature verification unit 463 determines that the captured image is valid. In a case where the captured image is determined to be valid, in step S674, the captured image supply unit 464 controls the communication unit 224 to supply the captured image as an image that can be posted to the posting site server 104. In step S661, the post image acquisition unit 293 of the posting site server 104 acquires the captured image via the communication unit 274. Note that an electronic signature may be added to this captured image.

In step S653, the post processing unit 449 of the user terminal device 401 performs post processing to post a review. In response to this processing, the post processing unit 294 of the posting site server 104 performs the posting processing in step S662, accepts the post of the review, and publishes the accepted review. When the review posting ends in this manner, a series of processing related to the review posting ends.

<Flow of Imaging Processing>

Figure 41:
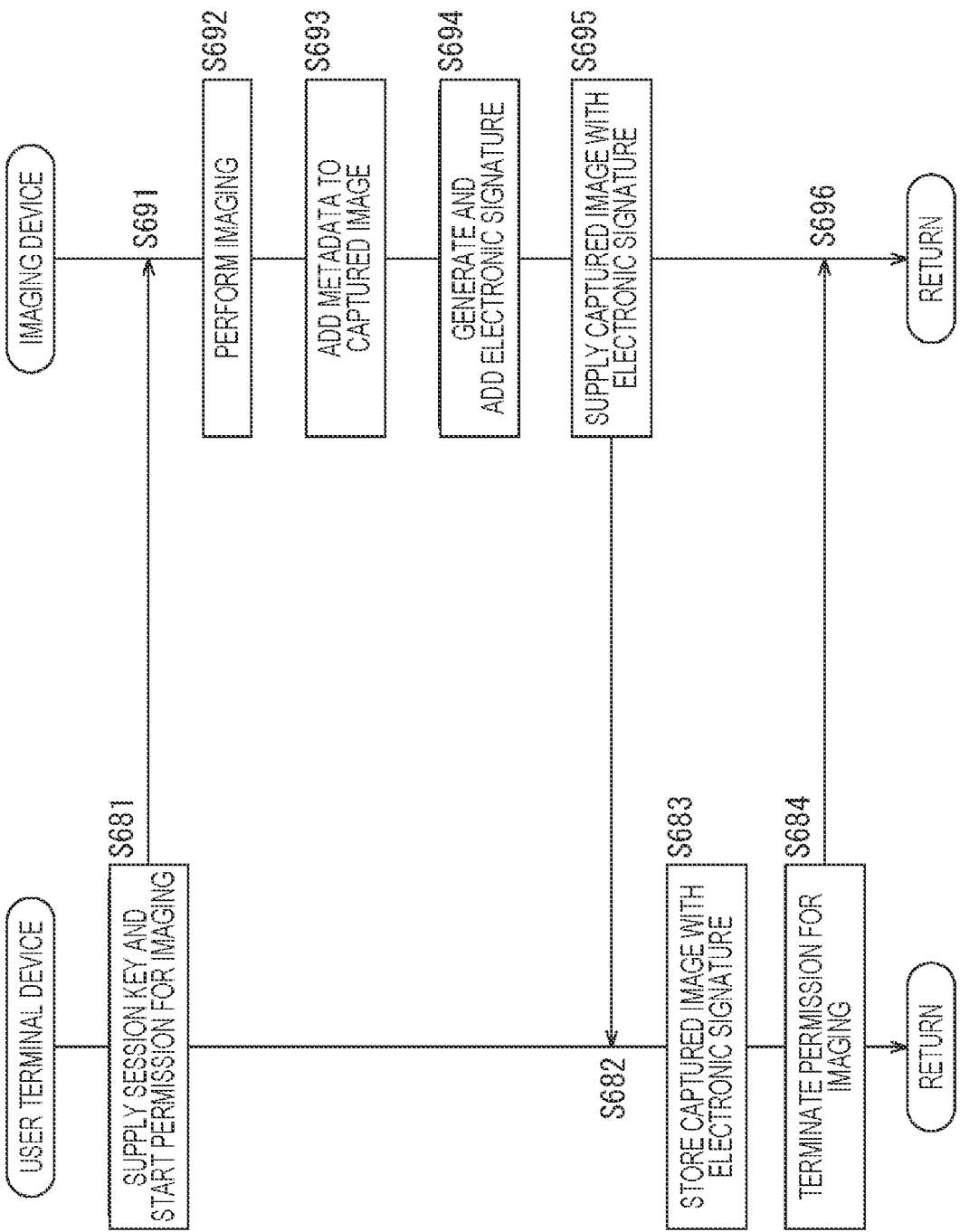
FIG. 41 is a flowchart illustrating an example of a flow of imaging processing.

An example of a flow of imaging processing executed in FIG. 39 will be described with reference to a flowchart of FIG. 41.

When the imaging processing is started, in step S681, the imaging control unit 446 of the user terminal device 401 controls the communication unit 424 to supply a session key and control information for starting permission for imaging to the imaging device 502. In step S691, the imaging processing unit 451 of the imaging device 502 acquires the control information and the session key via the communication unit 124.

In step S692, the imaging processing unit 451 of the imaging device 502 performs imaging using the imaging unit 112 according to the user's operation. The user uses the imaging unit 112 of the imaging device 502 to capture, for example, a landscape in a store, goods and the like sold in a store. The imaging unit 112 images a subject to generate a captured image, and supplies the captured image to the imaging processing unit 451.

Figure 42:
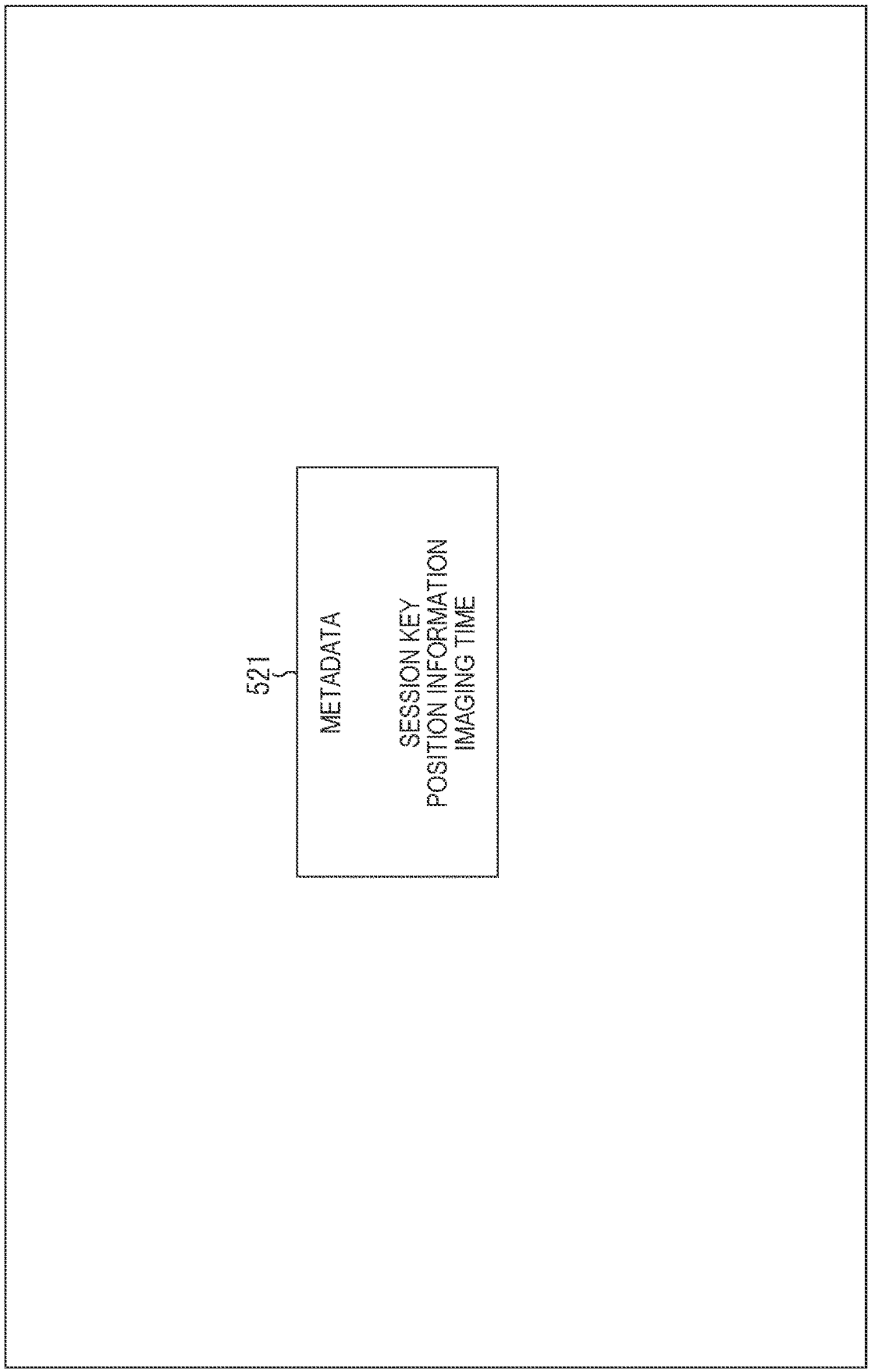
FIG. 42 is a diagram illustrating an example of metadata.

In step S693, the metadata adding unit 452 adds (associates) information such as an imaging time, an imaging location, and a session key as metadata to the captured image. FIG. 42 illustrates an example of information included in the metadata. Metadata 521 illustrated in FIG. 42 includes a session key issued by the verification server 103, position information indicating an imaging location (location of the imaging device 502), and imaging time. Of course, information other than these may be included in the metadata. In step 3694, the electronic signature adding unit 453 generates an electronic signature of the captured image and the metadata, and adds (associates) the electronic signature to the captured image.

In step 3695, the captured image with electronic signature supply unit 454 controls the communication unit 124 to supply the captured image with electronic signature (captured image+metadata+electronic signature) generated as described above to the user terminal device 401. In step 3682, the captured image with electronic signature acquisition unit 447 of the user terminal device 401 acquires the captured image with electronic signature via the communication unit 424. In step S683, the captured image with electronic signature acquisition unit 447 stores the acquired captured image with electronic signature in the storage unit 423.

In step S684, the imaging control unit 446 controls the communication unit 424 and supplies control information for terminating the permission for imaging to the imaging device 502. In step S596, the imaging processing unit 451 of the imaging device 502 acquires the control information via the communication unit 124. The imaging processing unit 451 ends imaging on the basis of the acquired control information. When the imaging ends, the imaging processing ends, and the processing returns to FIG. 39.

By executing each processing as described above, even in a case where imaging is performed using the unregistered imaging device 502, the store entrance proof processing and the store exit proof processing can be performed similarly to the case of the first embodiment, and it is possible to guarantee that the captured image is captured at the store by the user who actually visited the store.

Therefore, posting of fictitious reviews can be suppressed, and a reduction in reliability of the review can be suppressed. That is, it is possible to suppress a decrease in reliability of the service of the posting site.

<Case of Store Entrance Proof Processing Only>

Also in the case of the present embodiment, similarly to the case of the first embodiment, out of the store entrance proof processing and the store exit proof processing, only the store entrance proof processing may be performed. In this case, for example, as illustrated in A of FIG. 17, imaging within a predetermined valid period from the store entrance time (time X) may be permitted by the store entrance proof processing. In this way, the store exit proof processing can be omitted, and the reliability of the review can be more easily suppressed from being reduced.

<Transfer of Store Information>

As in the case of the second embodiment, the store information may be supplied from the store terminal device 102 to the user terminal device 401 using the QR code in the store entrance proof processing and the store exit proof processing. In this case, the user terminal device 401 supplies the store entrance proof information and the store exit proof information to the verification server 103.

<Functional Block of User Terminal Device>

Figure 43:
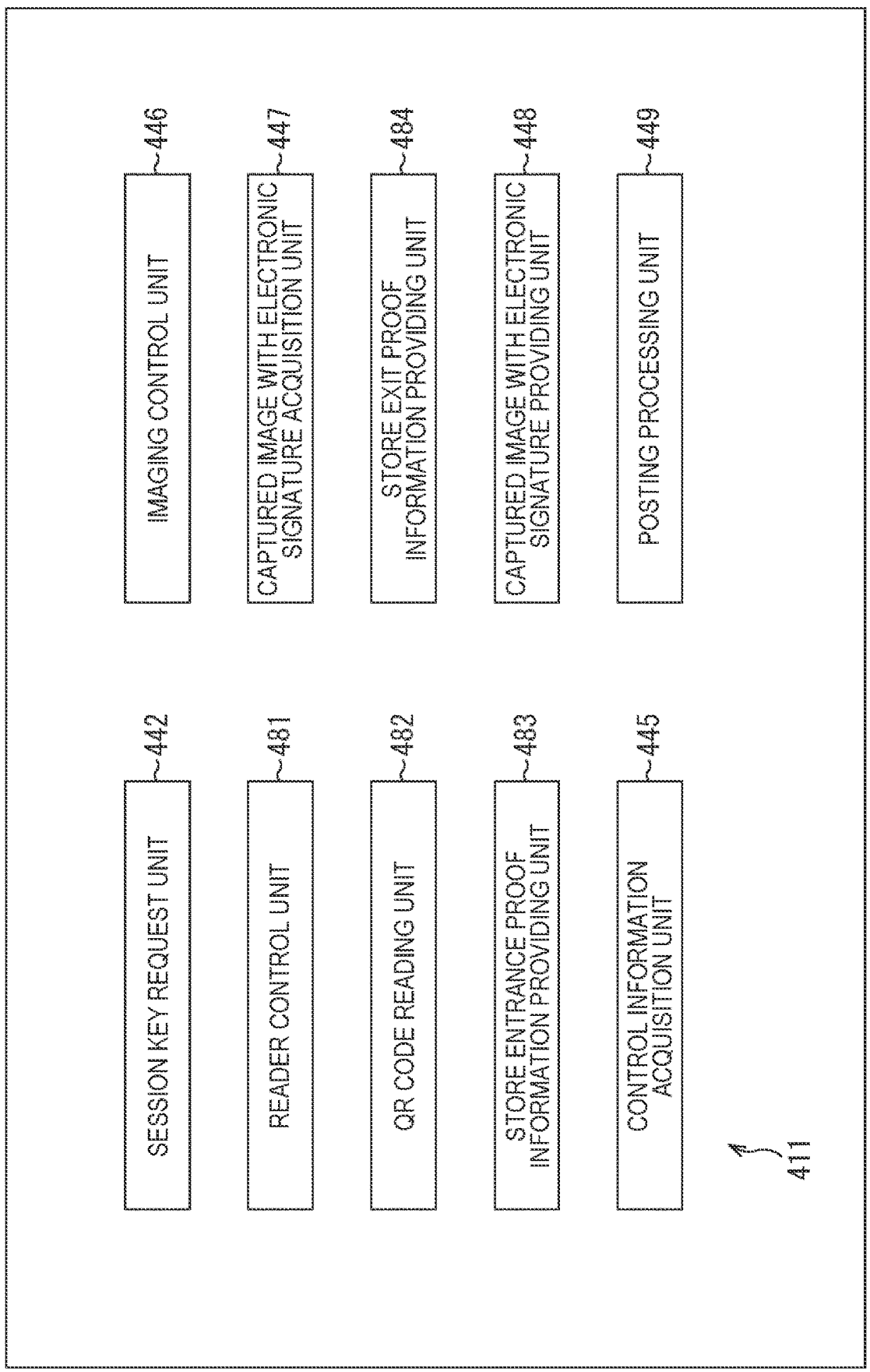
FIG. 43 is a functional block diagram illustrating functions implemented in a user terminal device.

FIG. 43 illustrates, as functional blocks, functions implemented by the information processing unit 411 of the user terminal device 401 in this case executing the application program. As illustrated in FIG. 43, the information processing unit 411 can include, as functional blocks, a session key request unit 442, a reader control unit 481, a QR code reading unit 482, a store entrance proof information providing unit 483, a control information acquisition unit 445, an imaging control unit 446, a captured image with electronic signature acquisition unit 447, a store exit proof information providing unit 484, a captured image with electronic signature providing unit 448, and a post processing unit 449 by executing an application program.

<Functional Blocks of Other Devices>

In this case, the imaging device 502 can have functional blocks similar to those in the example of FIG. 29. The store terminal device 102 can have functional blocks similar to those in the example of FIG. 19. The verification server 103 may have functional blocks similar to the example of FIG. 38. The posting site server 104 can have functional blocks similar to those in the example of FIG. 20.

<Flow of Each Processing>

Figure 39:
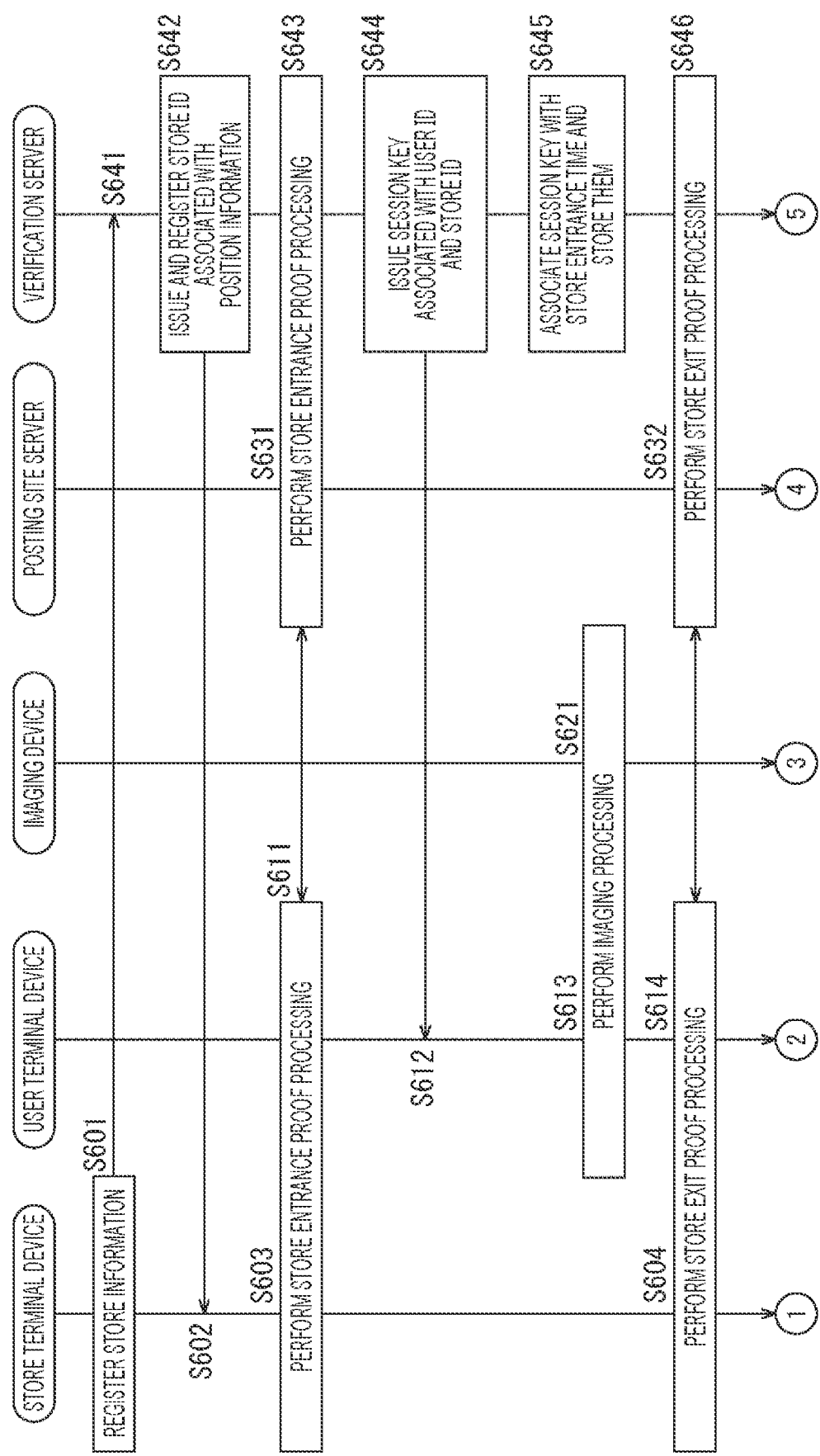
FIG. 39 is a flowchart illustrating an example of a flow of processing related to review posting.
Figure 40:
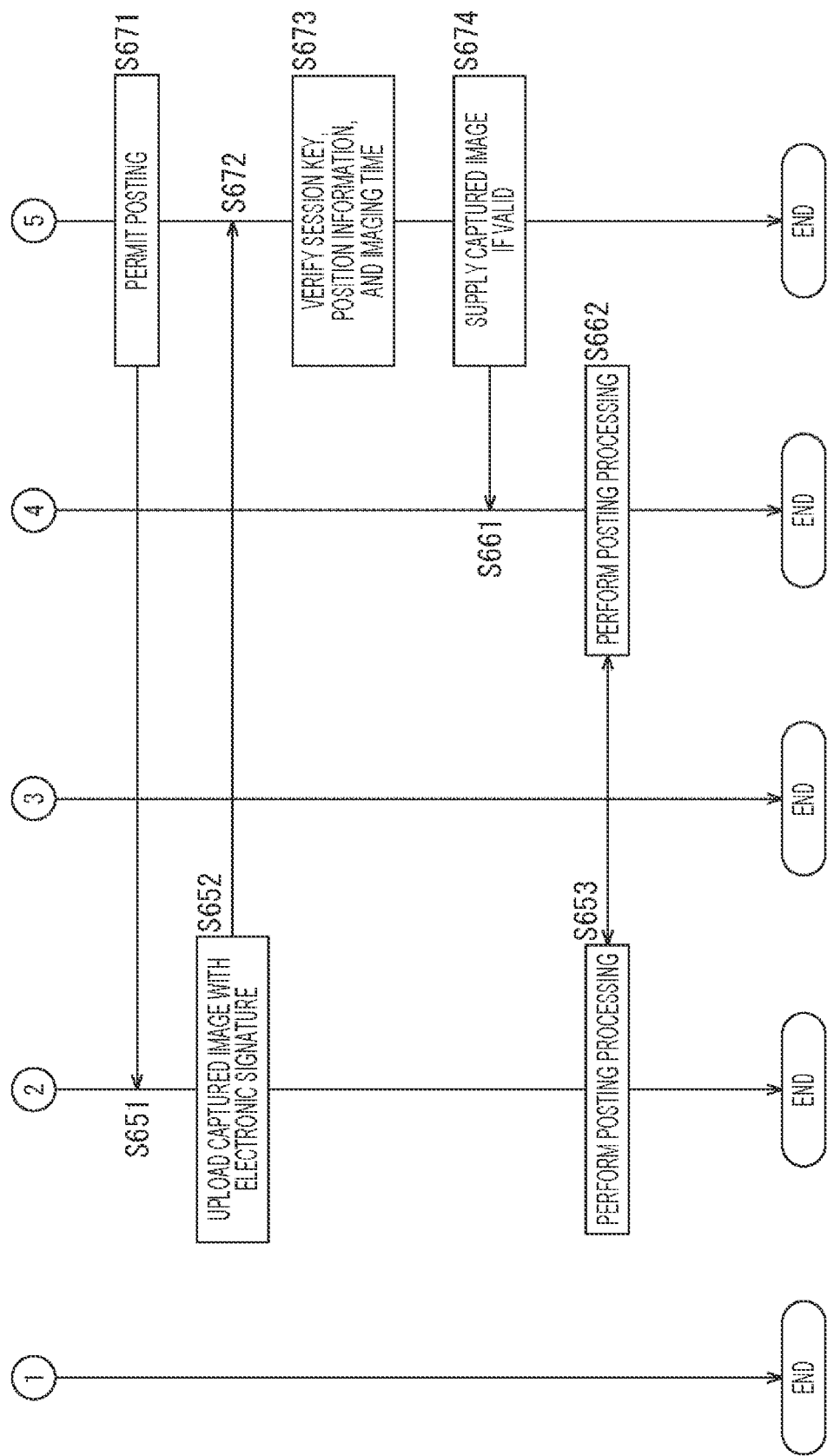
FIG. 40 is a flowchart illustrating an example of the flow of the processing related to review posting, following FIG. 39.

In this case, the processing related to the review posting is executed in a flow similar to the flowcharts of FIGS. 39 and 40. Furthermore, the imaging processing is executed in a flow similar to the flowchart of FIG. 41. The store entrance proof processing is executed in a flow similar to the flowcharts of FIGS. 21 and 22, and the store exit proof processing is executed in a flow similar to the flowcharts of FIGS. 24 and 25. However, in the store entrance proof processing and the store exit proof processing, the processing described to be executed by the imaging device 101 is executed by the user terminal device 401.

By executing each processing in this manner, in the store entrance proof processing and the store exit proof processing, it is possible to suppress the posting of the fictitious review and to suppress the reduction in the reliability of the review, similarly to the case where the user information is supplied from the user terminal device 401 to the store terminal device 102 using the QR code. That is, it is possible to suppress a decrease in reliability of the service of the posting site.

<Case of Store Entrance Proof Processing Only>

Also in this case, as in the case of the second embodiment, out of the store entrance proof processing and the store exit proof processing, only the store entrance proof processing may be performed. In this case, for example, as illustrated in A of FIG. 17, imaging within a predetermined valid period from the store entrance time (time X) may be permitted by the store entrance proof processing. In this way, the store exit proof processing can be omitted, and the reliability of the review can be more easily suppressed from being reduced.

6. FIFTH EMBODIMENT

The store entrance proof processing and the store exit proof processing may be performed using a receipt issued in a case where goods are purchased at a store or the like.

For example, in an information processing system (for example, the review system 100) including an image processing apparatus (for example, the imaging device 101), a first information processing apparatus (for example, the store terminal device 102), and a second information processing apparatus (for example, the verification server 103), the image processing apparatus may include: a user information generation unit that generates user information; a user information providing unit that provides the user information generated by the user information generation unit to the first information processing apparatus; a stay information extraction unit that extracts stay information from a receipt on which the stay information including a session key and time information is printed, the session key being issued on the basis of the user information provided by the user information providing unit to the first information processing apparatus and imaging location information; a stay information providing unit that provides the stay information extracted by the stay information extraction unit to the second information processing apparatus; and a captured image providing unit that provides the second information processing apparatus with a captured image generated by imaging by an imaging unit. The first information processing apparatus may include: a user information acquisition unit that acquires the user information provided by the image processing apparatus; an imaging location information and user information providing unit that provides the imaging location information and the user information acquired by the user information acquisition unit to the second information processing apparatus; a session key acquisition unit that acquires the session key provided from the second information processing apparatus; and a receipt issuing unit that issues the receipt on which the stay information including the session key acquired by the session key acquisition unit and the time information is printed, and the second information processing apparatus may include: an imaging location information and user information acquisition unit that acquires the imaging location information and the user information provided from the first information processing apparatus; a verification unit that verifies the imaging location information and the user information acquired by the imaging location information and user information acquisition unit; a session key providing unit that issues the session key corresponding to the imaging location information and the user information and provides the session key to the first information processing apparatus in a case where the imaging location information and the user information are determined to be valid as a result of verification by the verification unit; a stay information acquisition unit that acquires the stay information provided from the image processing apparatus; a captured image acquisition unit that acquires the captured image provided from the image processing apparatus; and a control unit that controls permission to post the captured image acquired by the captured image acquisition unit on the basis of the stay information acquired by the stay information acquisition unit.

Such a method will be described using a case of the review system 400 (FIG. 26) as an example.

<Functional Block of User Terminal Device>

Figure 44:
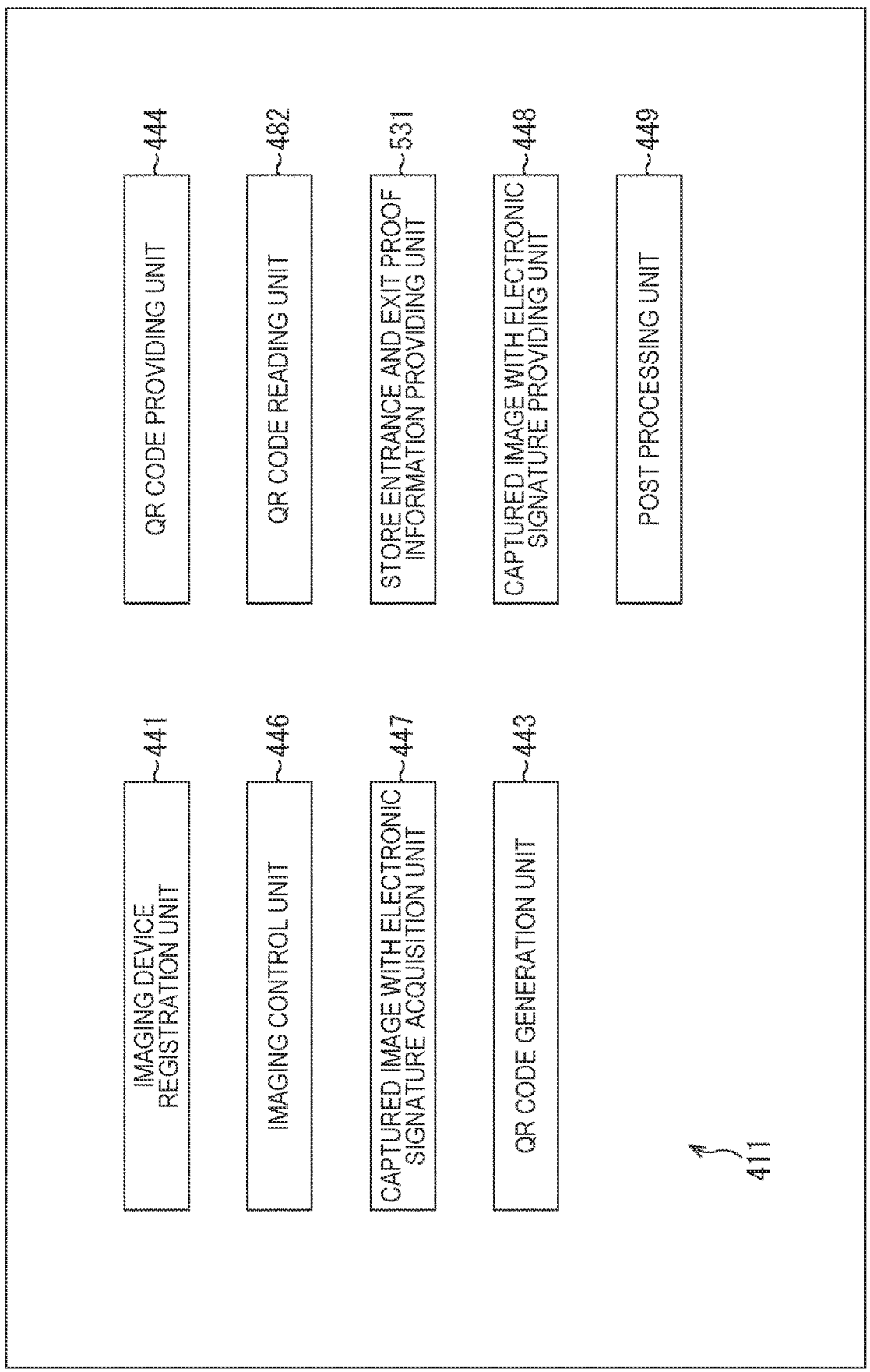
FIG. 44 is a functional block diagram illustrating functions implemented in the user terminal device.

A function implemented by the information processing unit 411 executing the application program in this case is illustrated in FIG. 44 as a functional block. As illustrated in FIG. 44, the information processing unit 411 can include, as functional blocks, an imaging device registration unit 441, a QR code generation unit 443, a QR code providing unit 444, an imaging control unit 446, a captured image with electronic signature acquisition unit 447, a captured image with electronic signature providing unit 448, a post processing unit 449, a QR code reading unit 482, and a store entrance and exit proof information providing unit 531 by executing an application program.

The store entrance and exit proof information providing unit 531 performs processing related to provision of the store entrance and exit proof information that is information proving user's entrance into and exit from the store.

<Functional Block of Store Terminal Device>

Figure 45:
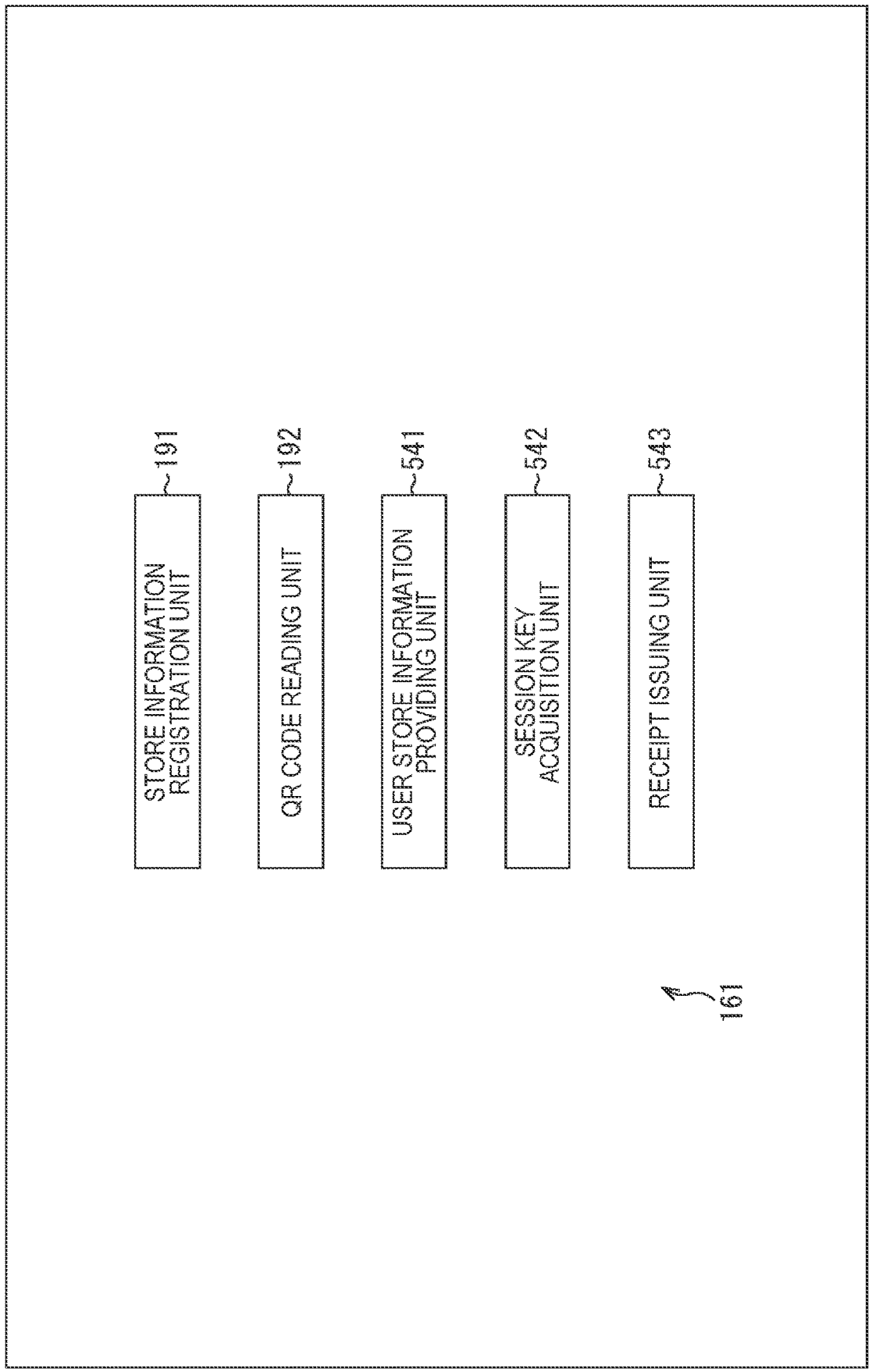
FIG. 45 is a functional block diagram illustrating functions implemented in a store terminal device.

FIG. 45 illustrates, as functional blocks, functions implemented by the information processing unit 161 of the store terminal device 102 in this case executing the application program. As illustrated in FIG. 45, the information processing unit 161 can include a store information registration unit 191, a QR code reading unit 192, a user store information providing unit 541, a session key acquisition unit 542, and a receipt issuing unit 543 as functional blocks by executing an application program.

The user store information providing unit 541 performs processing regarding provision of the user information and the store information. The session key acquisition unit 542 performs processing related to acquisition of a session key. The receipt issuing unit 543 performs processing related to issuance of a receipt.

<Functional Block of Verification Server>

Figure 46:
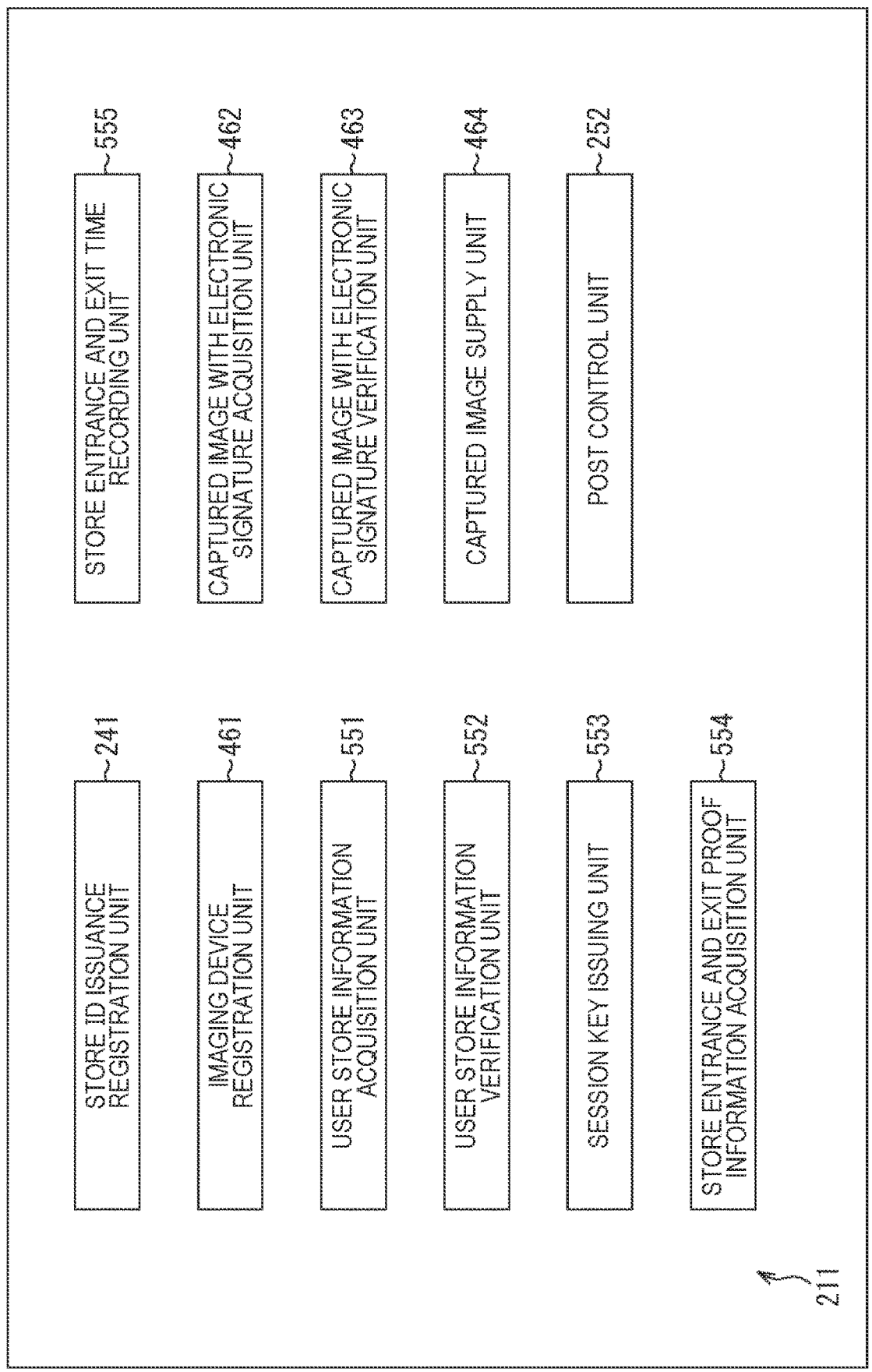
FIG. 46 is a functional block diagram illustrating functions implemented in a verification server.

FIG. 46 illustrates, as functional blocks, functions implemented by the information processing unit 211 of the verification server 103 in this case executing the application program. As illustrated in FIG. 46, the information processing unit 211 can include, as functional blocks, a store ID issuance registration unit 241, an imaging device registration unit 461, a user store information acquisition unit 551, a user store information verification unit 552, a session key issuing unit 553, a store entrance and exit proof information acquisition unit 554, a store entrance and exit time recording unit 555, a captured image with electronic signature acquisition unit 462, a captured image with electronic signature verification unit 463, a captured image supply unit 464, and a post control unit 252 by executing an application program.

The user store information acquisition unit 551 performs processing related to acquisition of the user information and the store information. The user store information verification unit 552 performs processing related to verification of the user information and the store information. The session key issuing unit 553 performs processing related to issuance of a session key. The store entrance and exit proof information acquisition unit 554 performs processing related to acquisition of the store entrance and exit proof information. The store entrance and exit time recording unit 555 performs processing related to recording of the store entrance time and the store exit time.

<Functional Blocks of Other Devices>

The imaging device 402 can have functional blocks similar to the example of FIG. 29. The posting site server 104 can have functional blocks similar to those in the example of FIG. 20.

<Flow of Processing Related to Review Posting>

Figure 47:
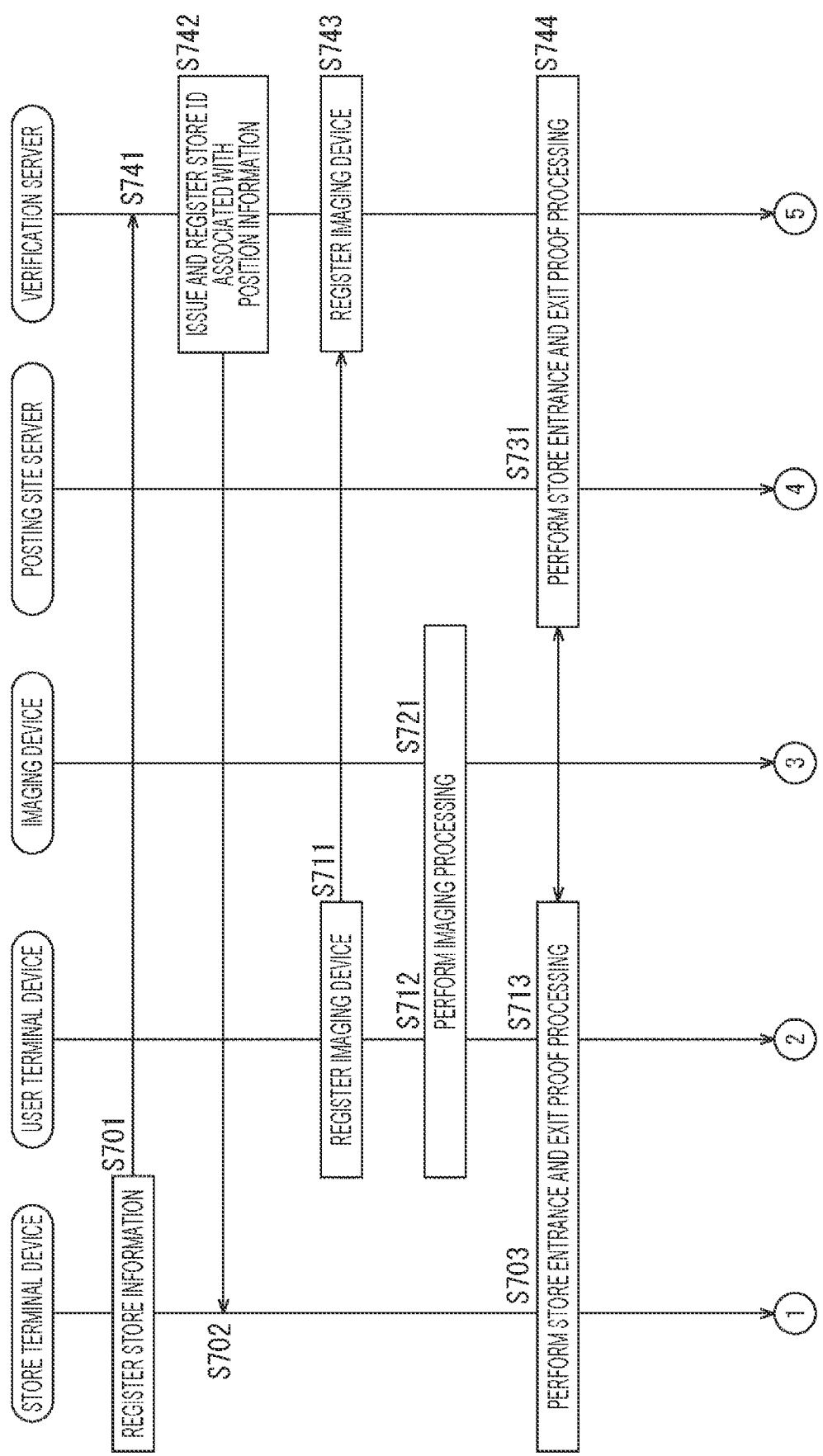
FIG. 47 is a flowchart illustrating an example of a flow of processing related to review posting.
Figure 48:
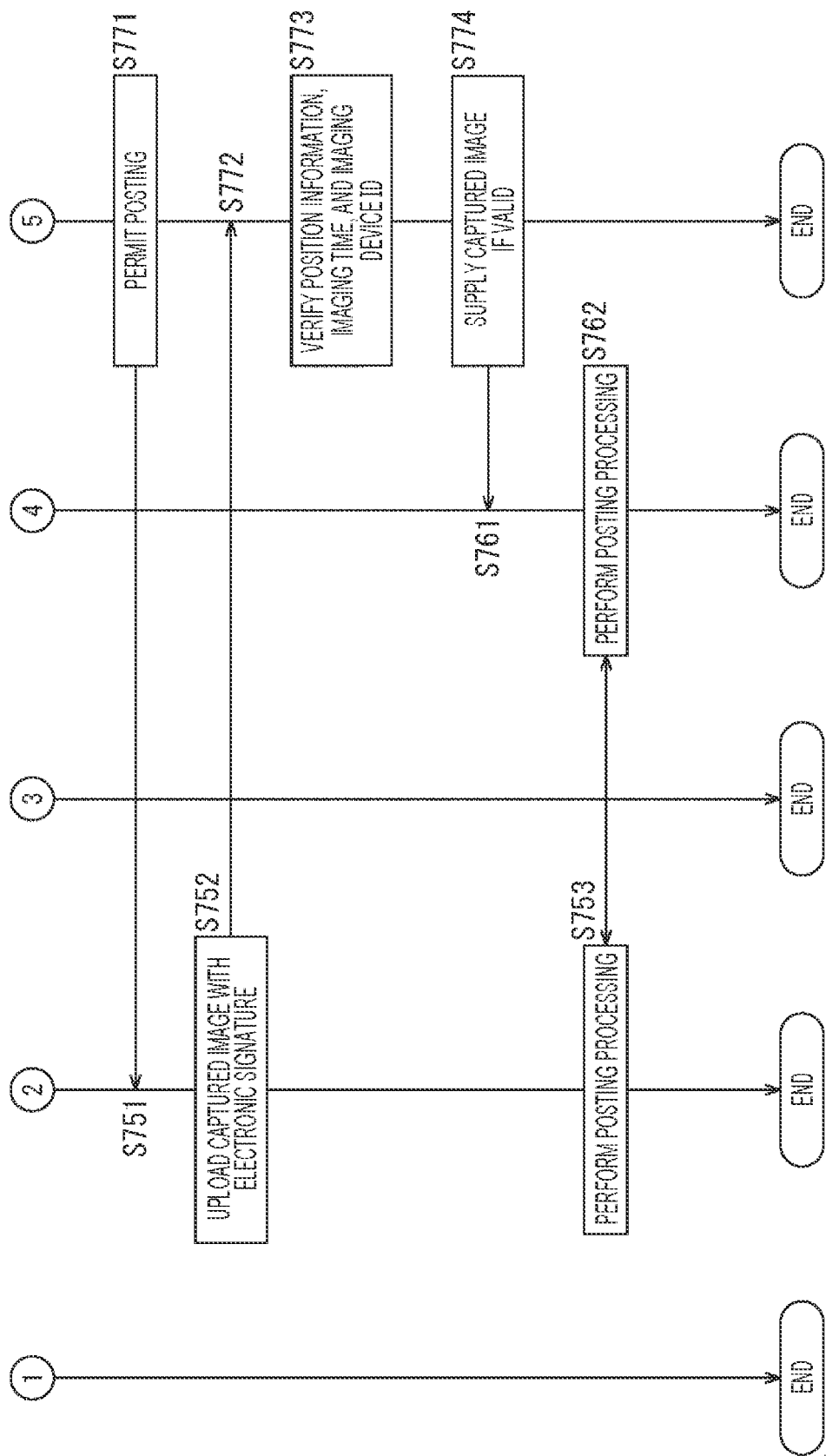
FIG. 48 is a flowchart illustrating an example of the flow of the processing related to review posting, following FIG. 47.

An example of a flow of processing related to review posting executed by the review system 400 in this case will be described with reference to the flowcharts of FIGS. 47 and 48. Each device of the review system 400 realizes posting of review by the user by executing each processing in a flow as in this flowchart.

When the processing is started, processing of registering a store (store information) is performed. In step S701 of FIG. 47, the store information registration unit 191 of the store terminal device 102 controls the communication unit 174 to supply store information, which is information regarding the store in which it is installed, to the verification server 103 via the network 105, and causes the verification server 103 to register the store information. In step S741, the store ID issuance registration unit 241 of the verification server 103 controls the communication unit 224 to receive the store information transmitted by the processing in step S701. The communication unit 224 receives the store information transmitted via the network 105 on the basis of the control, and supplies the store information to the information processing unit 211.

The store information includes position information indicating a location of the store. In step S742, the store ID issuance registration unit 241 generates a store ID which is identification information of a store associated with the position information. The store ID issuance registration unit 241 controls the communication unit 224 to transmit the store ID to the store terminal device 102. On the basis of the control, the communication unit 224 transmits the store ID supplied from the information processing unit 211 to the store terminal device 102 via the network 105. That is, the store ID issuance registration unit 241 issues the store ID to the store terminal device 102. Furthermore, the store ID issuance registration unit 241 supplies the store ID to the verification data storage unit 212 and stores the store ID (registers the store ID).

In step S702, the store information registration unit 191 controls the communication unit 174 to receive the store ID transmitted by the processing in step S742. The communication unit 174 receives the store ID transmitted via the network 105 on the basis of the control, and supplies the store ID to the information processing unit 161. The store information registration unit 191 supplies the store ID to the storage unit 173 and stores the store ID therein.

Next, processing of registering the imaging device 402 is performed. In step S711, the imaging device registration unit 441 of the user terminal device 401 controls the communication unit 424 and supplies the imaging device ID, which is the identification information of the imaging device 402, to the verification server 103. In step S743, the imaging device registration unit 461 of the verification server 103 acquires the imaging device ID via the communication unit 224, and stores the imaging device ID in the verification data storage unit 212 in association with the user ID (registers the imaging device ID).

When the imaging device 402 is registered, the user terminal device 401 and the imaging device 402 perform imaging processing, thereby performing imaging in the store and generating a captured image (step S712, step S721).

When performing accounting processing and the like when the user exits the store and the like, the store terminal device 102 issues a receipt indicating the accounting processing result (that is, the accounting processing result for the goods and the like purchased by the user). At that time, the store terminal device 102 to the posting site server 104, and the user terminal device 401 perform a store entrance and exit proof processing which is processing related to proof of store entrance and store exit of the user (step S703, step S713, step S731, step S744). Although details will be described later, the store entrance and exit processing is performed using a receipt issued by the store terminal device 102.

After the store entrance and exit proof processing is performed, the captured image is uploaded. In step S771 of FIG. 48, the captured image with electronic signature acquisition unit 462 of the verification server 103 controls the communication unit 224 to supply control information for permitting posting to the user terminal device 401. In step S751, the captured image with electronic signature providing unit 448 of the user terminal device 401 acquires the control information via the communication unit 424.

In step S752, the captured image with electronic signature providing unit 448 controls the communication unit 424 on the basis of the permission, and supplies (uploads) the captured image with electronic signature acquired from the imaging device 402 to the verification server 103. In step S772, the captured image with electronic signature acquisition unit 462 of the verification server 103 acquires the captured image with electronic signature transmitted from the user terminal device 401 via the communication unit 224. Since the electronic signature is added, falsification of the captured image is suppressed.

In step S773, the captured image with the electronic signature verification unit 463 verifies the position information indicating the imaging position included in the metadata of the acquired captured image with the electronic signature, the imaging time, and the imaging device ID that is the identification information of the imaging device 402 that has generated the captured image, using the verification data stored in the verification data storage unit 212.

In a case where the imaging device ID is the registered ID, the imaging position corresponds to the position of the store, and the imaging time is between the store entrance time and the store exit time, the captured image with electronic signature verification unit 463 determines that the captured image is valid. In a case where the captured image is determined to be valid, in step S774, the captured image supply unit 464 controls the communication unit 224 to supply the captured image to the posting site server 104 as an image that can be posted. In step S761, the post image acquisition unit 293 of the posting site server 104 acquires the captured image via the communication unit 274. Note that an electronic signature may be added to this captured image.

In step S753, the post processing unit 449 of the user terminal device 401 performs post processing to post a review. In response to this processing, the post processing unit 294 of the posting site server 104 performs the posting processing in step S762, accepts the post of the review, and publishes the accepted review. When the review posting ends in this manner, a series of processing related to the review posting ends.

<Flow of Store Entrance and Exit Proof Processing>

With reference to a flowchart of FIG. 49, an example of a flow of the store entrance and exit proof processing executed in FIG. 47 will be described.

When the store entrance and exit proof processing is started, the QR code generation unit 443 of the user terminal device 401 generates a QR code with expiration time in step S801. The information indicated by the QR code includes, for example, a user ID and position information indicating a location of the imaging device 402 as the user information. Of course, information other than these may be included. Note that this position information may be omitted. However, by including the position information of the imaging device 402 in the QR code, the reliability of the store entrance and exit proof is improved.

The QR code providing unit 444 controls a display (display unit) of the output unit 422 to display an image of the QR code with expiration time generated by the QR code generation unit 443. Then, the user holds the display on which the image of the QR code with expiration time is displayed over the reader 162 of the store terminal device 102. That is, the QR code providing unit 444 provides the user information to the store terminal device 102 which is an information processing device that stores imaging location information which is information indicating an imaging location (that is, a store location).

In step S801, the QR code reading unit 192 of the store terminal device 102 controls the reader to read the QR code held over the reader 162 (that is, the information indicated by the QR code). For example, the reader 162 captures an image of the QR code held over by an image sensor and the like, analyzes the QR code included in the captured image, and reads information. The reader 162 supplies the read information to the information processing unit 161 (QR code reading unit 192). As described above, the user information and the like are provided from the user terminal device 401 to the store terminal device 102 using the QR code.

In step S802, the user store information providing unit 541 of the store terminal device 102 controls the communication unit 174 to supply to the verification server 103 the QR code (the user information indicated by the QR code) read as described above and the store ID (that is, the store information) issued from the verification server 103. In accordance with the control, the communication unit 174 transmits the information (the user information and the store information) supplied from the user store information providing unit 541 to the verification server 103 via the network 105. In step S821, the user store information acquisition unit 551 of the verification server 103 acquires these pieces of information (user information and store information) via the communication unit 224.

In step S822, the user store information verification unit 552 verifies whether the position information (information indicating the position of the imaging device 402) that is the information indicated by the QR code is valid. For example, the store entrance proof information verification unit 243 determines whether or not the position information of the imaging device 402 corresponds to the position information of the store corresponding to the store ID on the basis of the verification data stored in the verification data storage unit 212. For example, in a case where it is determined that the position information (the position information of the imaging device 402) indicated by the QR code matches the position information of the store or is located sufficiently near the store, the user store information verification unit 552 determines that the position information indicated by the QR code is valid.

In a case where it is determined that the position information indicated by the QR code is valid, the session key issuing unit 553 issues a session key associated with the user ID and the store ID supplied from the store terminal device 102 in step S823. That is, the session key issuing unit 553 generates a session key associated with the user ID and the store ID, and controls the communication unit 224 to supply the session key to the store terminal device 102. In step S803, the session key acquisition unit 542 of the store terminal device 102 acquires the session key supplied from the verification server 103 via the communication unit 174.

When the session key is acquired, the receipt issuing unit 543 issues a receipt on which the QR code is printed in step S802. A QR code is printed on the receipt together with information on an accounting processing result performed by the user.

FIG. 50 illustrates an example of information indicated by the QR code printed on the receipt. As illustrated in FIG. 50, the information indicated by the QR code 561 includes stay information which is information indicating that the user has stayed in the store. For example, the stay information may include information such as a session key issued by the verification server 103, a store entrance time (For example, it may be a time at which an action pursuant to store entrance is performed, such as a first order time), a store exit time (For example, it may be a time at which an action pursuant to store exit is performed, such as a time at which an accounting processing is performed), and a store entrance and exit flag indicating that the information is for proving store entrance and store exit of the user. Of course, other information may be included in the information indicated by the QR code.

When the receipt is issued, the user operates the user terminal device 401 to read the QR code (information indicated by the QR code) printed on the receipt. In accordance with the operation by the user, in step S812, the QR code reading unit 482 controls the reader, which is an input device included in the input unit 421, to read the QR code printed on the receipt.

In step S813, the store entrance and exit proof information providing unit 531 controls the communication unit 424 to supply the QR code (or information indicated by the QR code) to the verification server 103 as the store entrance and exit proof information. In step S824, the store entrance and exit proof information acquisition unit 554 of the verification server 103 acquires the store entrance and exit proof information supplied from the user terminal device 401 via the communication unit 224.

In step S825, the store entrance and exit time recording unit 555 stores the store entrance time and the store exit time included in the acquired store entrance and exit proof information in the verification data storage unit 212. Upon completion of the processing in step S825, the store entrance and exit proof processing is completed, and the processing returns to FIG. 48.

By executing each processing as described above, also in this case, the store entrance time and the store exit time of the user are proved, and it is guaranteed that the captured image is captured in the time from the store entrance time to the store exit time. Moreover, since it is guaranteed by the position information that the imaging device 101 is located in the store from the store entrance time to the store exit time, it is guaranteed that the captured image is captured in the store by the user who has actually visited the store.

Therefore, posting of fictitious reviews can be suppressed, and a reduction in reliability of the review can be suppressed. That is, it is possible to suppress a decrease in reliability of the service of the posting site.

Although the case of the review system 400 has been described above, the present technology can also be applied to the review system 500. That is, the unregistered imaging device 502 can be applied instead of the registerable imaging device 402. Furthermore, the present technology can also be applied to the review system 100. That is, the imaging device and the user terminal device may be integrated. That is, the imaging device 101 can be applied instead of the user terminal device 401 and the imaging device 402.

7. APPENDIX

<Captured Image>

The captured image described above may be a still image or a moving image.

<Combination>

Note that, in a case where the store entrance proof has been issued, uploading of the captured image (without electronic signature) by the dedicated camera application and uploading of the captured image with electronic signature after exiting the store can be used together. In a case where the store entrance and exit proof is performed by a receipt, a captured image with electronic signature is uploaded. The store entrance proof processing and the store exit proof processing may be performed by different methods. For example, the store entrance proof processing may be performed by the method described in the first embodiment, and the store exit proof processing may be performed by the method described in the second embodiment.

<Position Information>

The position information indicating the position of the store, the imaging device, and the like can be acquired by an arbitrary method. For example, the information may be acquired using a global positioning system (GPS) or may be acquired using a beacon.

<Object to be Reviewed>

The subject of the review is arbitrary. For example, it may be a restaurant, an article shop, a store that provides a service, goods, or an event or facility that can be imaged (for example, a hotel, a tourist facility, a concert venue, and the like).

<Store Entrance and Exit Proof>

Furthermore, in the above description, the QR code is used to transmit and receive the store information and the user information in the store entrance proof processing, the store exit proof processing, the store entrance and exit proof processing, and the like. However, the method of transmitting and receiving this information may be any local communication method capable of limiting the position, and is not limited to the QR code. For example, information may be exchanged via Wi-Fi or proximity communication.

For example, in a case where the imaging device 101, the user terminal device 401, and the like is connected to a store via Wi-Fi, it may be considered that the user has entered the store. Furthermore, in the case of the store entrance proof processing, the store entrance time may be acquired from the network reservation time via the word-of-mouth site. Furthermore, posting by a companion of the user may also be permitted. In this case, the user ID of the companion may be input to the reservation content, or the QR code of the reservation may be read by the reader.

Furthermore, the store exit proof processing may be performed using settlement processing of electronic money or a QR code. For example, the store exit time may be recorded in cooperation with a payment application. At the time of entrance into and exit from the store, a QR code may be imaged and uploaded together with a posted image. The store entrance and exit time may be recorded from the QR code image at the time of upload.

Furthermore, in a case where only the store entrance proof is performed, the position information may be periodically monitored, and the user may be regarded as exiting the store when the user exits the store for a certain period of time after entering the store.

<Regarding Association>

Note that, in the present specification, terms such as "associate", "add", and "link" all mean to combine a plurality of objects into one, for example, combining image data and metadata into one data. That is, these terms are synonymous with each other.

Note that "put together" means that one data can be used (linked) when the other data is processed. That is, the data may be physically collected as one piece of data or may be individually collected. For example, the information associated with the image data may be transmitted on a transmission path different from a transmission path of the image data. Furthermore, for example, the information associated with an image eta may be recorded in a recording medium (or another recording area of the same recording medium) different from the image data.

<Hardware>

The above described series of processing can be executed by software (application program) or can be executed by hardware.

<Object to which the Present Technology is Applied>

The present technology can be applied to an arbitrary configuration. For example, the present technology can be implemented as a partial configuration of an apparatus, such as a processor as a system large scale integration (LSI) or the like, a module using a plurality of processors and the like, a unit using a plurality of modules and the like, or a set in which other functions are further added to a unit.

Furthermore, for example, the present technology can also be applied to a network system including a plurality of devices. For example, the present technology may be implemented as cloud computing shared and processed in cooperation by a plurality of devices via a network. For example, the present technology may be implemented in a cloud service that provides a service to an arbitrary terminal such as a computer, a portable information processing terminal, or an Internet of Things (IoT) device.

Note that, in the present specification, a system means a set of a plurality of components (devices, modules (parts), etc.), and it does not matter whether or not all the components are in the same housing. Therefore, a plurality of devices housed in separate housings and connected via a network and one device in which a plurality of modules is housed in one housing are both systems.

<Field and Application to which Present Technology is Applicable>

The system, the device, the processing unit, and the like to which the present technology is applied can be used in arbitrary fields such as traffic, medical care, crime prevention, agriculture, livestock industry, mining, beauty, factory, home appliance, weather, and natural monitoring. Furthermore, the application thereof is also arbitrary.

<Others>

The embodiments of the present technology are not limited to the above described embodiments, and various modifications can be made without departing from the gist of the present technology.

For example, a configuration described as one device (or processing unit) may be divided and configured as a plurality of devices (or processing units). Conversely, configurations described above as a plurality of devices (or processing units) may be collectively configured as one device (or processing unit). Furthermore, a configuration other than the above-described configuration may be added to the configuration of each device (or each processing unit). Moreover, as long as the configuration and operation of the entire system are substantially the same, a part of the configuration of a certain device (or processing unit) may be included in the configuration of another device (or another processing unit).

Furthermore, for example, the above described program may be executed in an arbitrary device. In that case, it is sufficient that the device has a necessary function (functional block and the like) and can obtain necessary information.

Furthermore, for example, each step of one flowchart may be executed by one device, or may be shared and executed by a plurality of devices. Moreover, in a case where a plurality of processes is included in one step, the plurality of processes may be executed by one device, or may be shared and executed by a plurality of devices. In other words, a plurality of processes included in one step can also be executed as processes of a plurality of steps. Conversely, the processing described as a plurality of steps can be collectively executed as one step.

Furthermore, for example, in the program executed by the computer, processing of steps describing the program may be executed in time series in the order described in the present specification, or may be executed in parallel or individually at necessary timing such as when a call is made. That is, as long as there is no contradiction, the processing of each step may be executed in an order different from the above described order. Moreover, the processing of steps describing this program may be executed in parallel with the processing of another program, or may be executed in combination with the processing of another program.

Furthermore, for example, a plurality of technologies related to the present technology can be implemented independently as a single body as long as there is no contradiction. Of course, a plurality of arbitrary present technologies can be implemented in combination. For example, some or all of the present technology described in any of the embodiments can be implemented in combination with some or all of the present technology described in other embodiments. Furthermore, some or all of the above-described arbitrary present technology can be implemented in combination with other technologies not described above.

Note that the present technology can also have the following configurations.

(1) An image processing apparatus including:
a user information generation unit that generates user information on condition that a session is being established with a provision destination of a captured image; and
a providing unit that provides the user information to an information processing device that stores imaging location information.

(2) The image processing apparatus recited in (1), in which
the user information generation unit generates a QR code as the user information, and
the providing unit causes a display unit to display an image indicating the QR code.

(3) The image processing apparatus recited in (1) or (2), further including
a control unit that permits imaging by an imaging unit within a valid period indicated by captured image valid period information obtained from an external device by providing the user information to the information processing device.

(4) The image processing apparatus recited in (3), in which
the control unit acquires the captured image valid period information indicating the valid period after provision of the user information from the external device by providing the user information to the information processing device.

(5) The image processing apparatus recited in (3) or (4), in which
the control unit controls an imaging device including the imaging unit to associate identification information of the imaging device with the captured image generated by the imaging device.

(6) The image processing apparatus recited in any one of (3) to (5), in which
the control unit supplies identification information of the session to an imaging device including the imaging unit, and associates the identification information of the session with the captured image generated by the imaging device.

(7) The image processing apparatus recited in (1) or (2), further including
a control unit that permits posting of the captured image captured within a valid period indicated by captured image valid period information obtained from an external device by providing the user information to the information processing device.

(8) The image processing apparatus recited in (7), in which
the control unit acquires the captured image valid period information indicating the valid period before provision of the user information from the external device by providing the user information to the information processing device.

(9) The image processing apparatus recited in (1) or (2), further including
a control unit that starts permission for imaging by an imaging unit on the basis of permission start information obtained from an external device by providing the user information to the information processing device, and
stops permission for imaging by the imaging unit on the basis of permission stop information obtained from an external device by providing the user information to the information processing device.

(10) An image processing apparatus including:
an acquisition control unit that permits acquisition of imaging location information on the basis of permission information obtained from a provision destination on condition that a session is being established with the provision destination of a captured image;
an imaging location information acquisition unit that acquires the imaging location information provided from an information processing device associated with an imaging location in a state permitted by the acquisition control unit; and
a providing unit that provides the imaging location information and user information to an external device that verifies the user information.

(11) The image processing apparatus recited in (10), in which
the imaging location information acquisition unit acquires the imaging location information by capturing an image of a QR code corresponding to the imaging location information.

(12) The image processing apparatus recited in (10) or (11), further including
an imaging control unit that permits imaging by an imaging unit within a valid period indicated by captured image valid period information obtained from the external device by providing the external device with the imaging location information and the user information.

(13) The image processing apparatus recited in (12), in which
the imaging control unit acquires the captured image valid period information indicating the valid period after provision of the user information from the external device by providing the imaging location information and the user information to the external device.

(14) The image processing apparatus recited in (12) or (13), in which
the imaging control unit controls an imaging device including the imaging unit to associate identification information of the imaging device with the captured image generated by the imaging device.

(15) The image processing apparatus recited in any one of (12) to (14), in which
the imaging control unit supplies identification information of the session to an imaging device including the imaging unit, and associates the identification information of the session with the captured image generated by the imaging device.

(16) The image processing apparatus recited in (10) or (11), further including
a post control unit that permits posting of a captured image captured within a valid period indicated by captured image valid period information obtained from the external device by providing the imaging location information and the user information to the external device.

(17) The image processing apparatus recited in (16), in which
the post control unit acquires the captured image valid period information indicating the valid period before provision of the user information from the external device by providing the imaging location information and the user information to the external device.

(18) The image processing apparatus recited in (10) or (11), further including
an imaging control unit that starts permission for imaging by an imaging unit on the basis of permission start information obtained from the external device by providing the imaging location information and the user information to the external device, and
stops permission for imaging by the imaging unit on the basis of permission stop information obtained from the external device by providing the imaging location information and the user information to the external device.

(19) An information processing system including: an image processing apparatus; a first information processing apparatus; and a second information processing apparatus,
in which
the image processing apparatus includes:
a user information generation unit that generates user information on condition that a session is being established with a provision destination of a captured image;
a user information providing unit that provides the user information generated by the user information generation unit to the first information processing apparatus;
a captured image valid period information acquisition unit that acquires captured image valid period information provided by the second information processing apparatus and corresponding to the user information provided by the user information providing unit; and
an imaging control unit that permits imaging by an imaging unit within a valid period indicated by the captured image valid period information acquired by the captured image valid period information acquisition unit,
the first information processing apparatus includes:
a user information acquisition unit that acquires the user information provided by the image processing apparatus; and
an imaging location information and user information providing unit that provides imaging location information and the user information acquired by the user information acquisition unit to the second information processing apparatus, and the second information processing apparatus includes:
an imaging location information and user information acquisition unit that acquires the imaging location information and the user information provided by the first information processing apparatus;
a verification unit that verifies the imaging location information and the user information acquired by the imaging location information and user information acquisition unit; and
a captured image valid period information providing unit that provides the captured image valid period information corresponding to the imaging location information and the user information to the image processing apparatus in a case where the imaging location information and the user information are determined to be valid as a result of verification by the verification unit.

(20) An information processing system including: an image processing apparatus; a first information processing apparatus; and a second information processing apparatus, in which
the image processing apparatus includes:
an acquisition control unit that permits acquisition of imaging location information on the basis of permission information obtained from a provision destination on condition that a session is being established with the provision destination of a captured image;
an imaging location information acquisition unit that acquires the imaging location information provided from the first information processing apparatus in a state permitted by the acquisition control unit;
an imaging location information and user information providing unit that provides the imaging location information acquired by the imaging location information acquisition unit and user information to the second information processing apparatus;
a captured image valid period information acquisition unit that acquires captured image valid period information provided by the second information processing apparatus and corresponding to the imaging location information and the user information provided by the imaging location information and user information providing unit; and
an imaging control unit that permits imaging by an imaging unit within a valid period indicated by the captured image valid period information acquired by the captured image valid period information acquisition unit,
the first information processing apparatus includes:
an imaging location information generation unit that generates the imaging location information on condition that a session is being established with the provision destination of the captured image; and
an imaging location information providing unit that provides the imaging location information generated by the imaging location information generation unit to the image processing apparatus, and
the second information processing apparatus includes:
an imaging location information and user information acquisition unit that acquires the imaging location information and the user information provided by the image processing apparatus;
a verification unit that verifies the imaging location information and the user information acquired by the imaging location information and user information acquisition unit; and
a captured image valid period information providing unit that provides the captured image valid period information corresponding to the imaging location information and the user information to the image processing apparatus in a case where the imaging location information and the user information are determined to be valid as a result of verification by the verification unit.

(21) An information processing system including: an image processing apparatus; a first information processing apparatus; and a second information processing apparatus, in which
the image processing apparatus includes:
a user information generation unit that generates user information;
a user information providing unit that provides the user information generated by the user information generation unit to the first information processing apparatus;
a stay information extraction unit that extracts stay information from a receipt on which the stay information including a session key and time information is printed, the session key being issued on the basis of the user information provided by the user information providing unit to the first information processing apparatus and imaging location information;
a stay information providing unit that provides the stay information extracted by the stay information extraction unit to the second information processing apparatus; and
a captured image providing unit that provides the second information processing apparatus with a captured image generated by imaging by an imaging unit,
the first information processing apparatus includes:
a user information acquisition unit that acquires the user information provided by the image processing apparatus;
an imaging location information and user information providing unit that provides the imaging location information and the user information acquired by the user information acquisition unit to the second information processing apparatus;
a session key acquisition unit that acquires the session key provided from the second information processing apparatus; and
a receipt issuing unit that issues the receipt on which the stay information including the session key acquired by the session key acquisition unit and the time information is printed, and
the second information processing apparatus includes:
an imaging location information and user information acquisition unit that acquires the imaging location information and the user information provided from the first information processing apparatus;
a verification unit that verifies the imaging location information and the user information acquired by the imaging location information and user information acquisition unit;
a session key providing unit that issues the session key corresponding to the imaging location information and the user information and provides the session key to the first information processing apparatus in a case where the imaging location information and the user information are determined to be valid as a result of verification by the verification unit;
a stay information acquisition unit that acquires the stay information provided from the image processing apparatus;
a captured image acquisition unit that acquires the captured image provided from the image processing apparatus; and a control unit that controls permission to post the captured image acquired by the captured image acquisition unit on the basis of the stay information acquired by the stay information acquisition unit.

REFERENCE SIGNS LIST

100 Review system
101 Imaging device
102 Store terminal device
103 Verification server
104 Posting site server
105 Network
112 Imaging unit
141 Session key request unit
142 QR code generation unit
143 QR code providing unit
144 Control information acquisition unit
145 Imaging control unit
146 Captured image providing unit
147 Post processing unit
162 Reader
191 Store information registration unit
192 QR code reading unit
193 Store entrance proof information providing unit
194 Store exit proof information providing unit
212 Verification data storage unit
241 Store ID issuance registration unit
242 Store entrance proof information acquisition unit
243 Store entrance proof information verification unit
244 Store entrance time recording unit
245 Imaging control unit
246 Captured image acquisition unit
247 Captured image verification unit
248 Captured image management unit
249 Store exit proof information acquisition unit
250 Store exit proof information verification unit
251 Store exit time recording unit
252 Post control unit
262 Posted data storage unit
291 Request acceptance unit
292 Session key issuing unit
293 Post image acquisition unit
294 Post processing unit
341 Reader control unit
342 QR code reading unit
343 Store entrance proof information providing unit
344 Store exit proof information providing unit
351 Session key request unit
352 QR code generation unit
353 QR code providing unit
361 Reader control unit
400 Review system
401 User terminal device
402 Imaging device
441 Imaging device registration unit
442 Session key request unit
443 QR code generation unit
444 QR code providing unit
445 Control information acquisition unit
446 Imaging control unit
447 Captured image with electronic signature acquisition unit
448 Captured image with electronic signature providing unit
449 Post processing unit
451 Imaging processing unit 452 Metadata adding unit
453 Electronic signature adding unit
454 Captured image with electronic signature supply unit
461 Imaging device registration unit
462 Captured image with electronic signature yutoku unit
463 Captured image with electronic signature verification unit
464 Captured image supply unit
481 Reader control unit
482 QR code reading unit
483 Store entrance proof information providing unit
484 Store exit proof information providing unit
500 Review system
502 Imaging device
511 Session key issuance registration unit
531 Store entrance and exit proof information providing unit
541 User store information providing unit
542 Session key acquisition unit
543 Receipt issuing unit
551 User store information acquisition unit
552 User store information verification unit
553 Session key issuing unit
554 Store entrance and exit proof information acquisition unit
555 Store entrance and exit time recording unit

The invention claimed is:

1. An image processing apparatus comprising:
a user information generation unit that generates user information on condition that a session is being established with a provision destination of a captured image;
a providing unit that provides the user information to an information processing device that stores imaging location information; and
a control unit that permits imaging by an imaging unit within a valid period indicated by captured image valid period information obtained from an external device by providing the user information to the information processing device, wherein
the control unit acquires the captured image valid period information indicating the valid period after provision of the user information from the external device by providing the user information to the information processing device.

2. The image processing apparatus according to claim 1, wherein the user information generation unit generates a QR code as the user information, and the providing unit causes a display unit to display an image indicating the QR code.

3. An image processing apparatus comprising:
a user information generation unit that generates user information on condition that a session is being established with a provision destination of a captured image;
a providing unit that provides the user information to an information processing device that stores imaging location information; and
a control unit that permits imaging by an imaging unit within a valid period indicated by captured image valid period information obtained from an external device by providing the user information to the information processing device, wherein
the control unit controls an imaging device including the imaging unit to associate identification information of the imaging device with the captured image generated by the imaging device.

4. An image processing apparatus comprising:
a user information generation unit that generates user information on condition that a session is being established with a provision destination of a captured image;
a providing unit that provides the user information to an information processing device that stores imaging location information; and
a control unit that permits imaging by an imaging unit within a valid period indicated by captured image valid period information obtained from an external device by providing the user information to the information processing device, wherein
the control unit supplies identification information of the session to an imaging device including the imaging unit, and associates the identification information of the session with the captured image generated by the imaging device.

5. An image processing apparatus comprising:
a user information generation unit that generates user information on condition that a session is being established with a provision destination of a captured image;
a providing unit that provides the user information to an information processing device that stores imaging location information; and
a control unit that permits posting of the captured image captured within a valid period indicated by captured image valid period information obtained from an external device by providing the user information to the information processing device, wherein
the control unit acquires the captured image valid period information indicating the valid period before provision of the user information from the external device by providing the user information to the information processing device.

6. An image processing apparatus comprising:
a user information generation unit that generates user information on condition that a session is being established with a provision destination of a captured image;
a providing unit that provides the user information to an information processing device that stores imaging location information; and
a control unit that starts permission for imaging by an imaging unit on a basis of permission start information obtained from an external device by providing the user information to the information processing device, and stops permission for imaging by the imaging unit on a basis of permission stop information obtained from an external device by providing the user information to the information processing device.

7. A non-transitory computer readable medium storing program code, the program code being executable by at least one processor to perform operations comprising:
generating user information on condition that a session is being established with a provision destination of a captured image;
providing the user information to an information processing device that stores imaging location information;
permitting imaging by an imaging unit within a valid period indicated by captured image valid period information obtained from an external device by providing the user information to the information processing device; and
acquiring the captured image valid period information indicating the valid period after provision of the user information from the external device by providing the user information to the information processing device.

8. The non-transitory computer readable medium according to claim 7, wherein the operations further comprise:
generating a QR code as the user information; and
causing a display unit to display an image indicating the QR code.

9. A non-transitory computer readable medium storing program code, the program code being executable by at least one processor to perform operations comprising:
generating user information on condition that a session is being established with a provision destination of a captured image; and
providing the user information to an information processing device that stores imaging location information;
permitting imaging by an imaging unit within a valid period indicated by captured image valid period information obtained from an external device by providing the user information to the information processing device; and
controlling an imaging device including the imaging unit to associate identification information of the imaging device with the captured image generated by the imaging device.

10. A non-transitory computer readable medium storing program code, the program code being executable by at least one processor to perform operations comprising:
generating user information on condition that a session is being established with a provision destination of a captured image;
providing the user information to an information processing device that stores imaging location information;
permitting imaging by an imaging unit within a valid period indicated by captured image valid period information obtained from an external device by providing the user information to the information processing device; and
supplying identification information of the session to an imaging device including the imaging unit, and associating the identification information of the session with the captured image generated by the imaging device.

11. A non-transitory computer readable medium storing program code, the program code being executable by at least one processor to perform operations comprising:
generating user information on condition that a session is being established with a provision destination of a captured image;
providing the user information to an information processing device that stores imaging location information;
permitting posting of the captured image captured within a valid period indicated by captured image valid period information obtained from an external device by providing the user information to the information processing device; and
acquiring the captured image valid period information indicating the valid period before provision of the user information from the external device by providing the user information to the information processing device.

12. A non-transitory computer readable medium storing program code, the program code being executable by at least one processor to perform operations comprising:
generating user information on condition that a session is being established with a provision destination of a captured image;
providing the user information to an information processing device that stores imaging location information;
starting permission for imaging by an imaging unit on a basis of permission start information obtained from an external device by providing the user information to the information processing device; and
stopping permission for imaging by the imaging unit on a basis of permission stop information obtained from an external device by providing the user information to the information processing device.

13. An image processing apparatus comprising:
a memory storing program code, and
at least one processor configured to execute the program code to perform operations comprising:
generating user information on condition that a session is being established with a provision destination of a captured image;
providing the user information to an information processing device that stores imaging location information;
permitting imaging by an imaging unit within a valid period indicated by captured image valid period information obtained from an external device by providing the user information to the information processing device; and
acquiring the captured image valid period information indicating the valid period after provision of the user information from the external device by providing the user information to the information processing device.

14. The image processing apparatus according to claim 13, wherein the operations further comprise:
generating a QR code as the user information; and
causing a display unit to display an image indicating the QR code.

15. An image processing apparatus comprising:
a memory storing program code, and
at least one processor configured to execute the program code to perform operations comprising:
generating user information on condition that a session is being established with a provision destination of a captured image; and
providing the user information to an information processing device that stores imaging location information;
permitting imaging by an imaging unit within a valid period indicated by captured image valid period information obtained from an external device by providing the user information to the information processing device; and
controlling an imaging device including the imaging unit to associate identification information of the imaging device with the captured image generated by the imaging device.

16. An image processing apparatus comprising:
a memory storing program code, and
at least one processor configured to execute the program code to perform operations comprising:
generating user information on condition that a session is being established with a provision destination of a captured image;
providing the user information to an information processing device that stores imaging location information;
permitting imaging by an imaging unit within a valid period indicated by captured image valid period information obtained from an external device by providing the user information to the information processing device; and
supplying identification information of the session to an imaging device including the imaging unit, and associating the identification information of the session with the captured image generated by the imaging device.

17. An image processing apparatus comprising:
a memory storing program code, and
at least one processor configured to execute the program code to perform operations comprising:
generating user information on condition that a session is being established with a provision destination of a captured image;
providing the user information to an information processing device that stores imaging location information;
permitting posting of the captured image captured within a valid period indicated by captured image valid period information obtained from an external device by providing the user information to the information processing device; and
acquiring the captured image valid period information indicating the valid period before provision of the user information from the external device by providing the user information to the information processing device.

18. An image processing apparatus comprising:
a memory storing program code, and
at least one processor configured to execute the program code to perform operations comprising:
generating user information on condition that a session is being established with a provision destination of a captured image;
providing the user information to an information processing device that stores imaging location information;
starting permission for imaging by an imaging unit on a basis of permission start information obtained from an external device by providing the user information to the information processing device; and
stopping permission for imaging by the imaging unit on a basis of permission stop information obtained from an external device by providing the user information to the information processing device.

* * * * *